US007835931B2

(12) United States Patent  (10) Patent No.: US 7,835,931 B2
Bayne (45) Date of Patent: Nov. 16, 2010

(54) METHOD AND SYSTEM FOR NETWORK-BASED, DISTRIBUTED, REAL-TIME COMMAND AND CONTROL OF AN ENTERPRISE

(75) Inventor: Jay S. Bayne, Mequon, WI (US)

(73) Assignee: Meta Command Systems, Inc., Mequon, WI (US)

( * ) Notice: Subject to any disclaimer, the term of this patent is extended or adjusted under 35 U.S.C. 154(b) by 1380 days.

(21) Appl. No.: 11/149,965

(22) Filed: Jun. 10, 2005

(65) Prior Publication Data

US 2005/0256735 A1      Nov. 17, 2005

Related U.S. Application Data

(63) Continuation-in-part of application No. 10/678,297, filed on Oct. 3, 2003, now Pat. No. 7,181,302.

(51) Int. Cl.
G06F 9/44      (2006.01)
G06F 17/50     (2006.01)
(52) U.S. Cl. .......................................................... 705/7
(58) Field of Classification Search ........................ None
See application file for complete search history.

(56) References Cited

U.S. PATENT DOCUMENTS

| | | | |
|---|---|---|---|
| 4,943,932 A * | 7/1990 | Lark et al. ..................... 706/60 |
| 6,049,774 A | 4/2000 | Roy |
| 6,115,691 A | 9/2000 | Ulwick |
| 6,411,936 B1 | 6/2002 | Sanders |
| 6,549,893 B1 | 4/2003 | Lannert et al. |
| 6,578,005 B1 | 6/2003 | Lesaint et al. |
| 6,606,744 B1 | 8/2003 | Mikurak |
| 6,671,818 B1 | 12/2003 | Mikurak |
| 6,850,252 B1 * | 2/2005 | Hoffberg ..................... 715/716 |
| 6,895,573 B2 * | 5/2005 | Norgaard et al. ............ 717/100 |
| 7,120,596 B2 * | 10/2006 | Hoffman et al. ............... 705/28 |
| 7,557,702 B2 * | 7/2009 | Eryurek et al. .............. 340/511 |
| 2001/0053993 A1 | 12/2001 | McLean et al. |
| 2002/0065696 A1 | 5/2002 | Hack et al. |
| 2002/0087336 A1 | 7/2002 | Hale et al. |
| 2002/0184067 A1 | 12/2002 | McLean et al. |
| 2002/0188486 A1 | 12/2002 | Gil et al. |

(Continued)

OTHER PUBLICATIONS

Jay S. Bayne, Automation and Control in Large-Scale Interactive Systems, May 2002, IEEE International Symposium on Object-Oriented Real-time Distributed Computing.*

(Continued)

*Primary Examiner*—Romain Jeanty
*Assistant Examiner*—Brandi P Parker
(74) *Attorney, Agent, or Firm*—Michael Best & Friedrich LLP

(57) ABSTRACT

Methods and systems for command and control of an enterprise. An enterprise operating system is disclosed including five frameworks: an enterprise bridge framework, an enterprise controller framework, a performance measurement framework, a control processing framework, and an enterprise operating system services framework. A system is disclosed to receive a plurality of messages, filter and sort the messages, generate courses of action based on the messages, validate and resource the courses of action (create plans of record), execute the plans of record, and monitor the performance of executing plans of record.

30 Claims, 32 Drawing Sheets

U.S. PATENT DOCUMENTS

| | | | |
|---|---|---|---|
| 2003/0018506 A1 | 1/2003 | McLean et al. | |
| 2003/0033179 A1 | 2/2003 | Katz et al. | |
| 2003/0046125 A1 | 3/2003 | Flores | |
| 2003/0110064 A1 | 6/2003 | Tu et al. | |
| 2003/0120593 A1* | 6/2003 | Bansal et al. | 705/39 |
| 2004/0064351 A1 | 4/2004 | Mikurak | |
| 2004/0243378 A1* | 12/2004 | Schnatterly et al. | 703/22 |
| 2005/0044197 A1 | 2/2005 | Lai | |
| 2006/0178918 A1 | 8/2006 | Mikurak | |
| 2008/0027769 A1* | 1/2008 | Eder | 705/7 |

OTHER PUBLICATIONS

Michael Athans, The Expert Team of Experts Approach to Command-and-Control (C2) Organizations, Sep. 1982, IEEE.*

Jay S. Bayne, inventor resume publications, Jan. 14, 2007.*

Bayne, Jay S. and Paul, Raymond PhD, Policy-Based Command & Control, 10th International Command & Control Research & Technology Symposium, McLean, VA, Jun. 13-16, 2005, pp. 1-20, Echelon 4 Corporation, USA.

Bayne, Jay S. and Paul, Raymond PhD, "Scale-Free Enterprise Command & Control Unified Command Structures," 10th International Command and Control Research and Technology Symposium, Jun. 13-16, 2005, McLean, VA, pp. 1-15, Echelon 4 Corporation, USA.

Bayne, Jay and Paul, Raymond, "Engineering Model for Enterprise Command and Control," 2004 Command and Control Research &Technology Symposium, Mar. 15, 2004, pp. 1-23, USA.

"Command and Control Joint Integrating Concept Draft Version 0.85," U.S. Department of Defense, Jun. 3, 2005, pp. 1-77, USA.

Lenahan, Jack, "An Abstract Process and Metrics Model for Evaluating Unified Command and Control—A Scenario and Technology Agnostic Approach," pp. 1-115, USA.

Bayne, Jay S.; A Software Architecture for Control of Value Production in Federated Systems; pp. 1-6.

Buyya, Rajkumar, Stockinger, Heinz, Giddy, Jonathan, & Abramson, David; Economic Models for Management of Resources in Peer-to-Peer and Grid Computing; pp. 1-13.

Murshed, Manzur & Buyya, Rajkumar; Using the GridSim Toolkit for Enabling Grid Computing Education; pp. 1-7.

Scrudder, Roy, Lutz, Robert, & Dahmann, Dr. Judith; Automation of the HLA Federation Development and Execution Process; pp. 1-7.

Morrison, Dr. Jeffery G., Kaufmann, Kenneth, Moore, Ronald A.; Global 2000 "Knowledge Wall"; pp. 1-2; SPAWAR Systems Center, Department of The Navy Science & Technology; San Diego.

Jensen, E. Doug; The Distributed Real-Time Specification for Java extends RMI in the Real-Time Specification for Java, to provide support for predictability of end-to-end timeliness of trans-node activities; pp. 1-8; http://web1.jcp.org/en/jsr/detail?id=50 &showPrint.

Albus, James S.; Outline for a Theory of Intelligence; IEEE Transactions on Systems, Man, and Cybernetics, vol. 21, No. 3, May/Jun. 1991; pp. 473-509.

Kamrad, Mike, Taft, Tukcer, Bayne, Dr. Jay, Bailey, Elsag, Pratt, Keith, Clark, Jeff, Woddruff, John, Rizik , Dr. Pete, Leif, Dr. Bob, Leif, Suzanne, Bartow, Jules, Volz, Dr. Richard, & Theriault, Dr. Ron; Summary of ARTEWG Workshop on Distributed Systems; Apr. 21-23, 1995; pp. 1-10; http://www.acm.org/sigada/wg/artewg/ dist_workshop_summary.html.

Department of Defense; C⁴ISR Architecture Framework Version 2.0; Dec. 18, 1997; pp. 1-240.

Selic, Bran, & Rumbaugh, Jim; Using UML for Modeling Complex Real-Time Systems; Mar. 11, 1998; pp. 1-22.

Bayne, Jay, Wilhelm, Robert, Seem, John, & Drees, Kirk; Session E: Intelligence in Large-scale Industrial Controls; AIRTC '98, Grand Canyon, AZ, Oct. 5-8, 1998; pp. 1-9.

Deering, S., & Hinden, R.; Internet Protocol, Version 6 (IPv6) Specification; Network Working Group, Dec. 1998; ftp://ftp.isi.edu/in-notes/rfc2460.txt, pp. 1-36.

Bayne, Jay S.; Objects & Transactions in Industrial Control System; 2nd IEEE International Symposium on Object Oriented Real-time Computer Systems, Malo, France, May 3, 1999; pp. 1-20.

Kangasluoma, Minna; Policy Specification Language; Nov. 25, 1999; http://www.nixu.fi/~minna/draft2.html; pp. 1-9.

Bayne, Jay S.; Unleashing the Power of Networks: Pulling Building Control into the Era of Integration; Johnson Controls, Copyright 1999; pp. 1-4.

Herring, Charles, & Kaplan, Simon; The Viable System Model for Software; Department of Computer Science and Electrical Engineering, University of Queensland; Jun. 2000; pp. 1-9.

Jensen, E. Douglas; Utility Functions: A General Scalable Technology for Software Execution Timeliness as a Quality of Service; Revised Jul. 6, 2000; pp. 1-96.

Jensen, E. Douglas; Utility Functions: A General Scalable Technology for Software Execution Timeliness as a Quality of Service Part 1: Motivation; Revised Jun. 13, 2000; pp. 1-45.

Jensen, E. Douglas; Utility Functions: A General Scalable Technology for Software Execution Timeliness as a Quality of Service, Part 2: The Time/Utility Function Model; Revised Aug. 5, 2000; pp. 1-82.

Department of Defense; Joint Technical Architecture, Joint Interoperability and Warrior Support; Version 4.0, Apr. 2, 2001; pp. 1-228.

Department of Defense; Technical Reference Model, Joint Interoperability and Warrior Support; Version 2.0, Apr. 9, 2001, pp. 1-114.

Bayne, Jay S.; Automation & Control In Large-Scale Interactive Systems; 5th IEEE International Symposium on Object-oriented Real-time Distributed Computing, Apr. 29-May 1, 2002, Washington D.C.; pp. 1-10.

Foster, Ian; The Grid: A New Infrastructure for 21st Century Science; Physics Today, Feb. 2002, pp. 1-9.

Clark, Ray, Jensen, E. Douglas, Wells, Doug, & Wellings, Andy; The Distributed Real-Time Specification for Java, Overview and Status; Nov. 11, 2002; pp. 1-48.

Foster, Ian, Kesselman, Carl, Nick, Jeffery M., & Tuecke, Steven; Grid Services for Distributed System Integration; IEEE Computer, The New Net, Jun. 2002; pp. 37-46.

Foster, Ian, Kesselman, Nick, Jeffrey M. & Tuecke, Steven; The Physiology of the Grid An Open Grid Services Architecture for Distributed Systems Integration; http://www.globus.org/research/ papers/ogsa.pdf; Version Jun. 22, 2002; pp. 1-31.

Bayne, Jay S.; The Architecture of Enterprise; www.echelon4.com; Sep. 21, 2002; pp. 1-4.

Wellings, Andy, Clark, Ray, Jensen, Doug, & Wells, Doug; a Framework for Integrating the Real-Time Specification for Java and Java's Remote Method Invocation; www.real-time.org; Revised 2002; pp. 1-10.

Locasto, Michael, Burnside, Matthew, Li, Chun, & Wahl, Aron; SPCL: Structured Policy Command Language; Feb. 6, 2003; pp. 1-7.

Bayne, Jay S., & Paul, Raymond; Performance Measurement in C2 Systems; 8th International Command & Control Research and Technology Symposium; Jun. 2003; pp. 1-10.

Tsai, Dr. W.T., & Paul, Dr. Raymond A.; Adaptive, Scenario-Based, Object-Oriented Test Frameworks for Testing Embedded Systems; ITEA Journal; Jun./Jul. 2003; pp. 1-6.

Moreau, Jean-Jacques, Schlimmer, Jeffrey; Web Services Description Language (WSDL) Version 1.2, Part 3: Bindings; W3C Working Draft Jun. 11, 2003; pp. 1-38.

Bayne, Jay, & Paul , Raymond; Performance Measurement in C2 Systems The FORCEnet Challenge; 8th International Command and Control Research and Technology Symposium On "Information Age Transformation"; Washington D.C., Jun. 17-19, 2003; pp. 1-31.

Tuecke, S., Czajkowski, K., Foster, I., Frey, J., Graham, S., Kesselman, C., Maquire, T., Sandholm, T., Snelling, D., Vanderbilt, P.; Open Grid Services Infrastructure (OGSI), Version 1.0; Jun. 27, 2003; pp. 1-86; Global Grid Forum; www.ggf.org.

Office of the Assistant Secretary of Defense Networks and Information Integration (OASD/NII); Unified Command Structure (USC) Operational Concept Description; V13; Jun. 25, 2003; pp. 1-20.

Bayne, Jay S.; A Software Architecture for Control of Value Production in Federated Systems; 7th World Multi-Conference on Systemics, Cybernetics & Informatics SCI 2003; Jul. 2003; pp. 1-6.

Bayne, Jay S.; Automation and Control in Grid-Connected Federations; ISA EXPO 2003; Houston, TX; pp. 1-15.

Bayne, Jay S.; Architecture of Federated Enterprise; ISA EXPO 2003; Houston, TX; pp. 1-5.

Lenahan, Jack; An Abstract Process and Metrics Model for Evaluating Unified Command and Control A Scenario and Technology Agnostic Approach; Draft Version 2.0; Jan. 16, 2004; pp. 1-65; Space and NVAL Warfare Systems Command, Charleston, S.C.

Department of Defense; Joint Command and Control Functional Concept; Feb. 2004; pp. 1-101.

Chinnici, Roberto, Gudgin, Martin, Moreau, Jean-Jacques, Schlimmer, Jeffery, Weerawarana, Sanjiva; Web Services Description Language (WSDL) Version 2.0, Part 1: Core Language; W3C Working Draft Mar. 26, 2004; pp. 1-90.

Gudgin, Martin, Lewis, Amy, Schlimmer, Jeffrey; Web Services Description Language (WSDL) Version 2.0, Part 2: Message Exchange Patterns; W3C Working Draft Mar. 26, 2004; pp. 1-10.

* cited by examiner

| ASSUMPTIONS | |
|---|---|
| SALES GROWTH: | 10% |
| ASSET/SALES: | |
| | 15% |
| LIABILITIES/SALES: | 8% |
| NET FIXED ASSETS/SALES: | 77% |
| COS/SALES: | 45% |
| INTEREST ON DEBT: | 10% |
| INTEREST ON CASH: | 8% |
| TAX RATE: | 40% |
| DIVIDEND PAYOUT RATIO: | 60% |

| INCOME STATEMENT | |
|---|---|
| SALES | 100% |
| COST OF SALES | (50%) |
| GROSS MARGIN | 50% |
| SG&A | (15%) |
| R&D | (5%) |
| EBITDA | 30% |
| DEPRECIATION | (3%) |
| AMORTIZATION | (2%) |
| EBIT | 20% |
| INTEREST INCOME | 1% |
| INTEREST EXPENSE | (3%) |
| PRETAX INCOME | 18% |
| INCOME TAXES | (8%) |
| NET INCOME | (10%) |
| DIVIDENDS | (6%) |
| RETAINED EARNINGS | 4% |

| BALANCE SHEET | |
|---|---|
| CURRENT ASSETS | |
| CASH & MARKETABLE SECURITIES | |
| ACCOUNTS RECEIVABLE | |
| INVENTORY | |
| PREPAID EXPENSES | |
| PROPERTY & EQUIPMENT | |
| EQUIPMENT | |
| OTHER | |
| LESS ACCUMULATED DEPRECIATION | |
| TOTAL ASSETS | 100% |
| CURRENT LIABILITIES | |
| LONG-TERM DEBT | |
| CURRENT POSITION | |
| ACCOUNTS PAYABLE | |
| ACCRUED EXPENSES | |
| LONG-TERM LIABILITIES | |
| LONG-TERM DEBT | |
| LESS CURRENT POSITION | |
| SHAREHOLDERS' EQUITY | |
| COMMON STOCK | |
| PAID-IN CAPITOL | |
| ACCUMULATED RETAINED EARNINGS | |
| TOTAL LIABILITIES | 100% |

METHOD AND SYSTEM FOR NETWORK-BASED, DISTRIBUTED, REAL-TIME COMMAND AND CONTROL OF AN ENTERPRISE

RELATED APPLICATIONS

This is a continuation-in-part of U.S. patent application Ser. No. 10/678,297 filed on Oct. 3, 2003 now U.S. Pat. No. 7,181,302.

This invention was made with Government support under Contract FA8750-04-C-004 awarded by the Air Force. The Government has certain rights in this invention.

BACKGROUND OF THE INVENTION

The present invention relates to business or enterprise management, and more particularly to methods and systems for managing value and assets of systems of enterprise systems.

There are a wide variety of existing business management and evaluation methods and systems. Significant efforts have been made in developing systems to measure financial performance, process and product quality, customer support, regulatory compliance, information systems availability, safety and security, supply chain, and other parameters and areas. However, most methods and systems, whether computerized or not, generally focus on a single aspect or domain of an enterprise (for example, supply chain management). Further, many of the methods and systems are constructed such that the evaluation or monitoring of the enterprise is performed from the outside looking in. For example, stock and market analysts may evaluate a company, but they do so from an outsider position and generally use information based on past events.

SUMMARY OF THE INVENTION

Using one or more single-aspect or domain-specific measurement systems to manage an enterprise has several deficiencies. A large, complex enterprise may use multiple measurement systems, and if an accurate overall picture of the enterprise is to be obtained, some combination or correlation of the information from each domain-specific measurement system must be accomplished. For example, it may be necessary to define the relationships between each domain-specific measurement system, rationalize their metrics, weigh and balance their respective values, resolve contradictions, and manage the cost of implementing and maintaining adherence to those systems.

Accordingly, there is a need for improved methods and systems for managing or controlling an enterprise that are useful to managers running the company, that are based upon real-time information, and that may be applied to or cover multiple aspects of the enterprise.

One embodiment of the invention provides a system for enterprise command and control. The system includes a model management component for providing real-time operating situations and events, policy constraints, asset constraints, and current situation models. The system also includes a scenario management component for providing policy base updates, asset base status updates, validated scenarios, and current aggregate situation models. A policy management service provides policy status, asset status, course of action status, plan of record status, a subordinate's policy status, and a superior's policy status. The policy management service also receives policy requests from subordinates and policy postings from superiors, and issues policy requests to superiors and policies to subordinates. An asset management service also exists to receive asset requests from subordinates and asset allocations from superiors, and to return assets to superiors and allocate assets for subordinates. A performance management service provides measures of latency, productivity, and performance.

The enterprise command and control system further includes a situation assessment service which receives asset chain tasks and status requests, supply chain tasks and status requests, along with a plurality of messages. Working with the model management system, and the scenario management system, the situation assessment service produces prioritized lists of potential courses of action including associated resource requirements and policy issues. A behavior generation service receives the prioritized courses of action from the situation assessment service, and works with the policy management service, and asset management service to produce a set of resourced and prioritized plans of record. Next an execution management service receives the resourced and prioritized plans of record from the behavior generation service, and, along with the performance management service, generates asset chain tasking commands and supply chain tasking commands.

The enterprise command and control system may include a visual commons to display models, scenarios, situations, plans, policies, assets, execution status, and performance data.

In another embodiment, the invention provides an enterprise operating system, that includes an enterprise bridge framework providing a plurality of user interfaces, an enterprise controller framework to structure communication between entities, a performance measurement framework providing normalized performance data for entities, a control processing framework receiving a plurality of asset tasks and a plurality of supply tasks and providing asset commands and task commands; and a services framework providing support to each of the frameworks.

In another embodiment, the invention provides a situation assessment service ("SAS") including a model management system to provide real-time operating situations and events, policy constraints, asset constraints, and current situation models. The SAS may include a scenario management system to provide policy base updates, asset base status updates, validated scenarios, and current aggregate situation models. A filter or filter process receives messages from a plurality of subscriptions and interfaces with the model management system to decode and sort the messages and generate a list of events. A triage process takes the list of events and real-time operating situation and event information and applies policy and asset constraints and current situation models from the model management system to create a situation list. An analysis process uses the situation list, policy base updates, asset base status updates, validated scenarios, and current aggregate situation models from the scenario management system to modify current aggregate situation models, and create a new aggregate situation model if a current aggregate situation model does not exist for a situation. The analysis process generates prioritized lists of potential courses of action with associated resource requirements and policy issues.

In another embodiment, the invention provides a behavior generation service that includes a policy management service ("PMS"). The PMS provides policy status, asset status, course of action status, and plan of record status. An asset management service provides the status of assets and a planning management service provides current situations and status of resources. A policy process works with the policy management service and prioritizes lists of potential courses of action to determine if the potential courses of action are viable, need modification, or are not viable, and to create a list of actionable plans. A resource process uses the list of actionable plans and the status of assets to assign assets to actionable plans, to create asset assignment schedules if assets are not available for actionable plans, and to provide plans of record. A command process uses the plans of record along with current situations and resource status to generate a set of resourced and prioritized plans of record.

In another embodiment, the invention provide an execution management service ("EMS") that includes a performance management service to measure actuality, capability, potentiality, latency, productivity, and performance. The EMS also includes an execution process that uses a set of resourced and prioritized plans of record, the measures of actuality, capability, potentiality, latency, productivity, and performance, and generates asset chain tasking commands, and supply chain tasking commands.

In another embodiment, the invention provides a method of performing enterprise command and control. The method includes monitoring a plurality of situations; assessing the plurality of situations; determining a course of action based on an assessed situation; validating the course of action; providing assets to a validated course of action; executing a validated and resourced course of action; and monitoring the performance of an executing course of action. Further the method provides a visual commons for a situation assessment display, a behavior generation display, a media display, a current tactical situation display, and a community of interest display.

Other features and aspects of the invention will become apparent to those skilled in the art upon review of the following detailed description, claims, and drawings.

BRIEF DESCRIPTION OF THE DRAWINGS

In the drawings:

FIG. 13 is an illustration of a second model of VPU behavior or dynamics, emphasizing financial flows.

Figure 1:
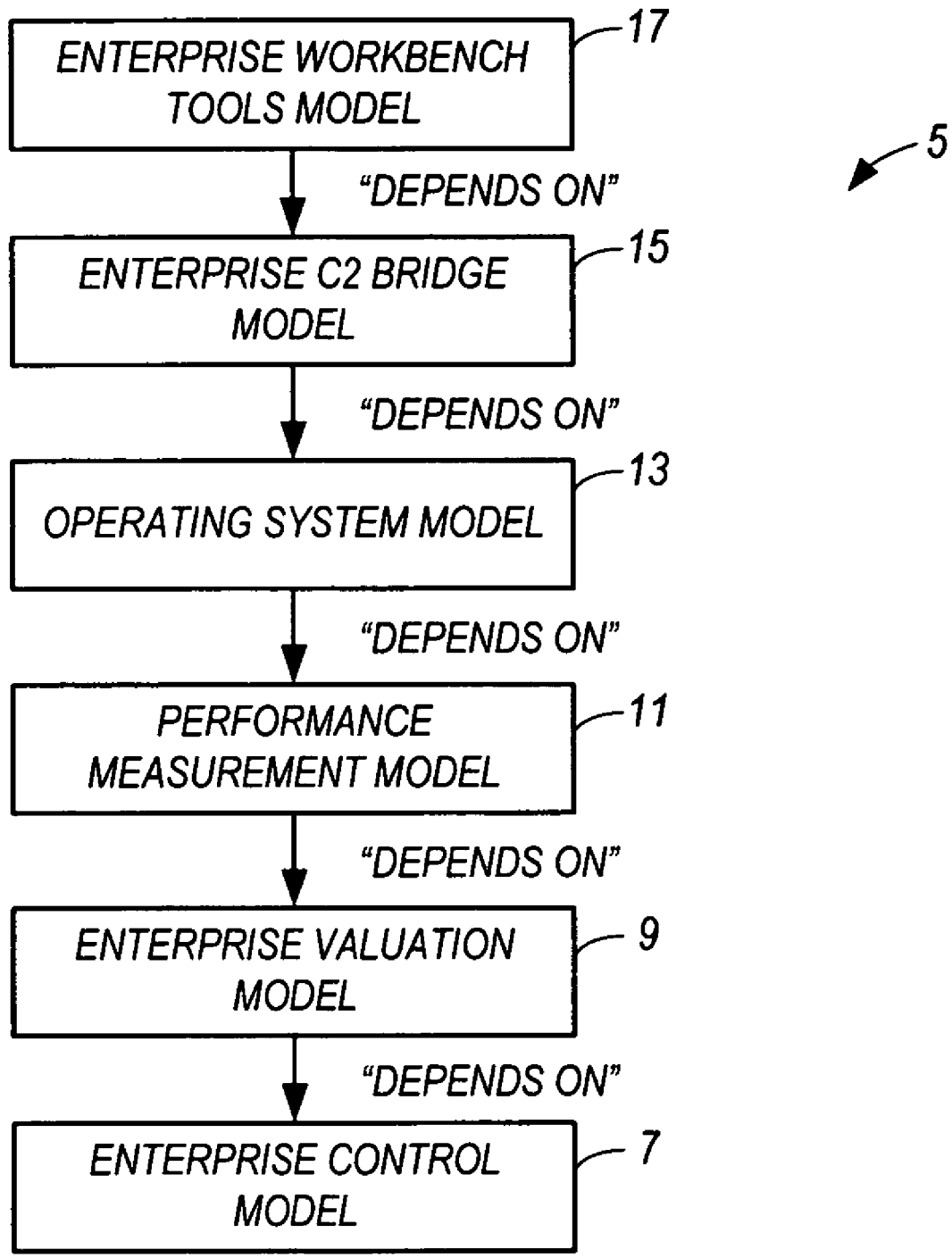
FIG. 1 is a schematic of logical components used in embodiments of the invention and their dependency on one another.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Before describing embodiments of the invention in detail, definitions of certain terms are provided.

As used herein, an "enterprise" is defined as an arbitrary interactive unit of an organization (noun) or work (verb) for systematically creating measurable value through the delivery of a product or service. ("Value" is defined below.) An enterprise can range in size from small-scale manufacturing cells (e.g., bio-chemical or electro-mechanical) in a production line to cooperation among large-scale national or international, public or private sector entities. Enterprises may interact with one another through or be involved in development and exploitation of value chains. The value chains may include supply chains along which products and services are consumed and produced, and asset chains along which investment assets are produced and consumed.

"Investments" may take the form of capital, matter, or energy. Enterprises that effectively participate in supply and asset chains rely on well-defined interfaces through which information (data) and control (execution threads) pass between and among enterprise neighbors along the two chains.

The core or nuclei of an enterprise that is responsible for creating and sustaining its value proposition(s) is referred to herein as a value production unit ("VPU"). A viable enterprise, then, is a continuous and sustainable computation of one or more value propositions within its contained VPU objects. In this context, "enterprise engineering" is the science and discipline of designing, deploying, adapting, and maintaining federations of VPUs. "Enterprise management and control" is the process (profession) of governing such federations.

"Enterprise value production" is the act of converting assets (e.g., men and material) into returns, and of effectively utilizing these assets to meet customer demands for goods and services.

An enterprise (including its systems, processes, and threads) operates in "real-time" to the extent that timeliness is an intrinsic aspect of its correct behavior. Therefore, an enterprise, regardless of size, operates in real-time to the extent that it meets its timing (e.g., deadline) requirements. Operating in real-time is not the same as operating "on-line," or "seen through a web page," or operating "real fast." Timing issues embodied in requirements for deadlines, response times, timeframes, or time constraints are typically application-dependent. They are not simply functions of bureaucratic latencies, network bandwidths, processor speeds, or which browser, server, or network programming language one uses to create a man-machine or user interface. (Although these things may impact process timing, they do not provide methods to actually manage the resources needed to meet timing requirements.)

A system is "distributed" to the extent that its execution (e.g., threads, transactions, and messages) must pass through, or is required to complete one or more tasks within multiple "nodes." A "node" is defined as a uniquely identifiable or named (e.g., with an IP address) computational object. An enterprise consisting of joint military services, regionally deployed divisions, and collections of theater assets is multi-node. Likewise, a commercial enterprise comprising business areas, business units, production plants, and production units is multi-node. Management command and control decisions that must engage resources at two or more nodes are multi-node. A distributed enterprise is real-time to the extent that its management controls must meet end-to-end timeliness requirements as they propagate from node to node. Meeting such end-to-end timing requirements requires distributed real-time resource management policies and mechanisms.

"Timeliness" is a measure of two aspects of an enterprise or object: first, how well time constraints are met, individually and in ensemble; and, second, how well one can successfully predict meeting those constraints. In accordance with the teachings herein, it is preferred that a real-time enterprise provide its internal and external clients (e.g., suppliers, investors, customers, and subordinates) with means to express time constraints for the execution of specific tasks (e.g., project duration or completion milestone date, or order fulfillment date). Deadlines are a familiar, albeit simple, example of a time constraint. Other examples are provided herein.

"Predictability" is the ability to plan; to know á priori, with a specified level of certainty, the degree to which a system will meet its timing requirements. The predictability of an enterprise may depend on effective "resource management." "Resource management" may involve partitioning complex systems and consigning resources and their administration to semi-autonomous entities within an enterprise. Realizing a real-time enterprise generally requires objectifying its resources, effectively automating and distributing resource management, and requiring distributed resources to actively assist in meeting application end-to-end timeliness requirements.

"End-to-end timeliness" is the acceptable execution time of the data and applications logic in a multi-node system. Achieving end-to-end timeliness may require obtaining á priori service level agreements ("SLAs") from participating nodes so they can plan to meet the agreements. Achieving end-to-end timeliness may also require dynamic resource management (e.g., in response to failure) within each node to make best efforts to meet the time constraints under current conditions, or to assist downstream nodes with information useful in re-planning.

"Current conditions" are statements about the capacity available on a given node (i.e., its instantaneous capability) to meet its SLA commitments given the status of available resources (raw materials, processing power, manpower, etc.). The extent to which a multi-node enterprise system can achieve its end-to-end timing obligations is dependent, at least in part, on the resources and resource management policies that are available at each participating node at any given time. Since each node in a sequence may introduce statistical variation in its ability to meet its obligations (e.g., completion times that are sometimes late, sometimes early, or sometimes fail), SLAs and corresponding execution time status should be propagated to node resource managers to ensure proper operation of certain embodiments of the invention.

A "federation" is two or more freely cooperating enterprises.

As used in connection with "enterprise organization," the term "organization" refers to static accountability hierarchies typically used in referring to enterprise command structure for managing production units (or processes) in production areas, areas in plants, plants in business units, business units in business areas (divisions), and business areas in corporations. "Levels of control," on the other hand, refers to the dynamic structure of an enterprise, the manner and means of acquiring and then administering valuable resources throughout an enterprise on behalf of distributed production objectives.

In relation to enterprise operations, the concept of "control" has several connotations. Loosely defined it means the management or regulation of a process or set of correlated processes. Control may be further classified by its degree of automation and by the degree of its independence, or conversely, its role in a collaborative framework.

Control activities include behavior generation and final control actuation. Control is the means by which the process under control is driven to its next-state conditions.

"Command and Control" or "C2" are the policies and mechanisms for exercising real-time authority and direction over interconnected and interdependent assets through a set of protocols and shared value propositions, while functioning in a collaborative and interactive (or network-centric) community governed by a formal hierarchical accountability structure.

The function of C2 of a given process is to sense (measure) the process parameters; assimilate and assess those measurements in the context of history and current process states; update existing process models; generate appropriate next-state control behaviors; and issue commands to process actuators (final control devices). In addition, for intelligent control systems, the C2 model includes a function called value judgment that supports adaptive controls capable of adjusting default sensory perception and behavior generation capabilities.

"Measurement" generally entails the activation of sensors appropriate to the task of determining the present state of a process. Typically, there are sensors for various parameters, and often multiple sensors for the same class of measurement. The result of measurement is a data set containing records of the form:

measurement = {sensor_id, measurement_value, measurement_time_stamp, measurement_quality}

Sensors may operate synchronously (e.g., polled) or asynchronously (e.g., publish-subscribe) with respect to the sensory perception processes that lead to timely behavior generation and subsequent control. Measurement systems must operate in timeframes that correspond to the basic cyclic behavior of the processes under control. A basic engineering principle (the Nyquist Principle) dictates that, for process observability and controllability, measurement-sampling rates must be at least twice the fundamental frequency of the process.

"Situation assessment" is the process of assimilating the process measurements in order to determine the current state of the process. This may entail filtering, smoothing, and parameter estimation of the data sets. It may require the correlation of several data sets in order to determine the quality of the data sets themselves, perhaps adding compensation to sensor data to correct sensor errors.

"Planning and execution" contains model building and behavior generation activities, and for intelligent control systems, value judgment services. This set of activities is responsible for manipulating the policies and mechanisms that directly affect asset utilization. This is the domain of three echelons (discussed below): 5-4-3.

As it relates to certain models and methods presented herein, "value" is defined as the difference between the marginal cost ($C_s$) incurred by the supplier of a product or service and the benefit ($B_c$) perceived by its consumer, or $V_{sc} = B_c - C_s$.

Thus, value is a relative measure, defining a gradient or potential difference between the two participants. This gradient, once above a certain minimum threshold ($V_{sc}^{min}$), is sufficient to power the flow of goods and services in one direction, and compensation (e.g., barter, money, etc.) in the opposite direction.

The volume of this flow is proportional to the stability of this gradient over time. Stable potentials allow the two participants to establish internal processes capable of sustaining (or regulating) the flows to meet their other operating requirements. Sustainable flows are an object of VPUs in achieving and maintaining homeostasis or dynamic equilibrium, which is generally required for viability.

"Value production" is a process, and as such it is governed by policies and procedures, depends on available fixed production assets, requires availability of consumable resources (i.e., raw materials), and produces by-products (e.g., side effects or waste). The process of value creation is typically distributed, involving participation from elements within and among cooperating systems. Furthermore, within a given system there may be many such processes, each addressing a different set of goals and objectives, some strategic, some operational, and some tactical. It is extended and assumed that within a given federation the core value production processes can be identified. The model of value production used in many embodiments of the invention is a VPU.

In any given system, value production takes place in each of three primary types of activities: strategic processes, operational processes, and tactical processes. Strategic processes involve long-term goals and objectives. Non-existent or poor-quality strategic initiatives can undermine the vitality and viability of value production. Operational processes involve the effective execution of goals and plans and coordination of tactical processes. Poor operational performance can halt or reverse value creation. Tactical processes involve actual value production through production processes.

FIG. 1 illustrates a simplified architecture of a multi-level command and control or management system 5 that may be implemented using the teachings herein. The system 5 has a first or enterprise control level 7 that is based upon an enterprise control model or "ecm"). As will be discussed in greater detail below, the ecm is a recursive (scale-free) model that may be used throughout an enterprise and in a system of enterprises. An enterprise controller built according to the ecm includes five echelons: 1 (production process controller), 2 (regulatory controller), 3* (audit controller), 3 (operations controller), 4 (development (planning) controller), and 5 (supervisory controller).

The system 5 includes a second or enterprise valuation level 9 that depends on the enterprise control level 7. The enterprise valuation level provides the definition of a VPU (discussed in greater detail below). The system 5 also includes a performance measurement level 11 that provides multiple performance measurement tools (discussed below). Three other levels define the remainder of the system 5: an operating system level 13, a enterprise command and control level 15, and an enterprise workbench level 17. As indicated in the drawings, each subsequently higher level depends on the level below it (for example Level 15 depends on level 13).

Figure 2:
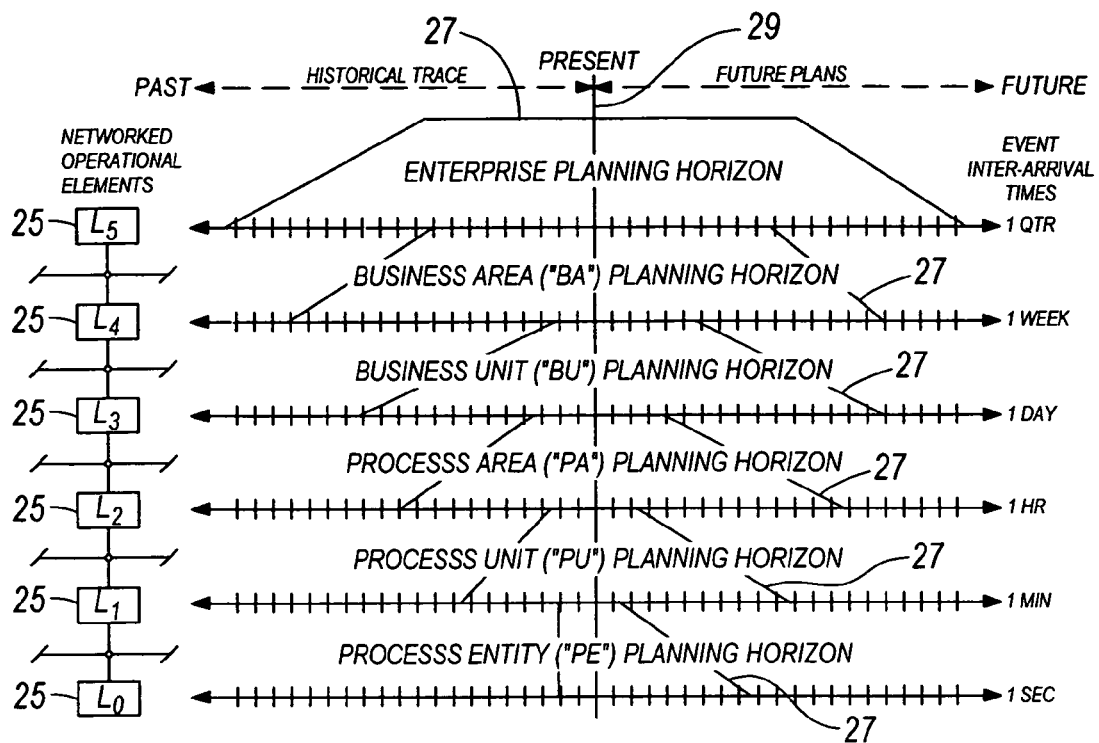
FIG. 2 illustrates a networked group of controllable process elements in enterprises governed by accountability hierarchies.

FIG. 2 illustrates a group of controllable processes 25 arranged in a hierarchy with six levels ($L_0$-$L_5$). At each level are unfolding trajectories 27 of the processes 25, including histories left of a center axis 29, and forward plans to the right of the axis 29. The model in FIG. 2 addresses levels of control and time: two aspects that while known are not addressed in most command and control management systems adequately or at all.

As will be discussed in greater detail below, the command and control methods and systems disclosed provide management user interfaces, or an "enterprise bridge." The term comes from the role the bridge provides as a focus of command and control for the captain and officers of large ocean-going vessels, a role similar to that of the cockpit or flight deck in an aircraft or spaceship. The idea is that management and control is most effectively exercised when the human elements are immersed in an interactive environment providing real-time, integrated, and context dependent automation and control systems. Certain of the exemplary command and control methods and systems disclosed provide 1. Nested, enterprise-operational-system elements that span low-level activities ($L_0$) up through high-level, enterprise-wide activities ($L_5$);
2. Data acquisition (or measurement feeds) from grid-connected or networked enterprise information systems;
3. Data analysis (or filtering) based on context and objectives;
4. Performance measurement tools (or index functions) for evaluating individual and composite performance of enterprise elements in a context neutral (or generalized) way;
5. Historian services for following behavior as a function of time, to support simulation and analysis, and to allow for tracking of event and sequence causality;
6. Report generators for periodic and event-driven documentation;
7. Enterprise system modelers for simulating scenarios and analyzing performance; and
8. Interactive user interfaces for the highest level of command of each process, including the process supervisor (e.g., commander), process developer (e.g., planner), and process operator (e.g., XO). The user interfaces are driven by a display generator that dynamically, based on context, provides a shared "knowledge wall" and individual C2 displays for the three senior process officers.

Figure 3:
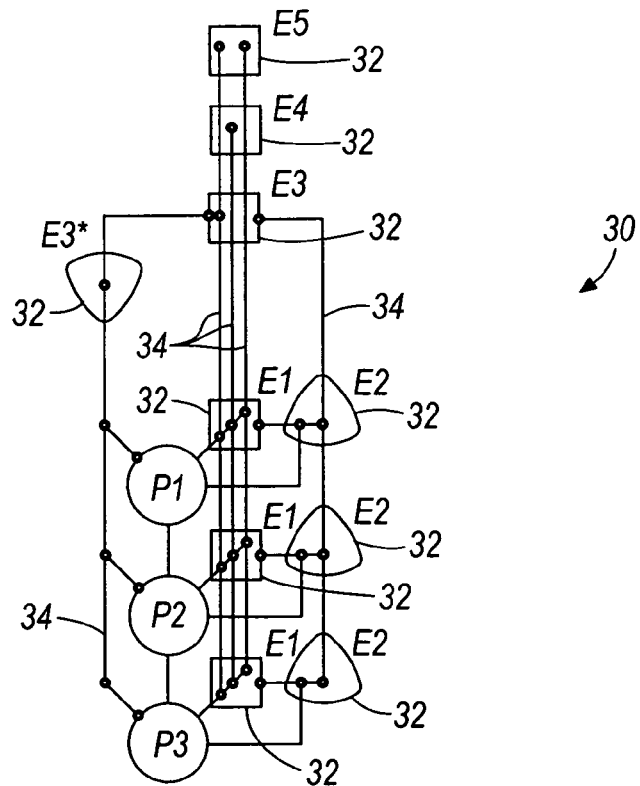
FIG. 3 illustrates an enterprise control model of one embodiment of the invention.

FIG. 3 illustrates a control model 30 for a value production system. There are two major features of the control model 30: entities (classes or objects) of value creation 32 and an architecture of adaptive decision and control that is represented, in part, by connections or links 34 (which may represent regulatory control loops) between the entities 32. Taken together these two features establish requirements for an enterprise operating system ("EOS"), discussed in greater detail below. The EOS provides a distributed real-time execution environment (i.e., virtual enterprise machine) for hosting command and control applications.

Figure 4:
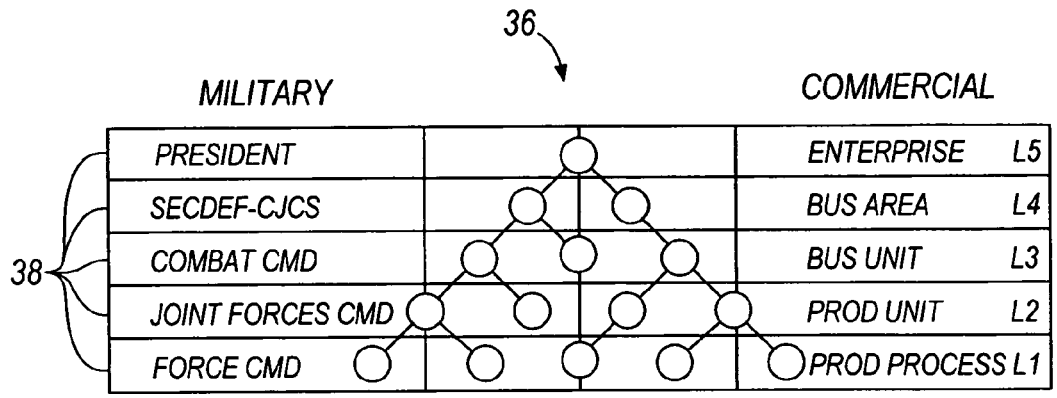
FIG. 4 illustrates an exemplary enterprise structure having five levels and applied to both a military and a commercial enterprise.

FIG. 4 illustrates a hypothetical multi-divisional enterprise structure 36 having five organizational levels 38. A given enterprise may be more or less complex and have more or less levels. Further, the levels may be referred to using different terminology. FIG. 3 contrasts terminology used in the U.S. military's global command system ("GCS") architecture and terminology used in a typical commercial or private business hierarchy.

Each level 38 serves to define the resources (production policies and assets) it encapsulates, its peer entities, the sources of its investments (authority) above, and its subordinate entities below. In the example provided, policy and assets flow downward, and returns and assets deployed (or results) flow upwards. Net value production, however, is not directly represented, being the byproduct of a complex and dynamic set of relationships carried out throughout the hierarchy.

As suggested above, value chains typically comprise a web of relationships among internal and external entities that reside at different levels in their respective enterprises. Furthermore, such webs are often fluid, dynamically established and destroyed as situations evolve, as customer demand comes and goes, and technologies evolve, or as assets are produced and consumed. Accordingly, an enterprise organization has two characters—one static, one dynamic. The structure 36 depicts only the static organization of an enterprise.

To characterize an enterprise's dynamic structure, embodiments of the invention rely on classes, or echelons, of control. Classes or echelons of control are regulatory (i.e., reflexive feedback) mechanisms needed to ally and coordinate VPUs that participate in distributed real-time computations. FIG. 3 depicts five echelons of control (1, 2, 3, 4, and 5) in the enterprise control model 30. As depicted, the model 30 has three production processes (P1, P2, and P3). Each echelon of control has one or more associated classes or objects (E1, E2, E3, E4, and E5 or generically an entity 32). There is also an object E3*, which will be discussed below.

In the example illustrated, each of the three E1 classes or objects encapsulates one of the production process P1, P2, and P3. The E2 objects represent process controllers or directors. The E3 object represents the operations directorate responsible for coordination of the processes vis-à-vis overall enterprise objectives and available shared assets. The E3 object acts as an autonomic control center that provides a source of homeostasis. The E4 object provides planning and development functions, coupling volition above to autonomic behavior below, and striving to move the enterprise forward as a whole, guiding the allocation of its strategic assets between operational and development imperatives. The E5 object represents the governing or executive "board" functions, providing supervisory or "conscious" control (volition) over the enterprise.

In the embodiment shown, the enterprise control model 30 has its foundation in industrial dynamics and management cybernetics. These fields are generally directed to defining an enterprise as an observable and controllable process. Efforts based on these principles resulted in the introduction of a model of survivable ("viable") systems. Research into viable systems has focused on lessons from natural systems, and their organization and mechanisms for learning and adaptation in evolving contexts.

According to the viable system model ("VSM"), planning on the basis of actuality is "programming." Planning on the basis of capability is "operations," as is management by objectives ("MBO"). Planning on the basis of potentiality is "strategic," or normative. In this sense, controller classes E1 and E2 provide programming; classes E3 and E3* provide operations; and classes E5 and E4 provide normative controls. E1 objects are directors (a.k.a., commanders or mangers) of the processes under control ("PUC"). Processes are where the work of the VPU (or entity 32) is done, and where autonomy should exist, because the processes generally require adaptation and reactivity to the environments they serve. As a consequence, the management at echelon 1 is important to the local success of the system. The collective performance of E1 processes constitutes the actual performance of the system.

E2 objects are generally needed when there is more than one E1 object. E2 objects provide a means of synchronizing multiple parallel processes. Synchronization deals with coordination of shared resources, and with prevention of oscillatory or deadlocked behaviors. E2 controls, are therefore, regulatory in nature, and exist outside of self-serving E1 prerogatives. As noted, E3 objects are focused on operations, the execution of current plans, and the management of resources shared among the E1 processes. E3 objects are responsible for achieving the current level of capability of a system.

The E3* echelon or object provides a semi-independent audit function for E3 operations. An audit function provides a process neutral assessment of the actual performance of the E1 processes as an aid to the E3 object in its interrelated roles of managing capability and efficient utilization of resources. The E4 planning and development class is responsible for looking at the environment within which the E3 class (and its E1 processes) operates. The E4 class also develops policies and mechanisms for the continuous improvement of the system. The E4 class provides future "what-if" analyses in an attempt at reprogramming the E3-E2-E1 complex. The E4 class is the regulator of change (or adaptation) in the system.

The E5 class acts as a supervisory controller responsible for the overall mission and associated policies (doctrines) which set the goals and objectives of the enterprise. The E5 class provides the end-point for alarms and events that cannot be resolved by the E3 class in synchronizing the E1 processes. The E5 class is also the final authority for changes proposed by the E4 class.

As part of the control system, and as noted above, each E2 class regulates a corresponding process (P1, P2, and P3). For example, the processes might represent three manufacturing plants within a business unit. In this example, objects E1-E2 would then be the management staffs for each plant. Connections between E1 and E2 signify both a direct communication path as well as a specific control protocol. The goal of this control loop is local homeostasis. In addition to its E2 director, each E1 process participates in the E3 object's attempts at maintaining organic homeostasis. This may be accomplished through two antagonistic feedback control loops: the E3 object's "sympathetic" and E3 object's "parasympathetic" systems. The sympathetic system, as in animal physiology, is a reflex arc responsible for detecting sensory stimuli and generating qualified motor responses. The parasympathetic system provides an audit loop that serves to dampen high-gain processes' tendency to over-react to stimulus. It is the contention between these two control loops that enables viable systems to operate far from equilibrium, yet remain stable and highly responsive.

Figure 5:
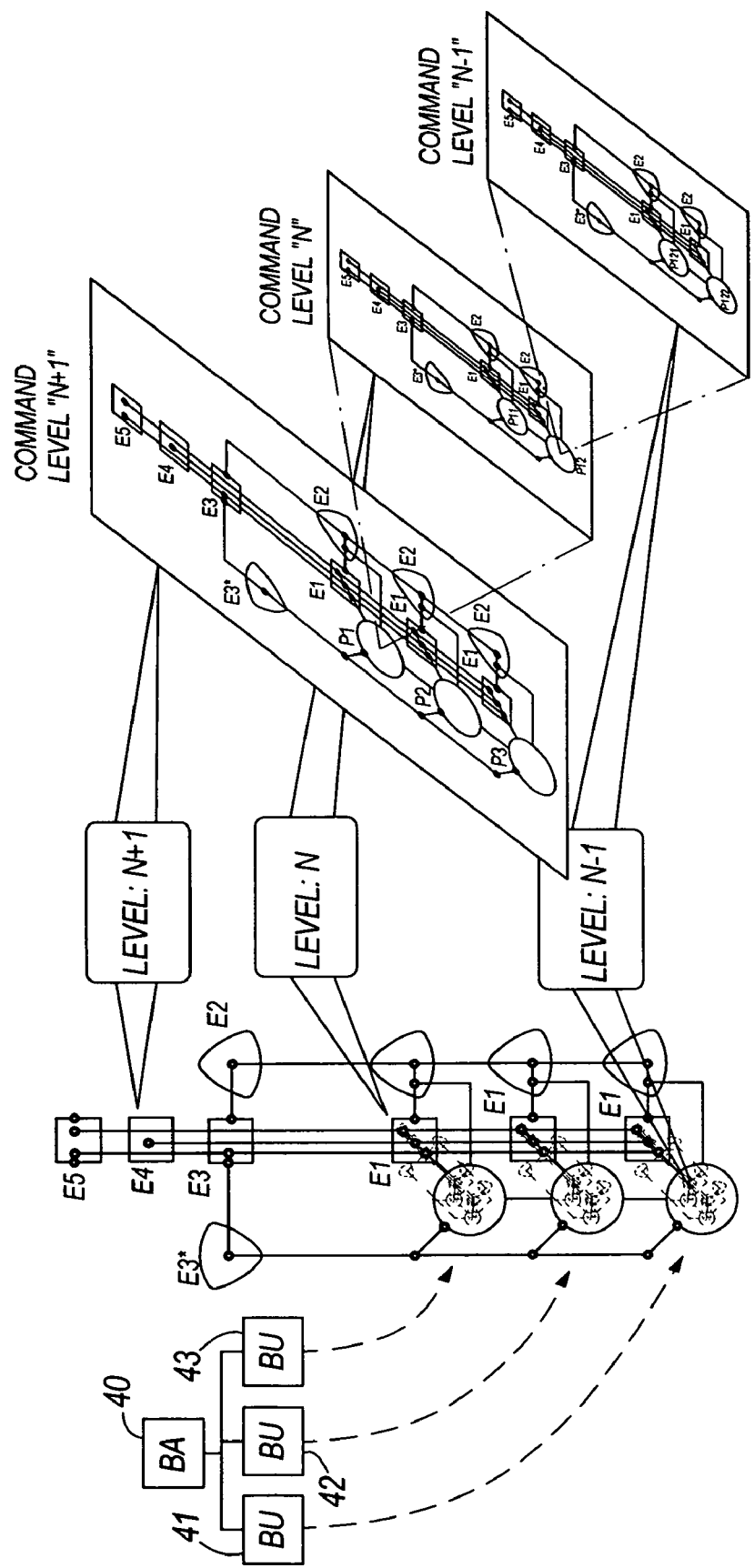
FIG. 5 illustrates an exemplary recursive control structure of a business area of an enterprise.

FIG. 5 illustrates a recursive control structure of a business area 40 of an enterprise with three business units 41, 42, and 43. Business area 40 is recursively defined in terms of its three business units (41, 42, and 43). The business units are in turn defined in terms of their embedded production areas, and so on. (For the sake simplicity further levels of detail are not shown.) The multiple tiers shown in FIG. 5 illustrate the recursive relationship among the five echelons within each enterprise domain; and how they participate as elements in viable systems below the business area 40 level (it should be understood that there could be elements above the business area 40 level too.) Thus, viable systems are coupled in two dimensions, horizontally across and vertically within the enterprise. This recursive structure works for military enterprises, as well as non-military enterprises such as healthcare providers, educational systems, and so on.

As will be explained in further detail below, the five echelon or multiple level architecture illustrated in FIG. 5 can be integrated with the VPU construct. More information regarding the integration of the VPU construct and the multi-tier or multi-level business unit or component model will be provided in the discussion of FIG. 16 (below).

Figure 6:
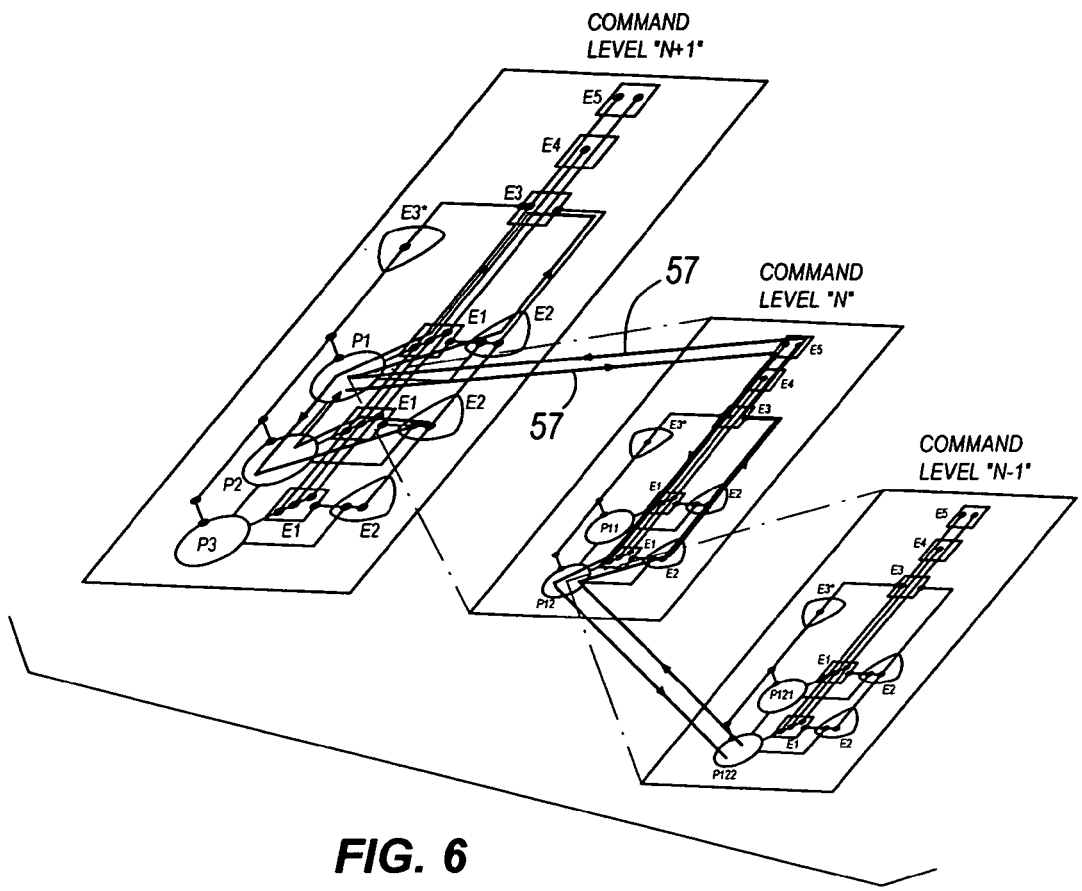
FIG. 6 illustrates end-to-end timing paths in a command structure.

FIG. 6 illustrates command threads 55 and 57 as they wend their way through the command structure. The performance of the threads 55 and 57 effects enterprise dynamics, and is therefore important to enterprise management. As used herein threads are defined by the invocation of resources as they are brought to bear on the demands of a system. Threads may have both horizontal and vertical dimensions in the sense that they may follow resources within echelons of one level of an enterprise and may flow from one level to another. Proper performance of threads help ensure end-to-end timeliness, end-to-end reliability, continuity of nested relations, and federation control.

In summary, the business unit model proposed and illustrated in FIGS. 3, 4, 5, and 6 separates the conscious (E5-E4) controls from the more autonomic (E3-E2-E1) controls of an enterprise. The linkage at E4-E3 provides a router or router-like mechanism that filters and switches commands and assets flowing downwards and operational information flowing upwards.

The implementation of a C2 system for managing behavior in the enterprise using the model shown in FIG. 3 requires a platform, or virtual machine, on which to instantiate applications providing the embedded distributed real-time control policies. Further discussion of such a platform in the form of an EOS, is provided herein.

Figure 7:
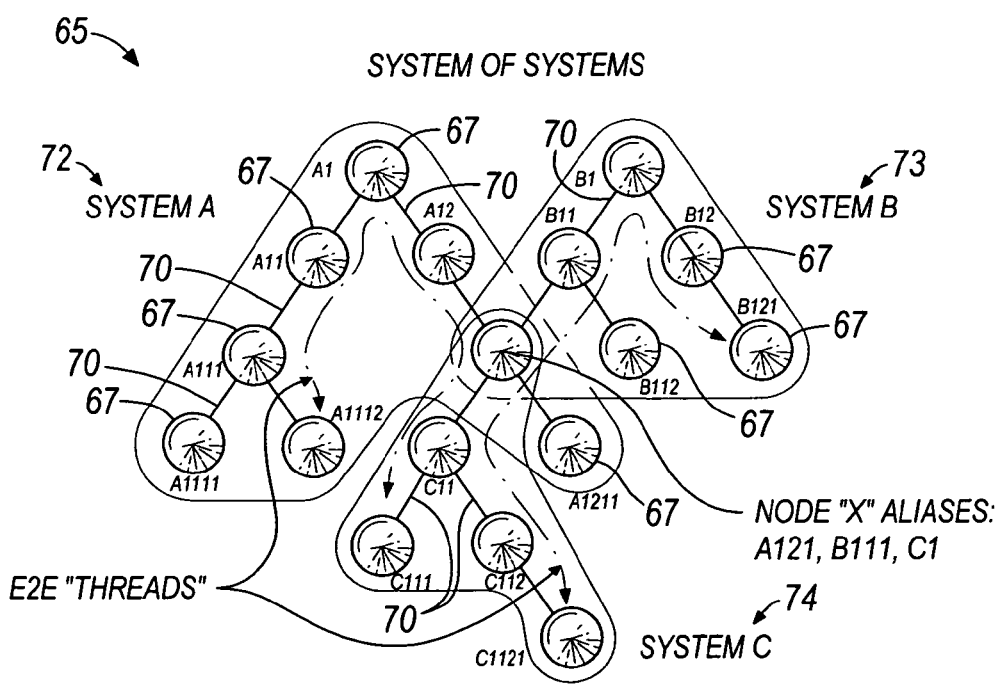
FIG. 7 is a graphical representation of behavior in a system of enterprise systems.

Before discussing the EOS and other components used in certain methods and systems of the invention, the behavior of federated enterprise systems is discussed. FIG. 7 provides an illustration of system behavior in the form of a graph 65. The graph 65 includes nodes 67 (vertices) which are processing elements (processes). The nodes 67 are interconnected by arcs 70 (communications links). A set of graphs can be used to model a given system and to represent behaviors of interest (i.e., scenarios) under various operating regimes (i.e., requirements), and therefore form the basis for defining the syntax and semantics of the system itself. The example provided in FIG. 7 represents a particular (instantaneous) configuration of nodes and links for three interconnected systems 72, 73, and 74 (labeled A, B, and C). Enterprise-to-enterprise threads 76 connect the systems 72, 73, and 74.

A given node 67 (also identified as "x" in FIG. 7) may in fact be a member of two or more such enterprises (graphs) simultaneously. In such cases, the semantics of node "x" vary in relation to each system in which it is embedded. This leads to potential ambiguity in interpreting its behavior by a single thread, or by, for example, computational intelligence ("CI") analysis that is not "context sensitive." This issue is more important when systems, under the pressures of their local dynamics, evolve or adapt. If node "x" were an element of such an adaptive subsystem, an observer of its behaviors in each of the systems it populates would see different measures of its performance, and the differences would fluctuate over time and operating conditions. As will be discussed in greater detail, embodiments of the invention provide mechanisms for measuring performance for such elements.

Figure 8:
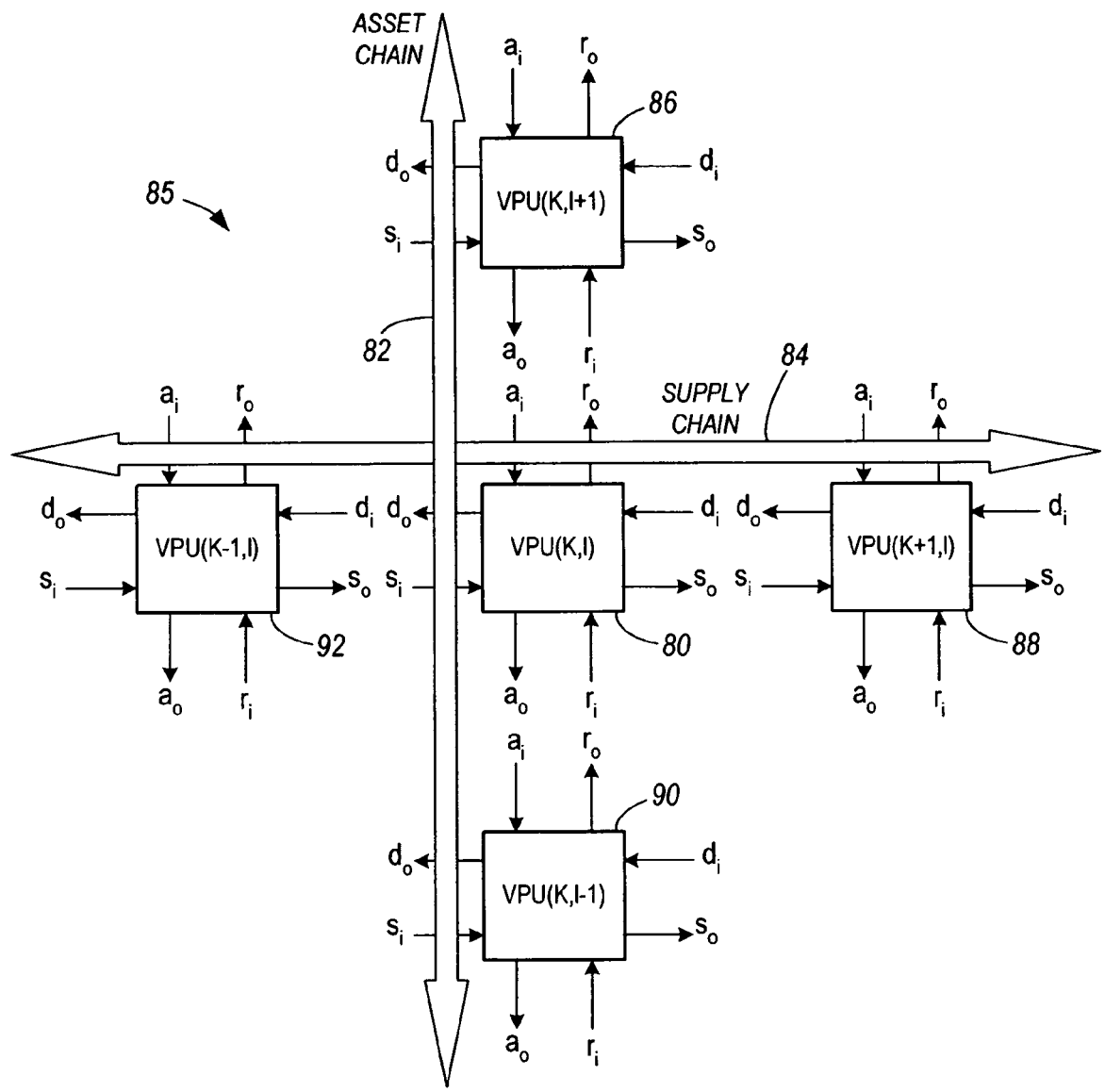
FIG. 8 is an illustration of value production units in an asset-chain and supply-chain grid.

A VPU 80 is shown in FIG. 8. The VPU 80 participates in an asset chain 82 (shown along a vertical axis) and serves its investors or suppliers of assets. The VPU 80 also participates in a supply chain 84 (shown along a horizontal axis) and serves its customers or consumers of products or services. The asset chain 82 and supply chain 84 form a grid or lattice 85. A given enterprise may include one or more VPUs and FIG. 8 illustrates a number of VPUs (86, 88, 90, and 92) connected to the VPU 80 through either the asset chain 82 or supply chain 84.

Each VPU (80, 86, 88, 90, and 92) supports its asset and supply chains through four full-duplex ports or information inlets and outlets. The ports are illustrated as eight communications ports, but could be implemented in a variety of ways. Each VPU could be readily constructed as a software object and the ports could be implemented as methods or other similar mechanisms (e.g., procedure or function calls and returns) that provide a mechanism of communicating information to and from devices or logical constructs. The ports used in one embodiment are defined in Table 1 below. Investors provide assets at port $a_i$ (assets-in) that subsequently yield investment returns on port $r_o$ (returns-out). Customers provide demands for goods or services on port $d_i$ (demand-in) that are fulfilled on port $s_o$ (supply-out).

TABLE 1

| Port ID | Name | Port Function (Protocol) |
|---|---|---|
| ao | Assets_out | Send to subordinate requested production assets |
| ai | Assets_in | Receive from superior requested production assets |
| ro | Returns_out | Send to superior returns generated from assets deployed |
| ri | Returns_in | Receive from subordinate returns from assets deployed |
| do | Demand_out | Send to supplier demand for "raw material" |
| di | Demand_in | Receive from client demand for supply |
| so | Supply_out | Send to client fulfillment of demand |
| si | Supply_in | Receive from supplier fulfillment of demand |

Although, not shown, it is to be understood that each port may service multiple "connections," supporting the VPU's simultaneous participation in several supply and asset chains. The multiplicity of connections on an input port is called its "fan-in" and on an output port its "fan-out."

A VPU supports two subsidiary channels, one for subordinate VPUs (typically for intellectual property generation), and one for supplier VPUs (typically for material stocks.) Subordinate VPUs are allocated investment assets on port $a_o$ (assets-out) that generate returns on port $r_i$ (returns-in). Supplier VPUs receive their demands on port $d_o$ (demand-out) and return their production on port $s_i$ (supply-in).

Each VPU is uniquely identified (i.e., named) by its location vertically and horizontally in the grid 85, as is illustrated using coordinate subscripts k and l. Thus, $VPU_{k,l}$ (or 80) is subservient in the asset chain 82 to $VPU_{k,l+1}$, (or 86) and is a supplier to $VPU_{k+1,l}$ (or 88) in the supply chain 84. A VPU acts as a virtual machine (an "actor") whose behavior, governed by a "program," is the continuous execution of the system's value proposition(s). Value propositions comprise the VPU's logic that governs actions ("methods") that carry out the strategic, operational, and tactical goals and objectives that add value to the environment (commons) within which the system functions.

Value propositions may take the form of the statement
if <condition> then <action$_1$>, else <action$_2$>.

Where "action" defines a step in a value production sequence, and "condition" tests for the presence or absence of required production assets, consumable resources, or production side effects.

VPUs may also process (i.e., produce and respond to) asynchronous "events." The constructs for event posting and notification are, respectively post: signal <event>
catch: on <event> do <action>

Having at least one VPU present in multiple systems defines a family of systems, sharing a set of value propositions carried in the "DNA" or fundamental structures of the common VPUs.

Figure 9:
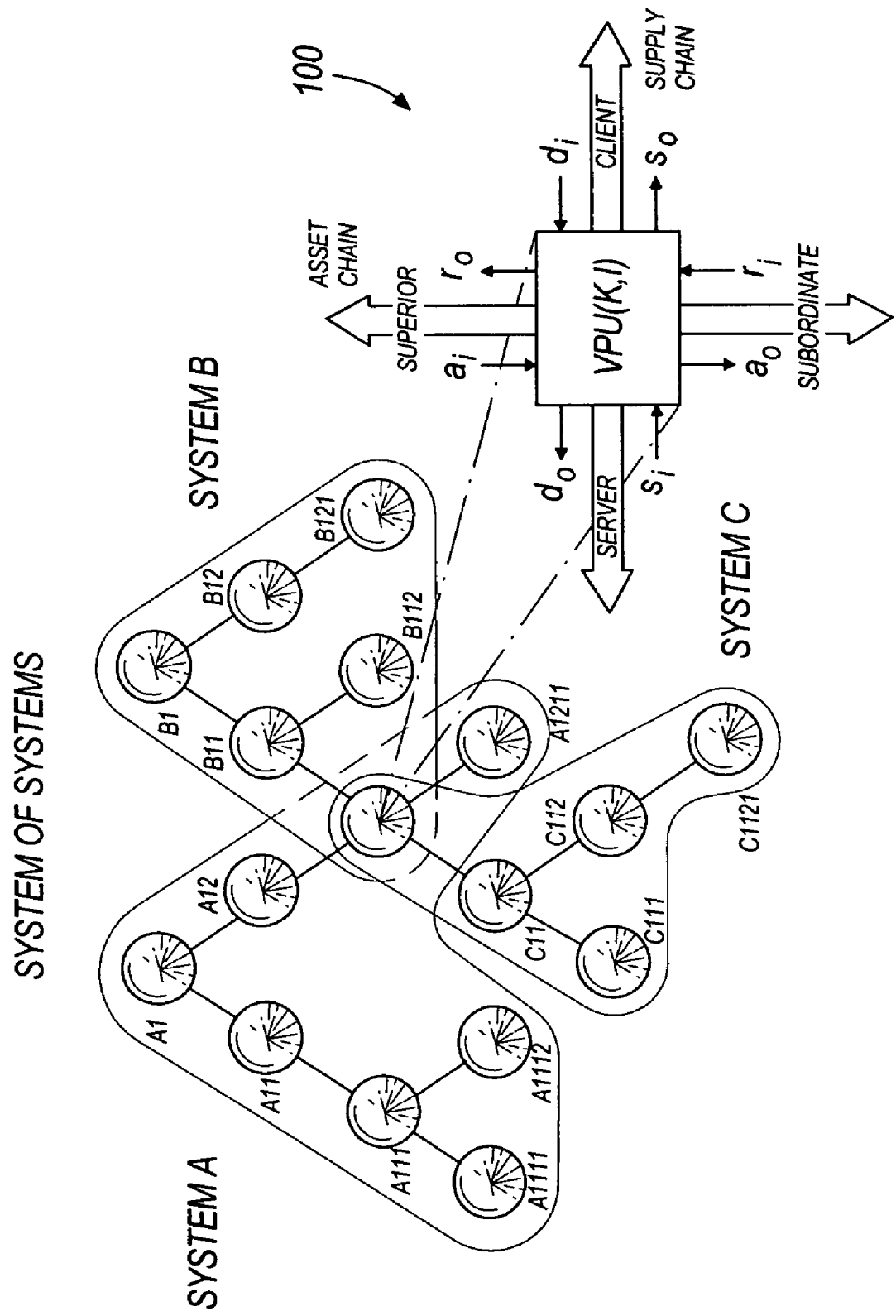
FIG. 9 is an illustration of how a value production unit may represent a node in a system of systems.

FIG. 9 illustrates how a VPU 100 interacts in a system of systems. The VPU 100 is the most superior unit in system C, is the most subordinate unit in system B, and is an intermediate unit in system A.

The generalized and symmetric structure of the VPU model allows for the creation of arbitrarily complex webs of relationships. The lattice or grid 85 may be configured to model VPUs representing levels ($L_0$-$L_n$) of the vertical asset chain 82, and multiple levels in the supply chain 84.

Figure 10:
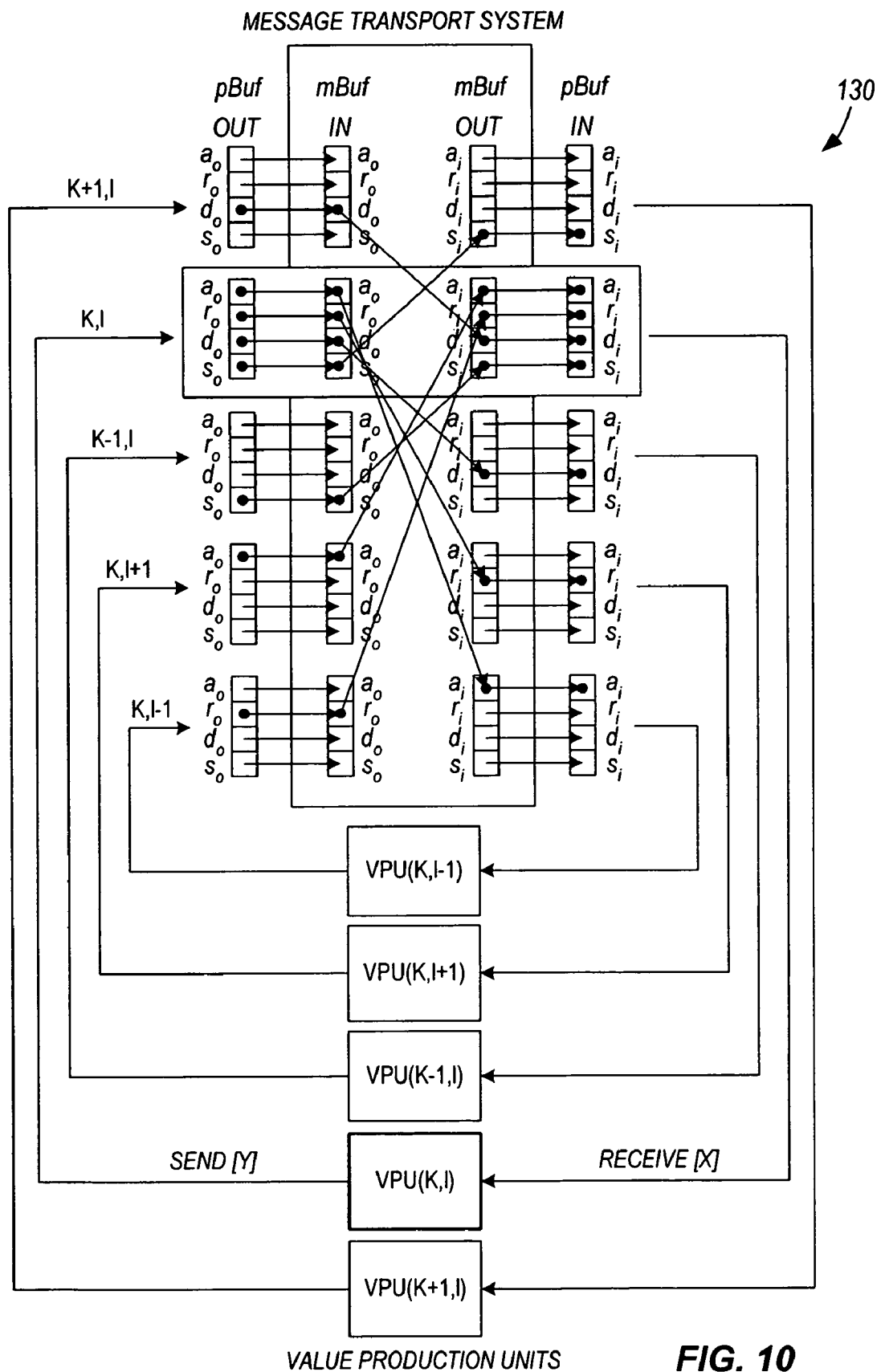
FIG. 10 is an illustration of how VPU's communicate within a lattice of systems of systems ("SOS") using a feedback mechanism in the form of an intra-lattice router.

The connections among VPUs are assumed to be dynamic, meaning that they are established and broken as the enterprise or federation operates. To support this dynamic feature, a transport system 130 (FIG. 10) capable of binding the ports of VPUs is provided. The transport system may be a mechanism similar to a telephone exchange or Internet router. With the services of the transport system 130, the asset and supply chains may be interconnected and dynamics may be investigated.

Figure 11:
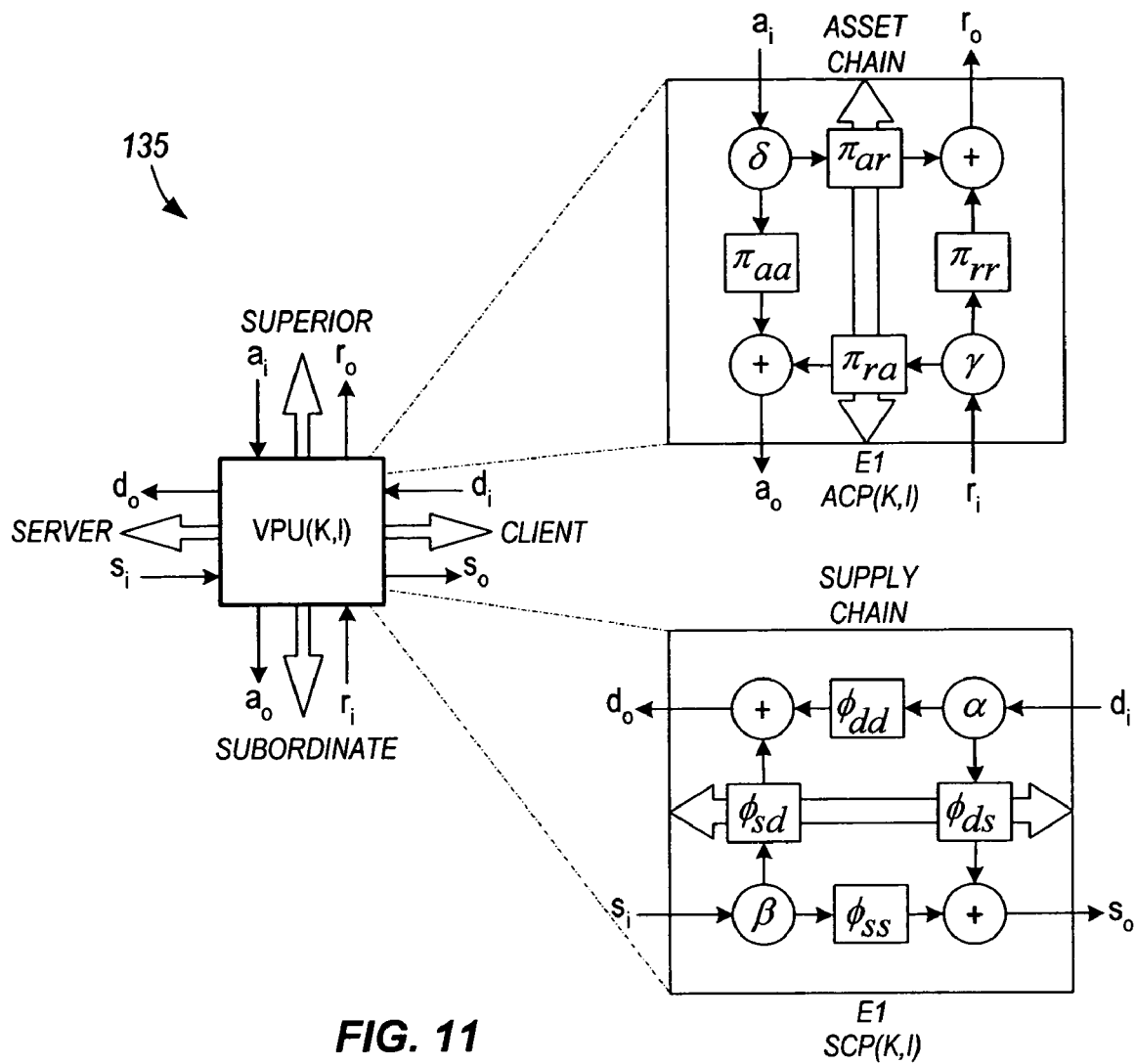
FIG. 11 is a first model of VPU behavior.

FIGS. 11 and 13, illustrate two examples of VPU production functions or models, a model 135 representing a generalized mass-flow production system, and a model 140 representing a generalized micro-economic financial system.

The model 135 defines asset chain and supply chain transformation functions. In the asset chain dimension, the flows are governed by four internal functions ($\pi_{aa}$, $\pi_{ar}$, $\pi_{ra}$, and $\pi_{rr}$) and two internal routing parameters ($\delta$ and $\gamma$). The interpretation of these functions and parameters, as well as those for the supply chain, are defined in Table 2.

TABLE 2

| | Asset Chain Definitions |
|---|---|
| $\pi_{aa}$ | Asset allocation function to subordinate VPUs |
| $\pi_{ar}$ | Asset allocation function to generate additional internal capacity |
| $\pi_{ra}$ | Asset return allocation function to generate reinvestment in subordinate VPUs |
| $\pi_{rr}$ | Asset return allocation function to generate additional internal capacity |
| $\delta$ | Asset allocation proportioning parameter |
| $\gamma$ | Asset return proportioning parameter |
| | Supply Chain Definitions |
| $\phi_{dd}$ | Demand allocation function to generate supplier (server) demand |
| $\phi_{ds}$ | Demand allocation function to provide fulfillment for client demand |
| $\phi_{sd}$ | Demand fulfillment allocation function to generate additional supplier demand |
| $\phi_{ss}$ | Demand fulfillment allocation function to provide fulfillment of client demand |
| $\alpha$ | Demand allocation proportioning parameter |
| $\beta$ | Demand fulfillment proportioning parameter |

Figure 12:
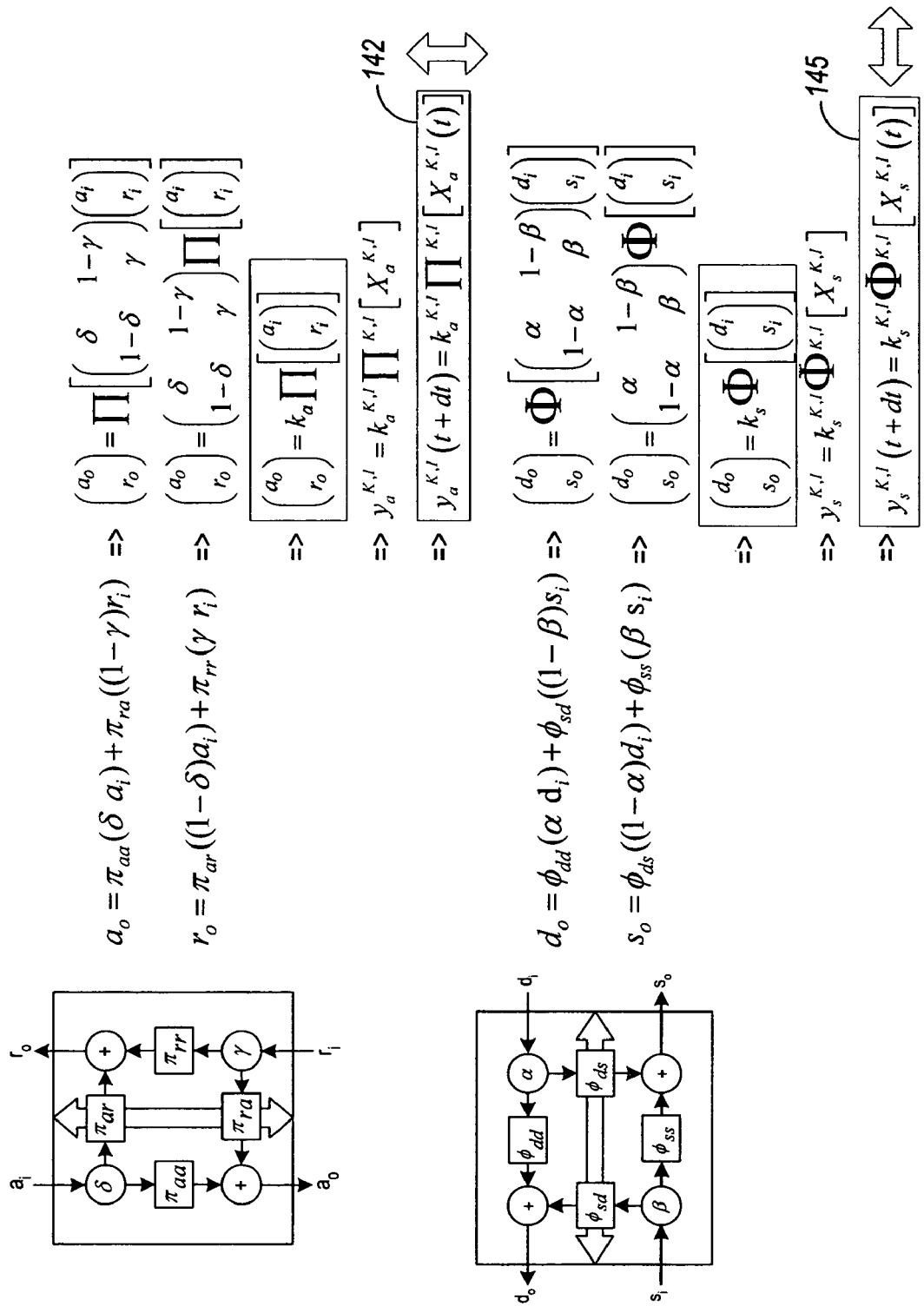
FIG. 12 is a depiction of transport functions for value production units in the first model shown in FIG. 11, where the transport function describe the mathematical relations in the first model, emphasizing production flows.

The model 135 is oriented towards an abstract enterprise concerned with value production and the flow of command and control threads. The model 135 defines a set of transport functions 142 and 144 (FIG. 12).

Figure 14:
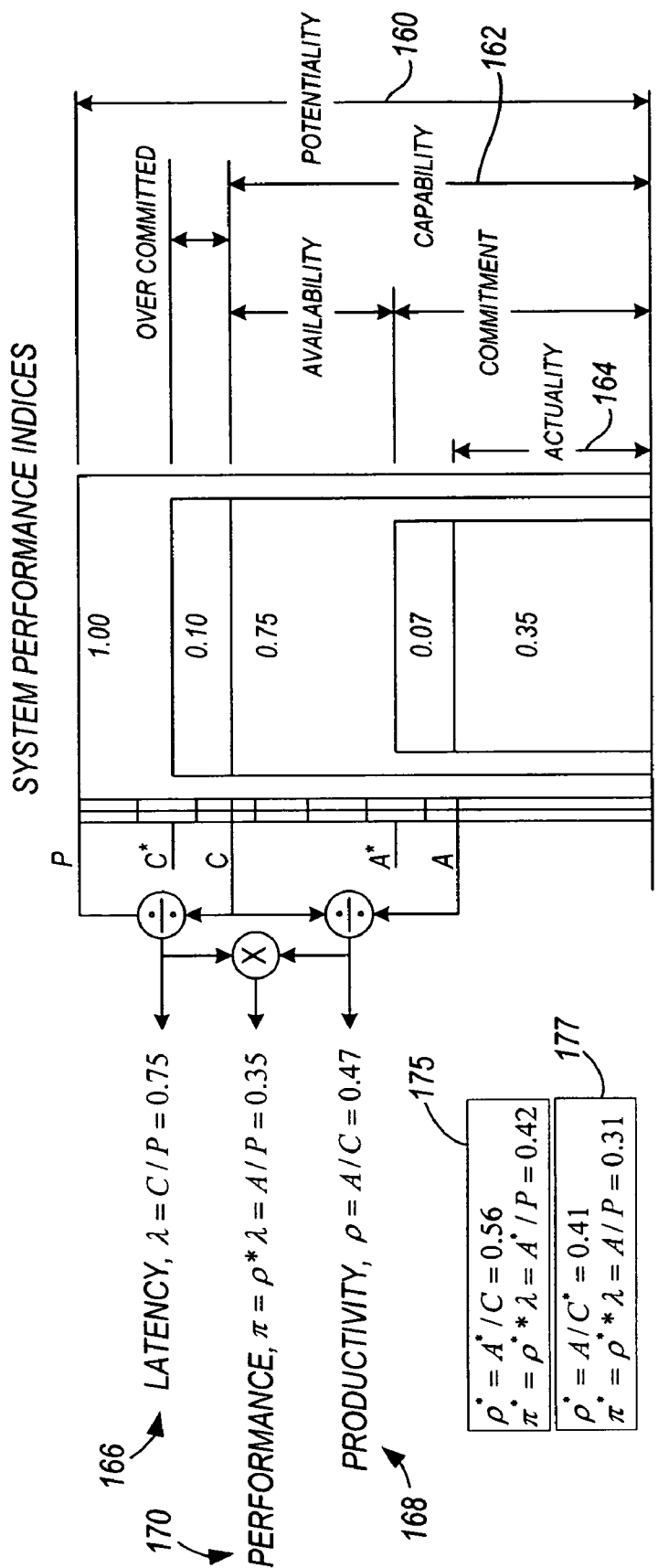
FIG. 14 is a graph of relationships among system performance indices.

Assessing system behavior requires a set of metrics. FIG. 14 illustrates six performance metrics 160 (potentiality), 162 (capability), 164 (actuality), 166 (latency), 168 (productivity), and 170 (performance). The performance metrics 160-170 are capable of evaluating the performance of value production processes in an application process-neutral way. The six metrics comprise three basic measures (160, 162, and 164) for evaluating system capacity, and three derived measures for evaluating system achievement (166, 168, and 170) towards its goals and objectives.

Potentiality (160 or P) is a system's desired capacity to do work. Potentiality is what a system ought to be able to do, all things being equal. There is, however, only a subset of the system's overall potential that is actually available for value generation, this being its capability (162 or C). Capability is what a system could do if it fully utilizes its resources. However, at any given time a system, possibly due to failures, lack of raw materials, poor processes, or labor disputes, will likely perform below its full capability. This level of performance is the system's actuality (164 or A).

In order to compare the performance of federations of independent or partially independent processes that may have widely divergent potentials, it is necessary to normalize the metrics (160, 162, and 164). In FIG. 14, the values of P, C and A have been normalized to a relative value of P ($P_{rel}$) within each system, where $P=P_{rel}/P_{rel}=1.00$ $C=C_{rel}/P_{rel}=0.75$ $A=A_{rel}/P_{rel}=0.35$ As a consequence of normalization, capability 162 and actuality 164 become percentages of potentiality 160. The derived measures for evaluating system achievement (metrics 166, 168, and 170) are derived from the normalized metrics.

The ratio of capability to potentiality is the system's latency 166 ($\lambda=C/P$), representing the amount of unused capacity (latent potential, or unutilized resources). Through operational planning and process improvements, a system may be able to raise its capability to gain incremental improvements in performance while remaining within its design (i.e., architectural) constraints.

The ratio of actuality (A) to capability (C) represents the available but unused capacity in the system. It is a measure of the system's productivity 168 ($\rho=A/C$). Through tactical programming, existing resources (assets) can be made more productive.

The ratio of actuality (A) to potentiality (P) represents the system's absolute performance 170 ($\pi=A/P$). Alternatively, performance may be computed from latency and productivity by the relationship $\pi=\lambda*\rho$. In the example of FIG. 14, the following achievement indices are derived from the basic metrics P, C and A: $\lambda=0.75$, $\rho=0.47$, $\pi=0.35$.

Two alternate scenarios 175 and 177 are also presented in FIG. 14. In scenario 175, an increase in A of 0.07 (A*=0.42) results in a significant increase in productivity 168, from $\rho=0.47$ to $\rho*=0.56$. There is a corresponding rise in performance 170, from $\pi=0.35$ to $\pi*=0.42$.

In scenario 177, actuality 164 remains at 0.35 while capability 162 is raised from C=0.75 to C*=0.85. There is an expected drop in productivity 168, from $\rho=0.47$ to $\rho*=0.41$, and there is a somewhat counter-intuitive drop in performance 170, from $\pi=0.35$ to $\pi*=0.31$. The alternative scenario 177 illustrates that problems can occur if a balance is not achieved and maintained between potentiality 160, capability 162, and actuality 164.

In addition to the scenarios 175 and 177, it is possible that commitments may be made when, in fact, there are too few available resources (capability) to meet the commitments. In this "over committed" state, the operational elements of the system must reprioritize the work; letting some commitments suffer delays. Alternatively, operations must scramble to put on additional capacity. This situation, typically driven by random fluctuations in demand and unplanned failures of key resources, requires that P>C. As a consequence, $\lambda<1$, and the system control problem becomes focused on maximizing productivity of available resources, $\rho$. While this may seem logical, the fact remains that planning in general, and capacity planning in particular, is critical to the regulation of any system, but especially for systems that must grow and adapt to remain viable.

Figure 15:
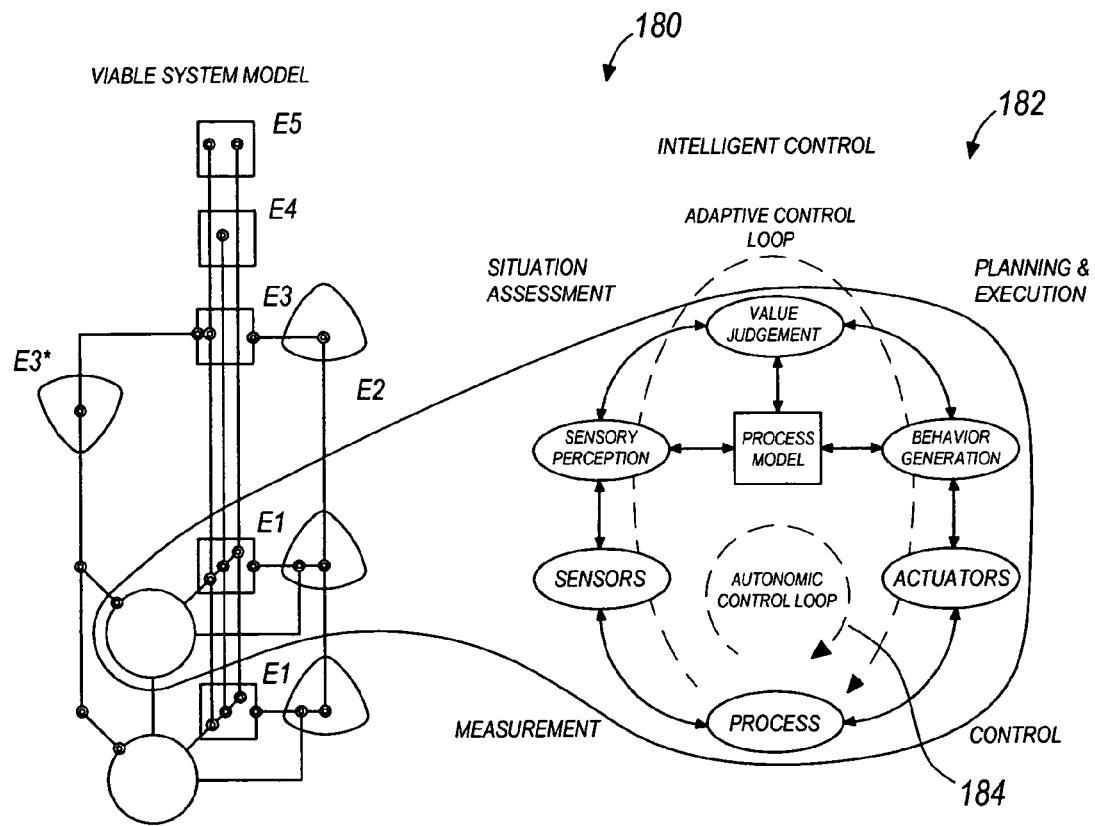
FIG. 15 is an illustration of how control of value production is provided by elements of a VPU controller and measurement services for a VPU.
Figure 16:
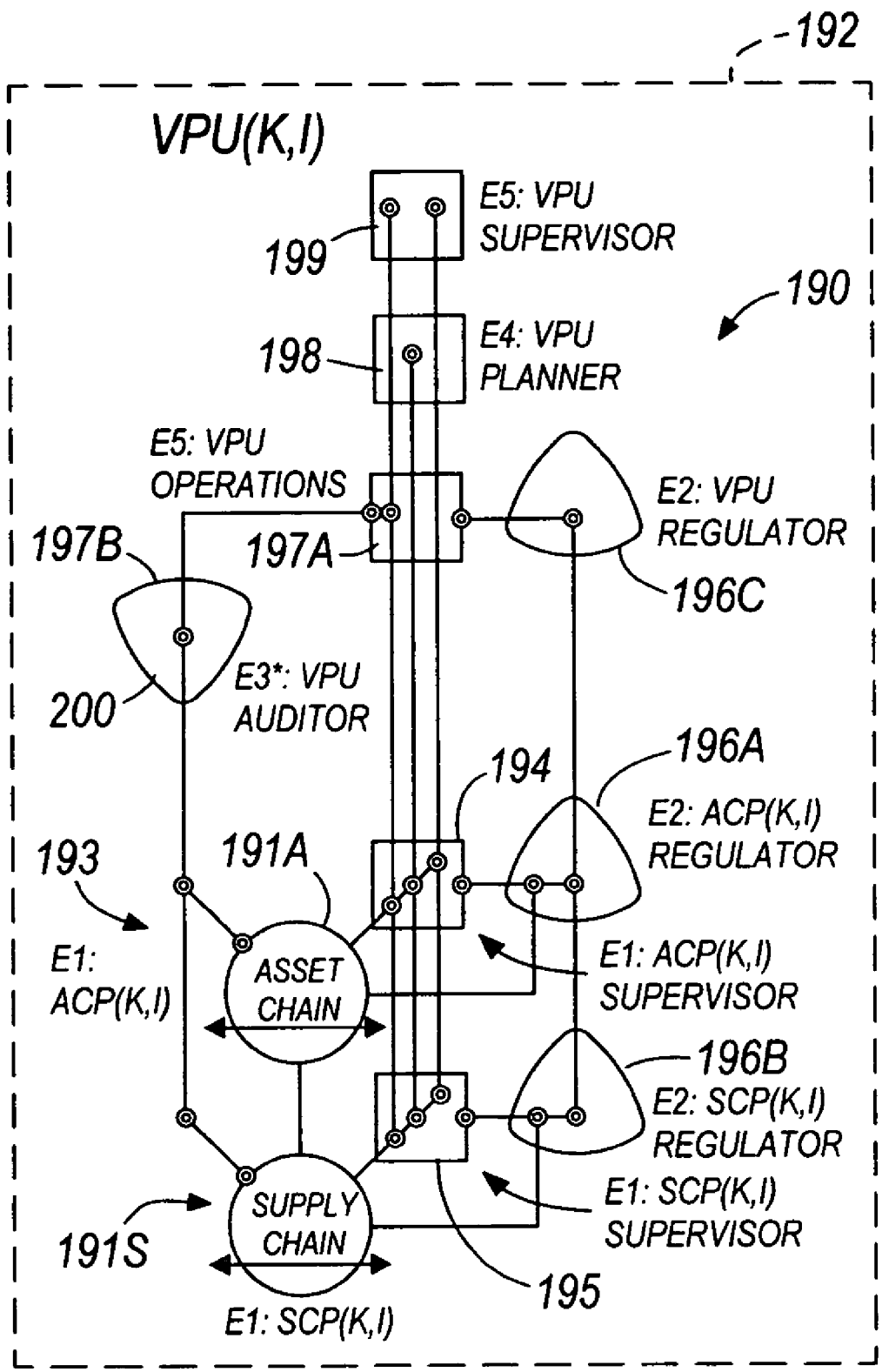
FIG. 16 is an illustration of a measurement and control framework applied to the first and second models of value production.

A mechanism 180 that may be used to provide such regulation is illustrated in FIG. 15. The mechanism 180 includes a feedback control device 182 augmented with autonomic (or self-regulatory) device 184. FIG. 16 illustrates an exemplary viable system controller 190 for a VPU. There are two basic processes to control, an asset chain process (ACP(k,l)) or 191A and a supply chain process (SCP(k,l)) 191S. Another way of looking at the controller is to think of it as a single business unit (BU) or 192 (FIG. 16), structured in a way that supports designed or engineered control. FIG. 16 peers into the business unit 192 to uncover its VPU 193, as defined by its structure as a viable system. FIG. 16 identifies the essential internal objects that provide the dynamic behavior of value production as defined above. The asset chain process ("ACP") 191A and supply chain process ("SCP") 191S are responsible for engaging neighboring vertical and horizontal VPUs in their respective chains. ACP 191A and SCP 191S are two echelon 1 ("E1") components and contain the fundamental operations of the viable system, the VPU's implementation. The ACP 191A and SCP 191S do not include higher level management functionality. Management is considered a service to fundamental processes and is included as part of the supervisory, operational & planning, and regulatory functions at echelon 2 ("E2"), echelon 3 ("E3"), echelon 4 ("E4"), and echelon 5 ("E5").

With respect to generally accepted accounting practices ("GAAP"), a BU's ACP activities are recorded on its balance sheet 140A (FIG. 13), and its SCP activities are summarized on its income statement 140B. The tradeoffs required in the management of these two views are the responsibility of higher echelons in the model or, in other terms, the E5-E4-E3 management team. Thus, in the example shown in FIG. 16, an E1_ACP management component 194 ("E1_ACP_Sup") is focused on acquiring and deploying assets (e.g., infrastructure development), and an E1_SCP management component 195 ("E1_SCP_Sup") is focused on the sale and delivery of products and services.

In total, there are eleven components identified in FIG. 16 comprising the VPU 193. They are the ACP 191A, the SCP 191S, the E1_ACP_Sup 194, the E1_SCP_Sup 195, an E2_ACP_Reg 196A, and E2_SCP_Reg 196B, an E2_VPU_Reg 196C, an E3_VPU_Ops 197A, E3_VPU_Audit 197B, an E4_VPU_Dev 198, and E5_VPU_Sup 199. The objects 191-199 are linked by network or grid connections, allowing the objects to be distributed in whatever manner is suitable to the application at hand. A variety of message formats and protocols may be used to support communications between the objects, but such formats and protocols may be based on standards such as those found at www.w3.org, www.jcp.org, www.omg.org, www.ietf.org, and www.rosetta.org.

The regulatory loops for the ACP and SCP activities (e.g., E1_ACP, to E2_ACP_Reg, to E1_ACP_Sup, back to E1_ACP) illustrate the need for a protocol machine and set of measurement and control messages. In some embodiments of the invention, the control loop may be patterned after classical feedback controllers.

For predictability and stability reasons, regulatory loop timing requirements must be specifiable and consistent within a viable system model ("VSM"). The VSM within the E1_ACP process, for example, must adhere to timing requirements that do not conflict with those of its encapsulating E2_ACP_Reg. And those must not, in turn, conflict with the E3_VPU_Ops operations loop.

It is preferable that the E2_VPU_Reg regulator be able to prioritize and preempt operations in the E1_ACP and E1_SCP VSMs. This capability requires that policies and mechanisms exist to support coordination and synchronization, assisting E2_VPU_Reg with its role in damping oscillatory behaviors as well as avoiding deadlocked behaviors that may result from contention over shared resources.

In addition, because the VSM is recursively defined, the object interfaces, protocols, and message syntax should scale, and not be level specific. FIG. 5 illustrates expanding and coupling VPUs (that represent the business units 41, 42, and 43) within a VPU defining the BA 40. FIG. 5 shows the BU VSMs rotated 45 degrees in order to fit them into the BA VSM. Likewise, "under a microscope" we'd see the asset and supply chain VSMs within the BU's. And in a similar fashion, zooming outward, we'd find the BA embedded in a corporate VSM structure that may contain other BAs. This scoping applies from the lowest enterprise VSM levels (e.g., a manufacturing cell within a factory within a BU) up through alliances among corporations, entire vertical market segments, and national and global markets.

The model provided in FIGS. 5 and 16 may be implemented in a variety of manners, including in software. As noted above, there are eleven key components (i.e., classes) in the VPU object model, including E1_ACP, E1_SCP, E1_ACP_Sup, E1_SCP_Sup, E2_ACP_Reg, E2_SCP_Reg, E2_VPU_Reg, E3_VPU_Ops, E3_VPU_Audit, E4_VPU_Dev, and E5_VPU_Sup. In one embodiment, these components can define classes in an object-oriented programming language such as Java. The services of each class, as implemented in an exemplary embodiment are defined below.

The ACP may be an enterprise object class (e.g., "enterprise java bean") defined by
  An asset production model deployed in a VPU
  A set of transactions (messages and protocols) that interface the model to an enterprise's underlying financial (e.g., ERP) systems
  A set of metrics (e.g., Six Sigma) for auditing the performance of the ACP
  A set of trading interfaces to the relevant financial markets
The SCP may be an enterprise object class defined by
  A supply production model for products produced in and exchanged by the VPU
  A set of transactions (messages and protocols) that interface the model to an enterprise's underlying manufacturing (e.g., MRP or project management) systems
  A set of metrics (e.g., Six Sigma) for auditing the performance of the SCP
  A set of trading interfaces to the relevant product markets
The asset chain supervisor E1_ACP_Sup provides direct administrative controls over the E1_ACP, and includes such services as
  Receive, interpret and execute commands from E3_VPU_Ops
  Formulated and send status of E1_ACP to E3_VPU_Ops
  Develop normative execution plans for E1 operations
  Supervise the regulatory actions of E2_ACP (e.g., operational set-point controls)
The supply chain supervisor E1_SCP_Sup provides direct administrative control of E1_SCP, and includes such services as
  Receive, interpret and execute commands from E3_VPU_Ops
  Formulate and send status of E1_SCP operations to E3_VPU_Ops
  Develop normative execution plans for E1_SCP operations
  Supervise the regulatory actions of E2_SCP (e.g., operational set-point controls)

The asset chain regulator E2_ACP_Reg provides the feedback controls that support reflexive (autonomic) controls over behavior of the asset chain process. Through E2_ACP_Reg's four interfaces,
  It senses and responds to activities in the E1_ACP process
  It couples the normative supervisory control functions of E1_ACP_Sup to the E1_ACP production process
  It connects to and supports the regulatory functions of the VPU operations level through E2_VPU_Reg
  It connects to the supply chain regulator E2_SCP_Reg in order to coordinate with actions of the E1_SCP process As such, the asset chain regulator E2_ACP_Reg participates in four control loops, and is an important element in the VPU's ability to attain and sustain homeostasis.

Like its E2_ACP_Reg counterpart, the supply chain regulator E2_SCP_Reg provides feedback controls that support reflexive (autonomic) controls over behavior of the asset chain process. Through E2_SCP_Reg's four interfaces,
  It directly senses and responds to activities in the E1_SCP process
  It couples the normative supervisory control functions of E1_SCP_Sup to the E1_SCP production process
  It connects to and supports the regulatory functions of the VPU operations level through E2_VPU_Reg
  It connects to the supply chain regulator E2_ACP_Reg in order to coordinate with actions of the E1_ACP process The E2_VPU_Reg encapsulates and coordinates the behaviors of value and supply chain production. It is responsible for managing the resources and synchronizing the events that are required for this role. A key function in support of that responsibility is coordination of the two process regulators, E2_ACP_Reg and E2_SCP_Reg. This role is performed by E2_VPU_Reg, whose services include
  Provide real-time status to E3_VPU_Ops relative to E1 activities and VPU objectives
  Accept "override" commands (e.g., set-point changes) from E3_VPU_Ops in response to E1 exceptions
  Balance the real-time demands of the E1 processes against one another according to E3 policy The E3_VPU_Ops, as a proxy for a responsive (i.e., reflexive and adaptive) value production entity within an enterprise, operates according to plans that undergo constant revision. Such plans are the result of combining history, operational pragmatics, current objectives, resource constraints, and incremental developmental improvements. It falls to the operations directorate to continually assess and rationalize these aspects and produce executable programs for the E1-level directorates. To do so E3_VPU_Ops requires the ability to independently assess current activities in its E1 processes (E3_VPU_Audit), react to real-time E1 events (E2_VPU_Reg), and to participate in the planning of incremental change (E4_VPU_Dev). Through these interfaces, E3_VPU_Ops provides the following services.
  Continuously receive, filter interpret and respond, through the exception-reporting services of E2_VPU_Reg, the real-time behavior of E1 production systems
  Continuously interrogate, interpret, filter and report to E4-E5, through the auditing services of E3_VPU Audit, the current status of specific E1 activities
  Periodically develop, revise, deploy (to E1_SCP_Sup and E1_ACP_Sup) and monitor tactical operating plans received from E5_VPU_Sup and E4_VPU_Dev that achieve the (typically, near-term) objectives of the VPU Support incremental "reprogramming" of the VPU in order to implement innovations provided by E4_VPU_Dev and mission directives from E5_VPU_Sup.

The E3_VPU_Audit assesses the current state of a system using a set of uniform and consistently applied metrics. A main role of the E3_VPU_Audit is to establish a uniform frame of reference for E3_VPU_Ops in carrying out its responsibility for achieving milestones in its operating plans. As such, the E3_VPU_Audit class provides A defined set of operational performance metrics (e.g., Six Sigma)

A defined set of measurement methods

A schedule for performing the methods within the E1 domains

A reporting protocol for communicating the results to E3_VPU_Ops and to the E1_ACP and E1_SCP processes.

The E4_VPU_Dev provides a mechanism to develop plans of adjusting to the changes suggested by measurements made by the E3_VPU_Audit. Thus, the E4_VPU_Dev is configured to address three dimensions of VPU behavior:

Its vision and mission (i.e., the objectives that result from its E5 belief system, and how it manages innovation through its E4 development programs)

Its core capabilities as defined in its E1_SCP and E1_ACP processes

Its infrastructure (i.e., how it functions through the services of E2 and E3)

These requirements are supported by E4_VPU_Dev services that include

VPU modeling and simulation

Competitive environment measurement and assessment

Recommendations to E5 on adjustments to vision and mission objectives

Recommendations to E3 on operational improvements (e.g., infrastructure development)

Recommendations to E1 on product and process changes

The E5_VPU_Sup provides a superior authority or point of accountability. The responsibilities of the E5_VPU_Sup include Establishing and maintaining the identity, vision, and mission objectives of the VPU (i.e., its reason for existence)

Deriving and enforcing the policies (doctrines) that derive from the mission objectives Representing the VPU in the affairs of the metasystem in which it is an element (recursively defined)

The E5_VPU_Sup (together with the E4_VPU-Dev and E4_VPU_Ops) is, at the next higher level, the E1_x_Sup, where x is defined in the context of that level.

Having described details of the application of the VPU construct to components of an enterprise, the issue of performance measurement is again taken up.

Figure 17A:
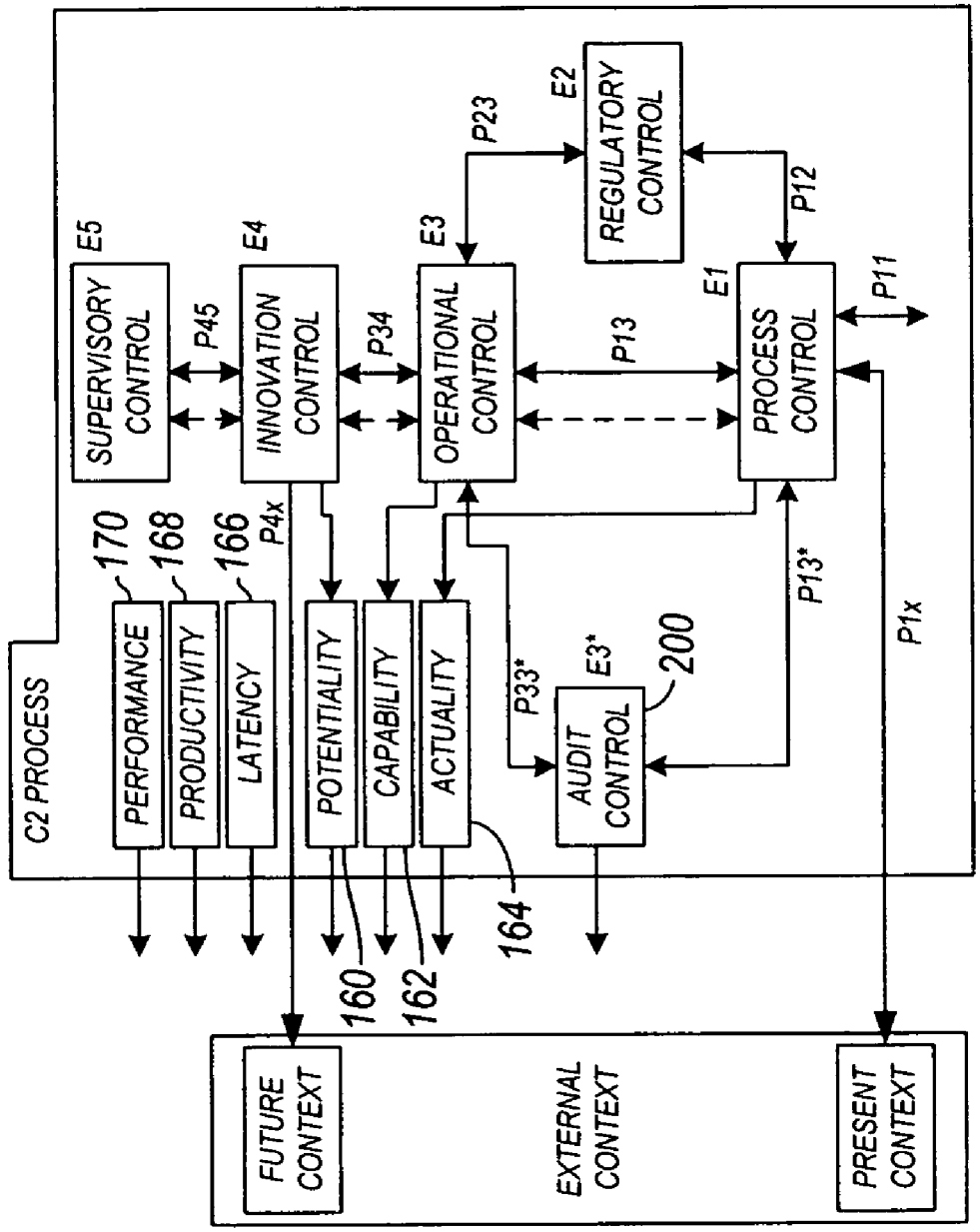
FIG. 17A is a composite illustration of a performance measurement framework.

The controller 190 may be modified to include performance measurement capabilities, as is best illustrated in FIG. 17A. As shown in FIG. 17A, performance of a system designed to measure and control a process is measured using the metrics introduced above (potentiality 160, capability 162, actuality 164, latency 166, productivity 168, and performance 170). In addition, an audit process or control 200 is added. The audit control 200 provides a mechanism for establishing a basis for value judgment. It serves, at least in part, the function of an "open market" valuation among independent traders in goods and services.

Figure 17B:
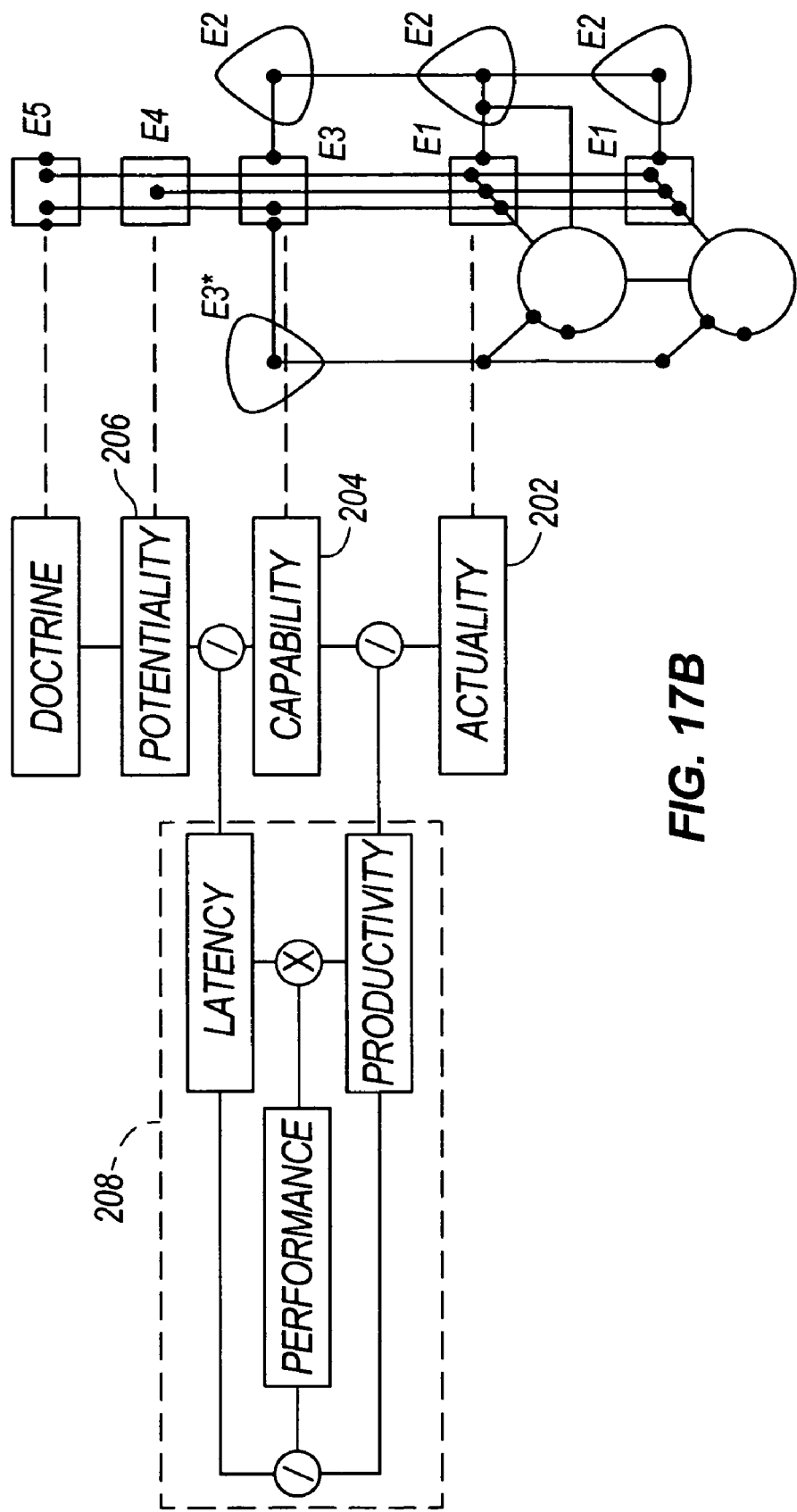
FIG. 17B is an illustration of performance metrics applied to five echelons or levels of an enterprise.

As can be seen by reference to FIGS. 17A and 17B, measures of actual performance are provided by the E1 processes through an actuality measurement tool 202; measures of capability are provided by the E3 operations directorate through a capability measurement tool 204; and measures of VPU potentiality are provided by the E4 planning function through a potentiality measurement tool 206. These three sets of measures form the basis for calculating the VPU's latency, productivity, and performance indices. Doctrine is generated at the E5 level and a doctrine generation tool 207 may be used to assist in the generation of the doctrine. Performance, latency, and productivity, as derivatives, may be calculated, as discussed above with a performance metrics engine 208. In addition to the six metrics (160, 162, 164, 166, 168, and 170) qualified results of the (E3*) audit process 200 are also available for export or output to management of higher echelons.

Figure 18A:
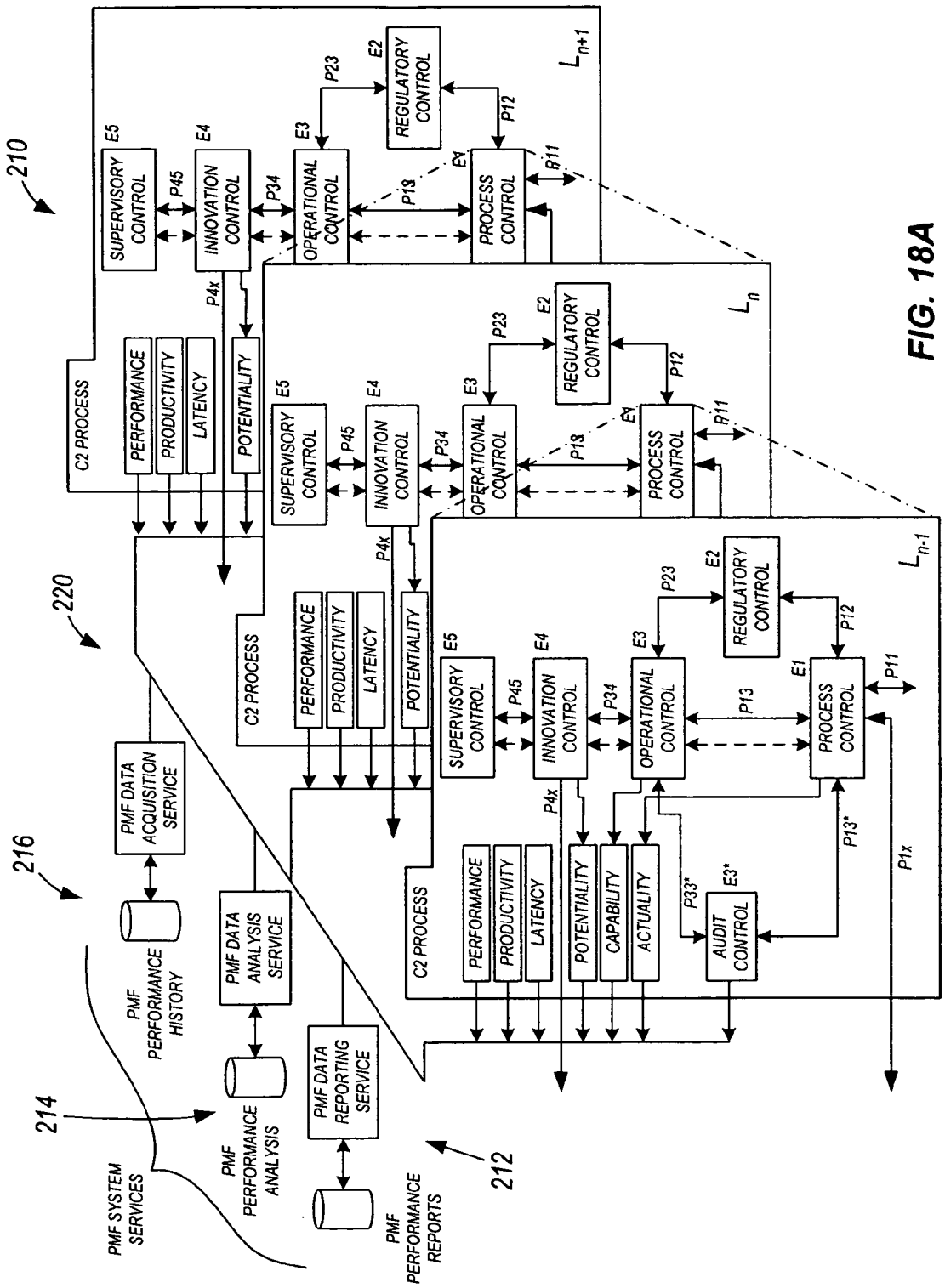
FIGS. 18A & 18B are illustrations of a performance measurement framework for a recursive set of value production units.

Putting these elements together, and recognizing the nested (recursive) natures of C2 lattices, results in a performance or production measurement framework ("PMF") 210 (FIG. 18A).

The PMF 210 include many features already discussed and additional PMF services, including performance reporting 212, performance analysis 214, and performance data acquisition 216. The PMF 210 also includes an interconnect structure 220, which may be the same grid or network infrastructure used by the enterprise to conduct its normal activities. In this respect, the PMF 210 is itself a service-oriented environment.

Figure 18B:
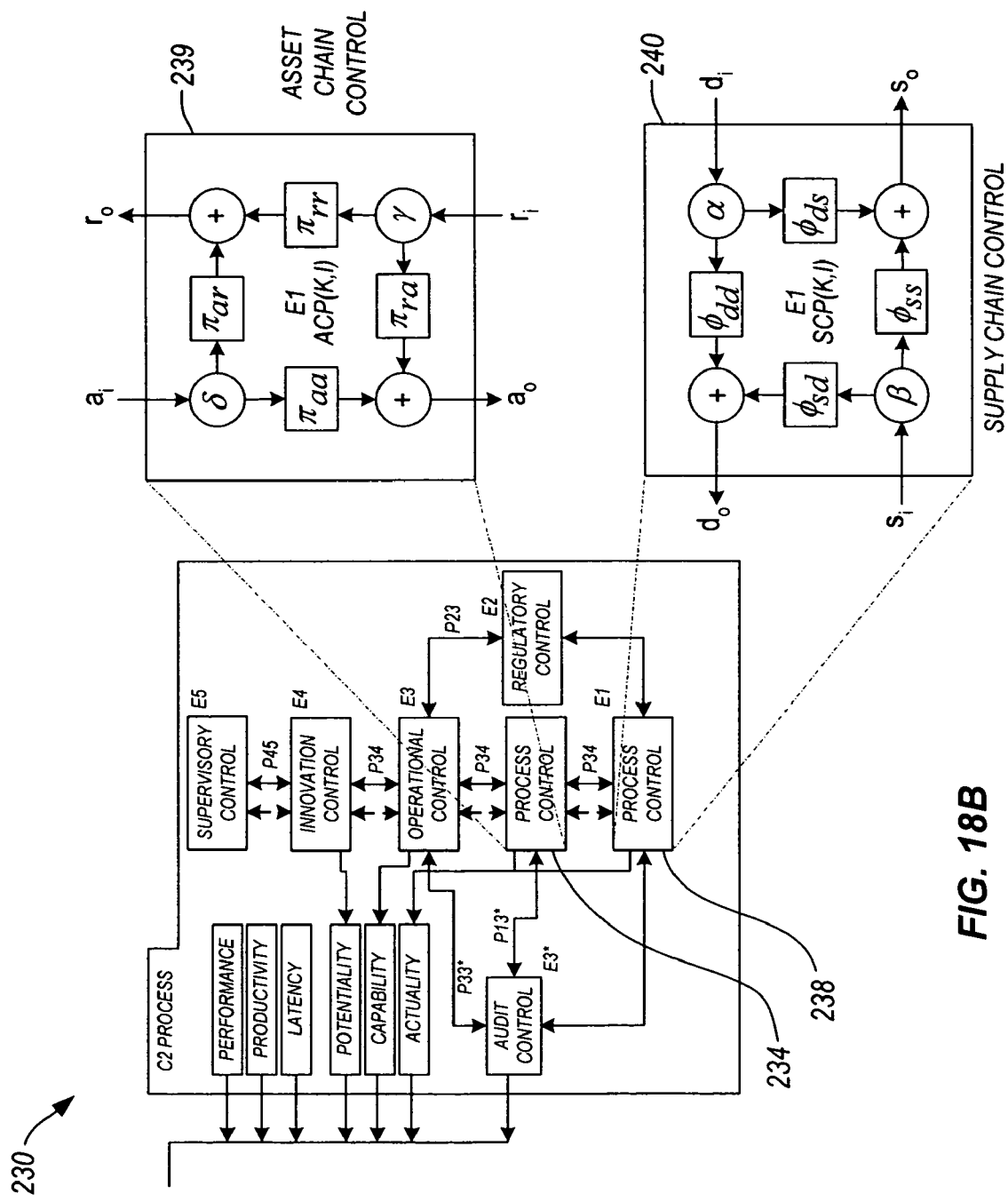

FIG. 18B illustrates a generalized PMF model 230 specialized for the VPU controller 190. The PMF model 230 includes two echelon 1 processes 234 and 238 and the means for their performance assessment in the form of ACP and SCP VPUs, 239 and 240 (the concepts of which were described above).

Figure 19:
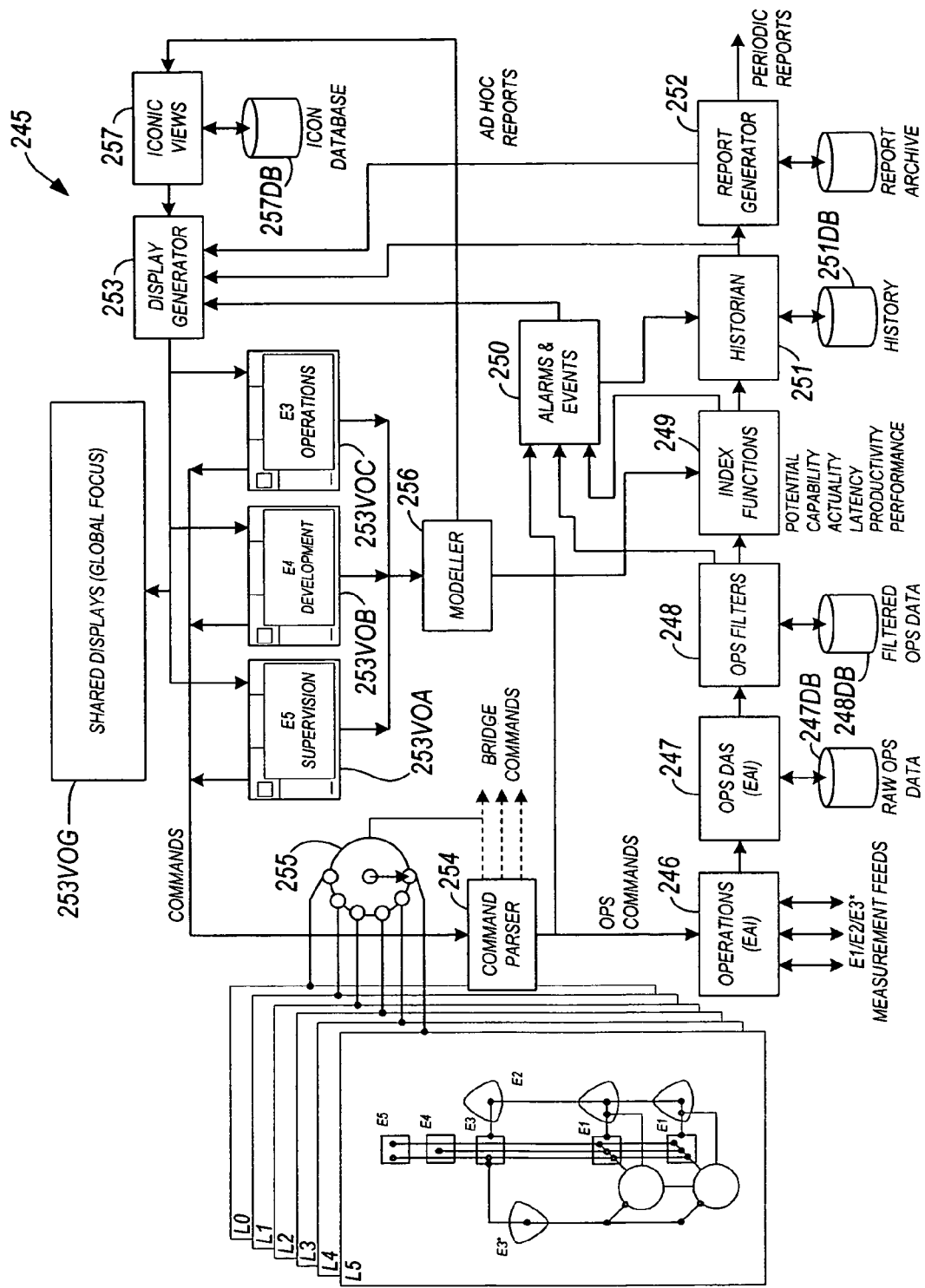
FIG. 19 is an illustration of a management system implemented using teachings of embodiments of the invention showing how information from measurement feeds is processed and how commands from a bridge are directed to components of an enterprise.

FIG. 19. Illustrates a management or command and control system 245. Data from components of the system (for example, the first three echelons of VPU's and other systems such as ERP and CRM systems) is transferred through an interface module 246. Operation commands are also directed out to lower echelons through the modules 246. The raw information received in the interface modules 246 is delivered to a data acquisition service 247 that may store raw information in a database 247DB. The data acquisition service 247 also delivers the raw information to one or more filters, represented by a filter 248. Information processed in the filter 248 may be store in a database 248DB and delivered to other components of the system 245, including a performance measurement engine 249 and an alarms and events engine 250. The performance measurement engine 249 performs the functions described with respect to FIGS. 14, 17A and 17B to generate performance metrics. Performance metrics from the performance measurement engine 249 are delivered to a history engine 251. The history engine 251 receives input from the alarms and events engine 250 and stores performance metrics in a history database 251DB. The history engine 251 is coupled to a report generator 252, which produces reports based on the performance metrics and historical information received from the history engine 251.

The alarms and events engine 250, history engine 251, and reports generator 252 are coupled to a display generator 253, which takes information from these three sources and produces output that may be presented on a CRT, LCD, printer, or similar output device. For example, the display generator 253 may create graphical interfaces (exemplified by output screens or interfaces 253VOA, 253VOB, and 253VOC). Various displays may also be shared on a wide-area basis (as is represented by the display 253VOG (video output global)).

The interfaces 253VOA-253VOC are also input mechanisms through which individuals controlling the system 245 may enter inputs or commands. The commands are routed to a command parser 254, which separates what are referred to as bridge commands (commands meant for individual components or levels within the system 245, as represented by the L0 through L5 constructs) from operational commands (commands that affect the entire system). Bridge commands are directed to a router 255 which directs the commands to the appropriate level (or, to take a more granular perspective, to a VPU, or echelon of a VPU, or process of a VPU). Operational commands are directed to the alarms and events engine 250.

Commands from the bridge interfaces 253VOA, 253VOB, and 253VOC may also be directed to a modeler 256 such that individuals in charge of the system 245 may create models of future behavior of enterprise components (such as a business unit) as needed. Information from each model created is delivered to the performance measurement engine 249 so that an appropriate measurement service for the newly modeled components may be established. In addition, information from the modeler 256 is delivered to an icon engine 257 and associated database 257DB to establish appropriate graphical tools for the newly modeled components. Information from the icon engine is shared with the display generator so that appropriate visual information may be displayed.

As noted above, the domain of enterprise management is complex and subject to broad interpretation. Interpretations depend on application context, the more obvious being military, commercial, public health, and government. Interpretations are further complicated by regional and cultural biases in the application of command and control by various practitioners. Business personnel operate differently than military officers, both of whom use different protocols than physicians in medical practices or supervisors on large construction projects. There are, however, similar objectives and practices across these domains that are relevant to the specification of distributed real-time enterprise. To codify the common features requires a lexicon from which a formal syntax and a semantic are derived in the form of an EOS.

Figure 20:
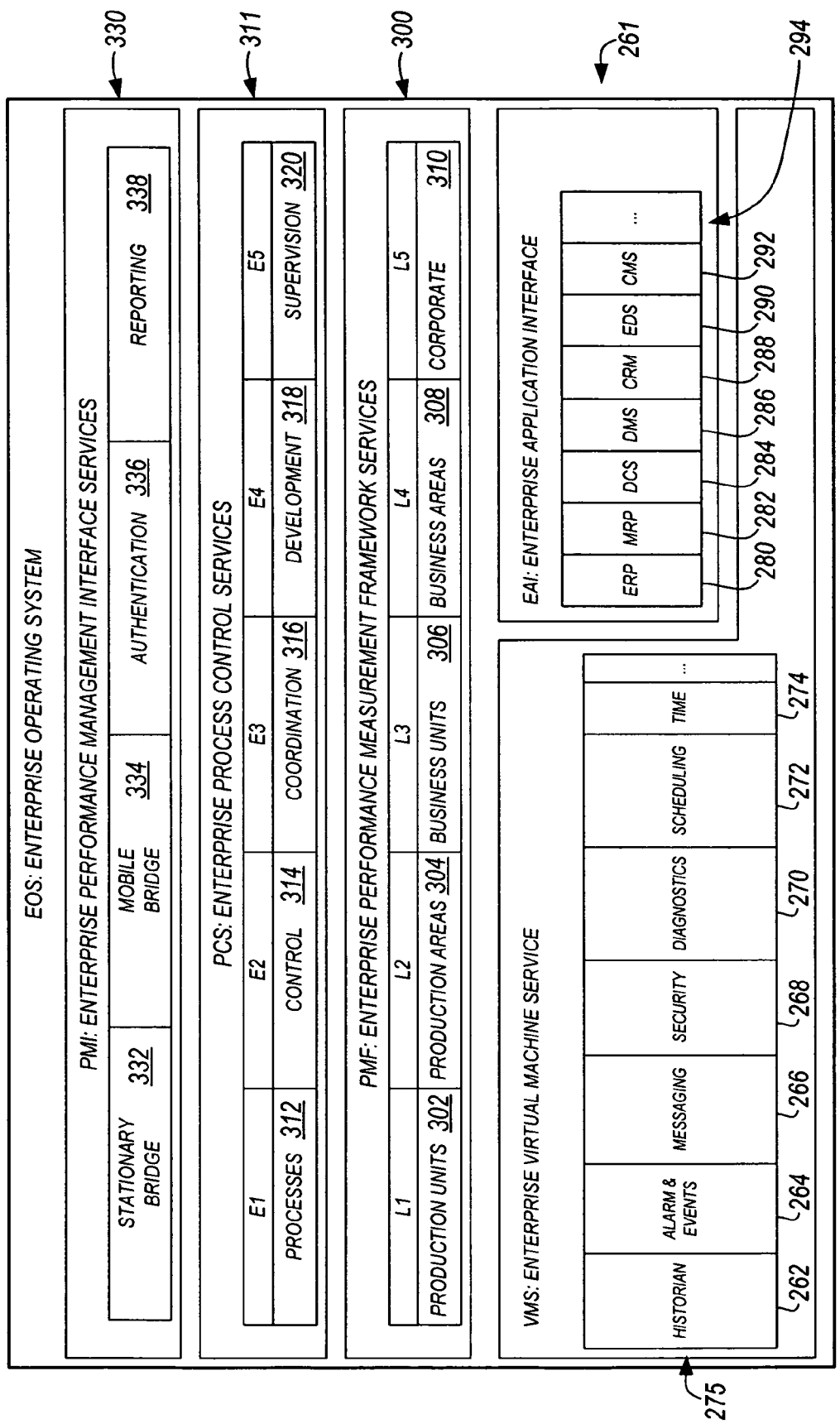
FIG. 20 is an illustration of the major elements of an enterprise operating system according to one embodiment of the invention.

FIG. 20 illustrates an EOS 260. The EOS 260 provides elements and features to support distributed real-time command and control applications. At a base or network interface layer or level 261 of the EOS 260 are interfaces 262-274 to run-time services (historian, alarms & events, messaging, security, diagnostics, scheduling, time, etc.) (Generically enterprise virtual machine ("EVM") services 275) that support predictability and timeliness. The base or network interface level 261 also includes interfaces to grid-connected applications such as the an enterprise resource planning ("ERP") interface 280, a manufacturing resource planning ("MRP") interface 282, a distributed control systems ("DCS") interface 284, a document management system ("DMS") interface 286, a customer relationship management ("CRM") interface 288, an engineering design system ("EDS") interface 290, and a CMS interface 292 (generically, enterprise application interfaces ("EAIs") 294). Of course, other interfaces (not shown) could be included.

Figure 21:
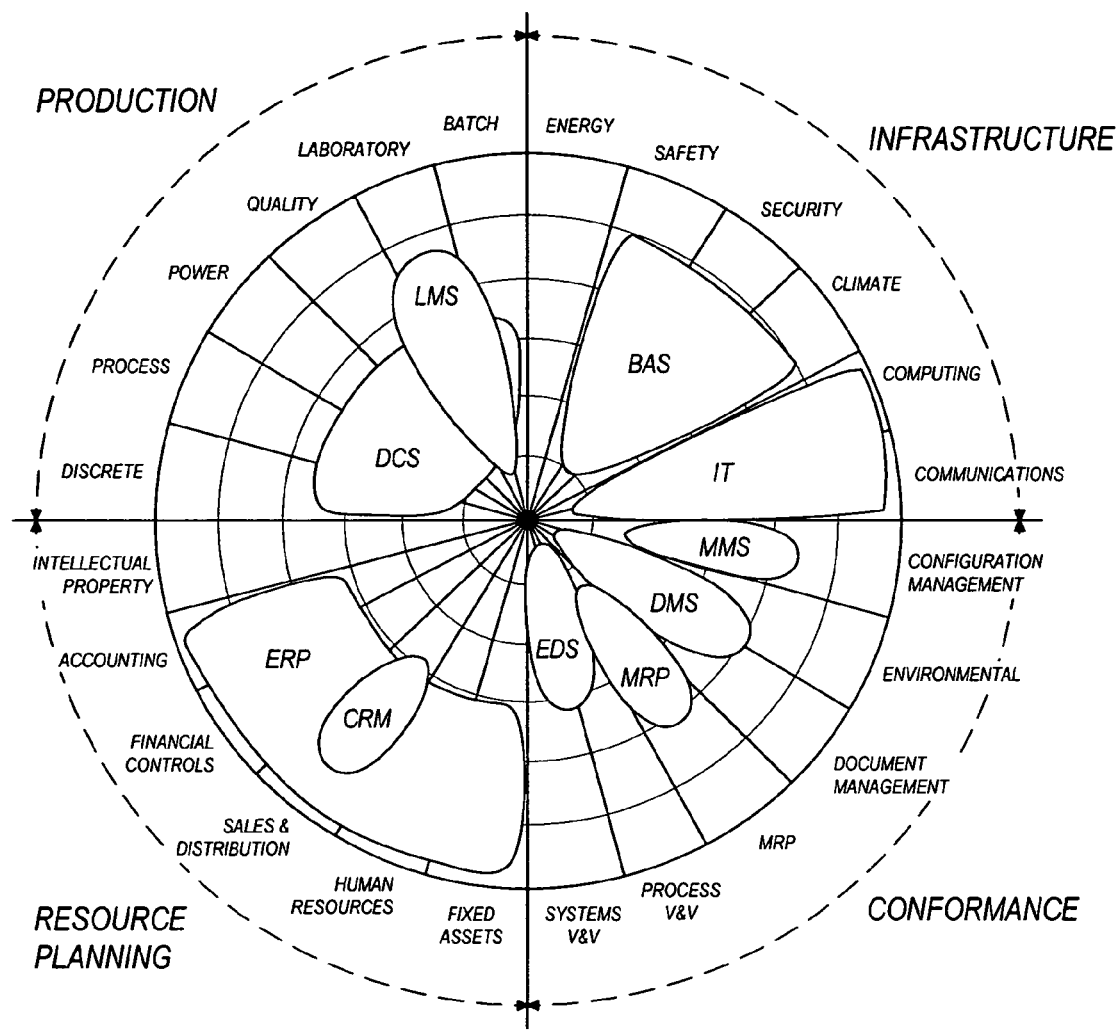
FIG. 21 is an illustration (in the form of a five-ring Smith chart) of enterprise applications that may be interfaced with an enterprise operating system.

FIG. 21 illustrates commercial enterprise applications categories, or suites, that may be coupled or interfaced to the EOS 260. (Military applications would populate an equivalent map for a given military branch.) The location and coloring emphasizes relative positions in the C2 automation space and the fact that these suites tend to be isolated, of different manufacture, and from different vendors. The applications may include those mentioned above ERP, CRM, etc.

Referring back to FIG. 20, the EOS 260 includes a second or performance measurement layer or level 300 having value production processes ("EVPs") of a virtual organization ("VO"). In the exemplary EOS, production processes include production units 302, production areas 304, business units 306, business area 308, and corporate governance 310. Above the EVP or second level 300 is a third or process control layer or level 311 of enterprise process controls ("EPCs") that govern autonomic behaviors. In the EOS 260, the ECP include a processes service 312, a control service 314, a coordination service 316, a development service 318, and a supervision service 320. The EOS 260 also includes a fourth layer or level 330 that provides enterprise management interfaces ("EMIs"). The EMIs includes a stationary bridge 332, a mobile bridge 334, and authentication service 336, and a reporting engine or service 338.

Figure 22:
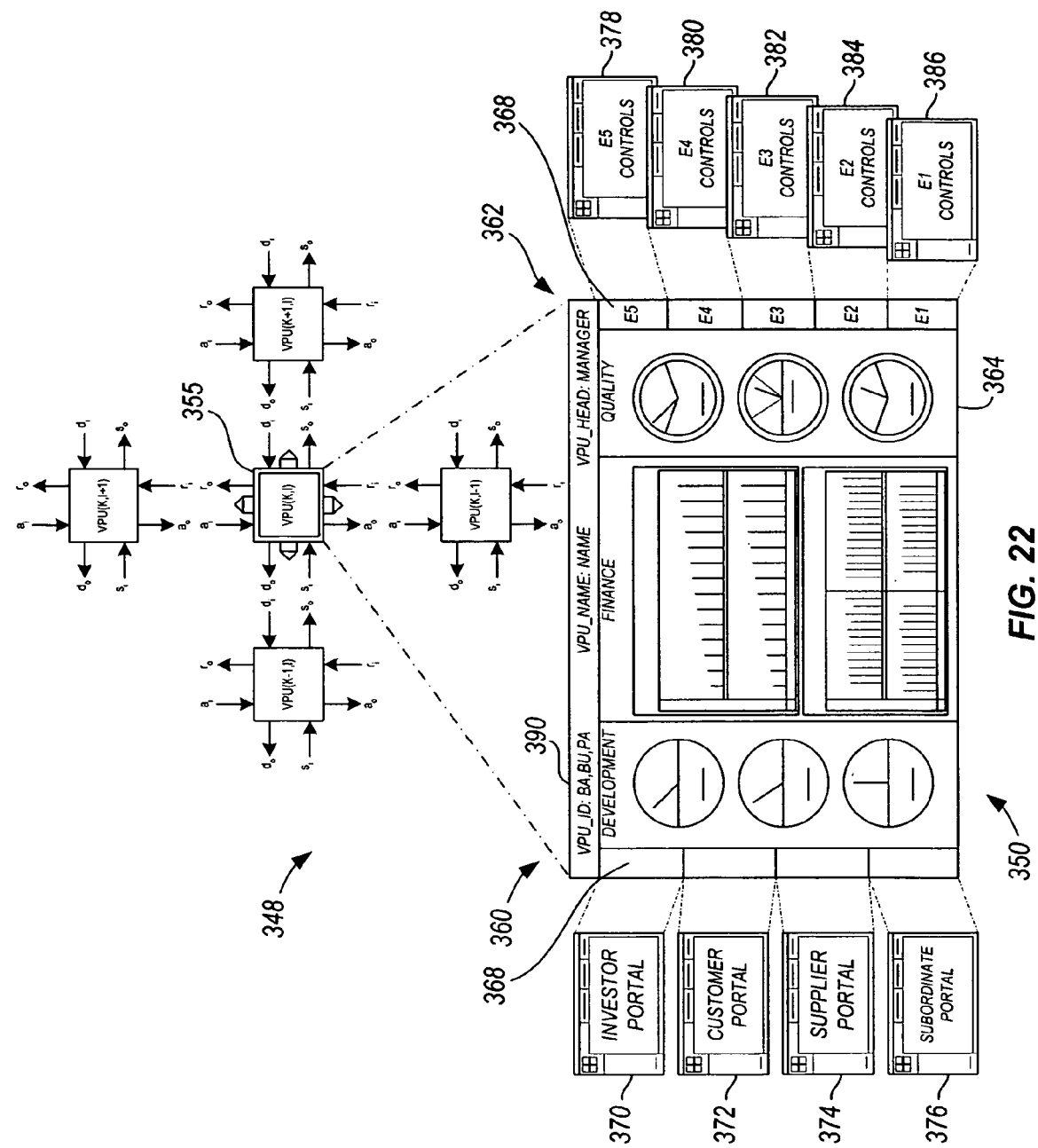
FIG. 22 is an illustration of exemplary enterprise management interface bridge displays that may be generated by embodiments of the invention.

The EMIs of level 330 provide tools or services to facilitate decentralized management of complex extended enterprises. FIG. 22 illustrates a bridge display 348 with multiple EMIs that may be generated by a system based on the teachings herein. The display 348 includes a status display 350 of a VPU 355. The display 350 contains three primary elements: performance meters 360 (on the left); quality, capability, and yield meters 362 (on the right); and financial graphics 364 (in the center). In the example shown, the performance meters 360 display latency, productivity, and performance. The quality, capability, and yield meters display process quality, in this case its variation (sigma), capability limits, and throughput yield of the VPU 355. The financial graphics 364 display more traditional financial measures of performance, including sales volume, return on invested capital, headcount, cost of goods sold, assets deployed, etc.

To the left and right hand edges of the bridge display 348 are buttons 368 (e.g., links) for activating web pages or other GUIs or content associated with two distinct sets of VPU controls—portals for VPU constituents, and portals for VPU echelon controls. FIG. 22 illustrates four portals: an investor portal 370, a customer portal 372, a supplier portal 374, and a subordinate portal 376. Five echelon controllers are also illustrated: a strategy controller 378, a development controller 380, an operations controller 382, a supervision controller 384, and a process controller 386.

The bridge display 348 includes means for identifying and selecting a VPU (or focus) in the form of a dialog box 390; where the name or address of the VPU of interest may be input. Thus, the bridge 348 provides a tool through which it is possible to visit the key production processes of an organization (or virtual organization), in a logical order, to view performance measures, to identify value chain behavior, and issue commands. Proactive commands initiate behaviors that will potentially affect connected VPUs. In the opposite direction, asynchronous alarms and events (e.g., signaling completions, failures, resource limits, etc.) generated within VPUs will, with some filtering, flow towards the command centers, ultimately to arrive on one or more portal pages or bridges for the attention of relevant controllers (managers). In both directions, timeliness and predictability are critical requirements for achieving and sustaining enterprise viability.

Figure 23:
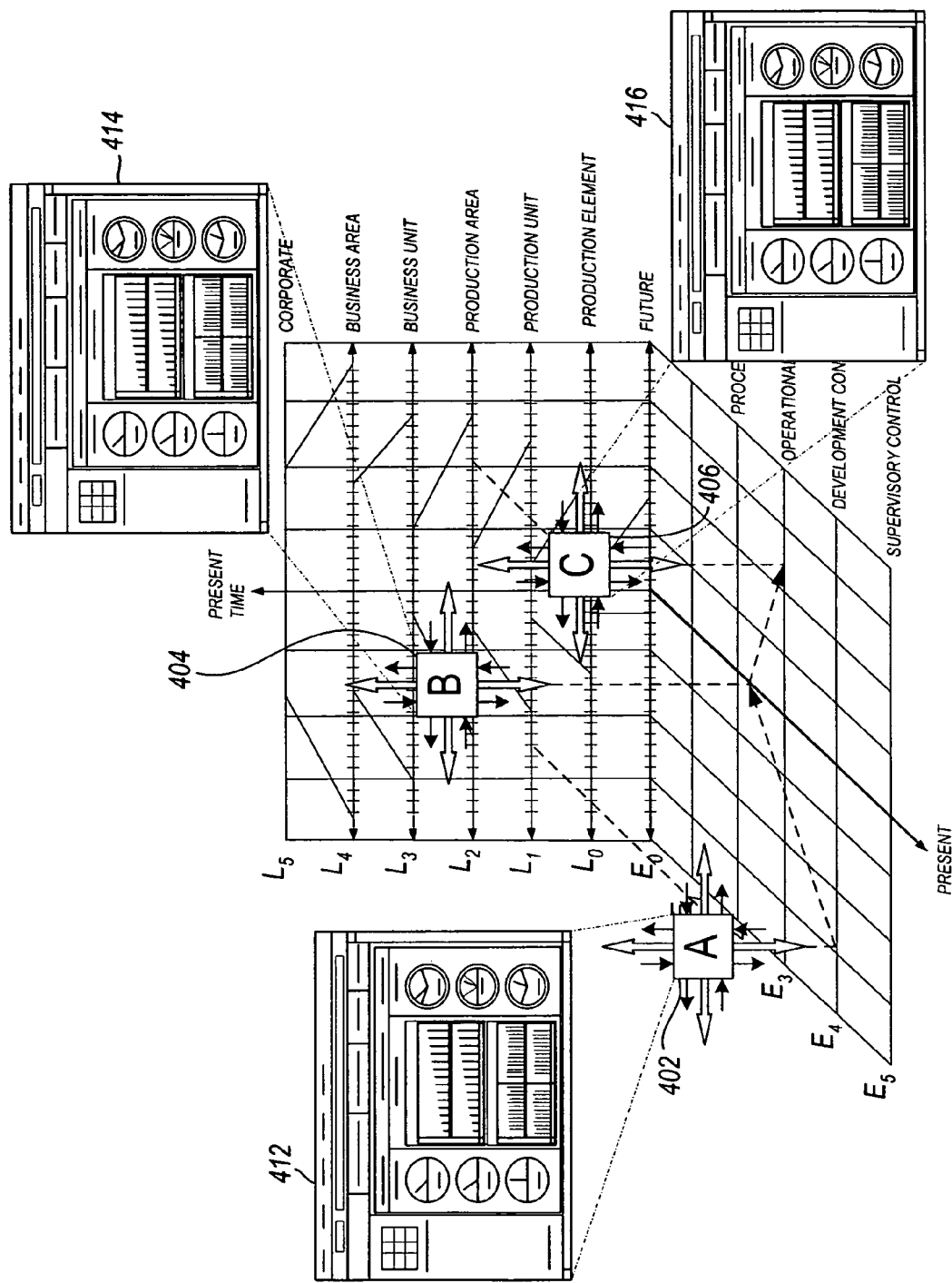
FIG. 23 is an illustration of how bridge displays may be used to track enterprise behaviors.

The EOS model as illustrated in FIG. 20 recognizes six organizational levels ($L_0$-$L_5$), each populated by one or more VPUs, and each VPU governed by a five-echelon controller and simultaneously serving two value chains through four interfaces. This aspect of the model is illustrated in FIG. 23. Thus, an EOS representing an enterprise can have numerous dimensions. The number of dimensions is determined by the following formula:

No. of dimensions=(no. of processes/no. of VPUs*no. of VPUs/level*5 controllers/*VPU**6 levels/enterprise).

As should be apparent, the number of dimensions could be very, very large for an enterprise or federation of enterprises with hundreds or thousands of VPUs. The EMIs (for example, bridge display 348) provide a tool that allows navigation and control of such a large space.

It should also be noted that the concepts of superior, subordinate, server, and client VPU portals will change in context, style and function for military C2 applications, and that the context will further vary depending on which military branch the EOS is being applied to.

FIG. 23 also illustrates how continuous process improvement can be implemented using an EOS (such as the EOS 260). FIG. 23 depicts three VPUs 402, 404, and 406. Each VPU is associated with a PMI 412, 414, and 416, respectively. Each PMI displays each VPU's performance characteristics. The PMI 412 for VPU 402 depicts the performance seen by its E4 controller of its level 1 activity sometime in the past. The PMI 414 for VPU 404 depicts the performance seen by its E2 regulatory controller of its level 4 activities at this moment. And the PMI 416 for VPU 406 depicts the performance that might be seen in the future by its operational controller at level 2.

Figure 24:
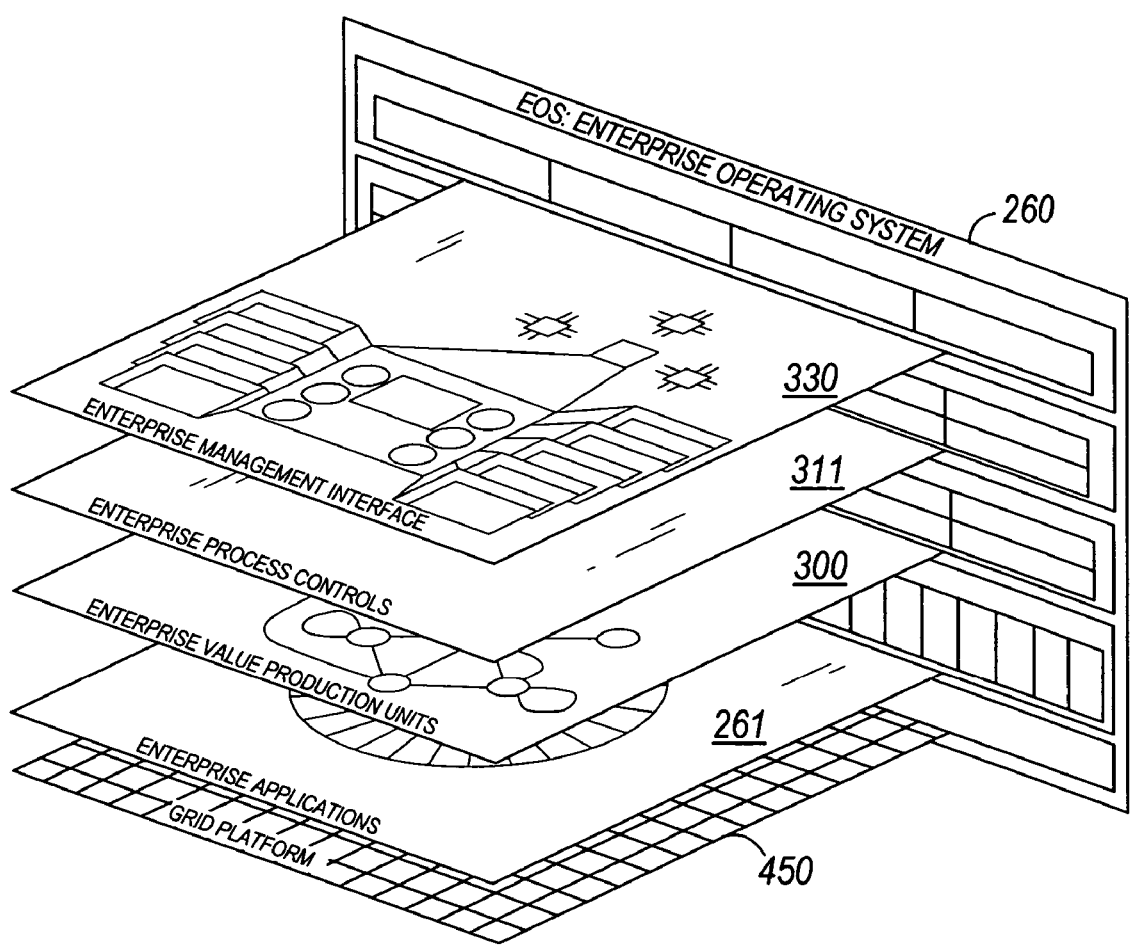
FIG. 24 is an illustration of the layering of core elements of an exemplary enterprise operating system.
Figure 25:
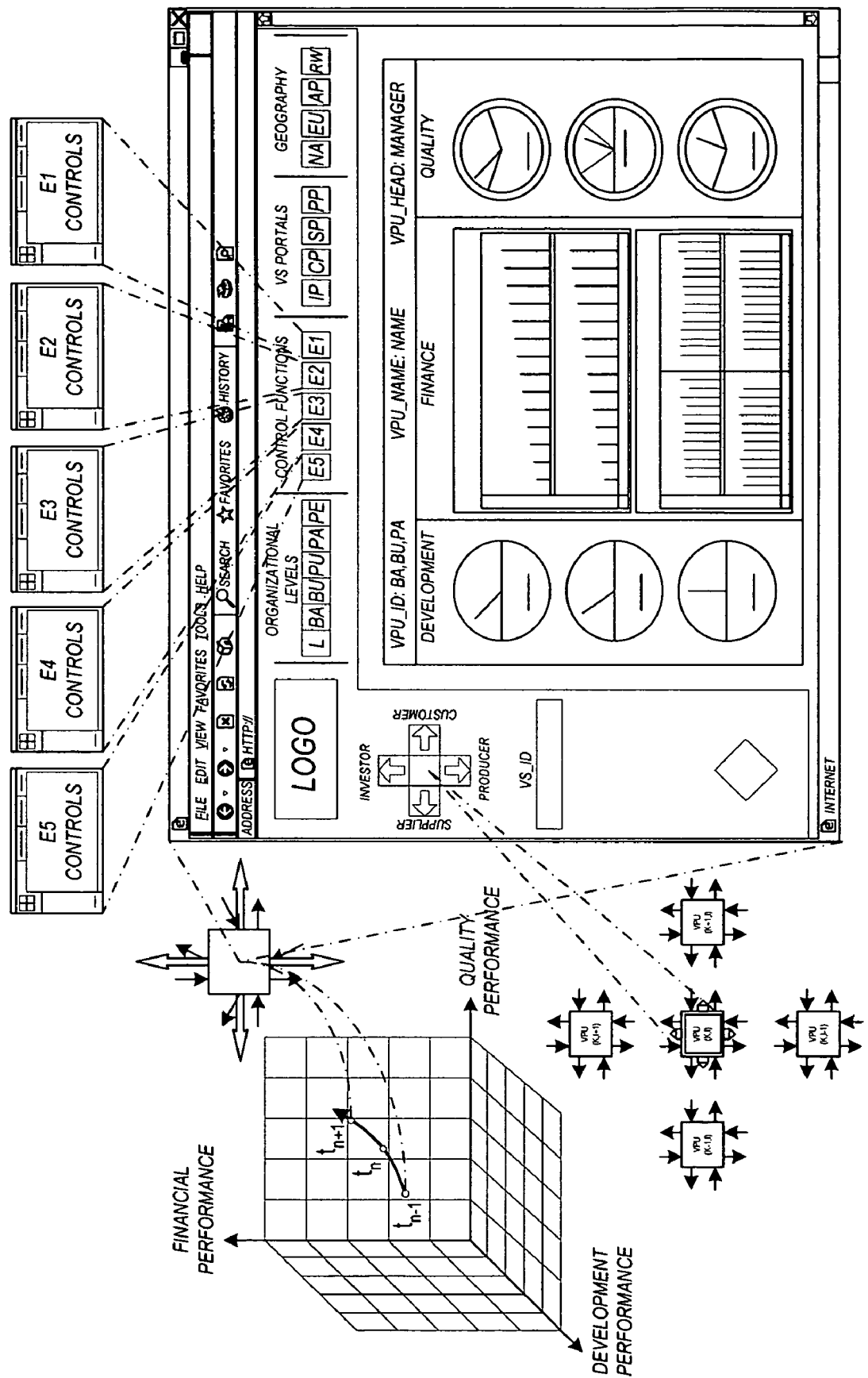
FIG. 25 is an illustration of an exemplary enterprise performance management interface.
Figure 26:
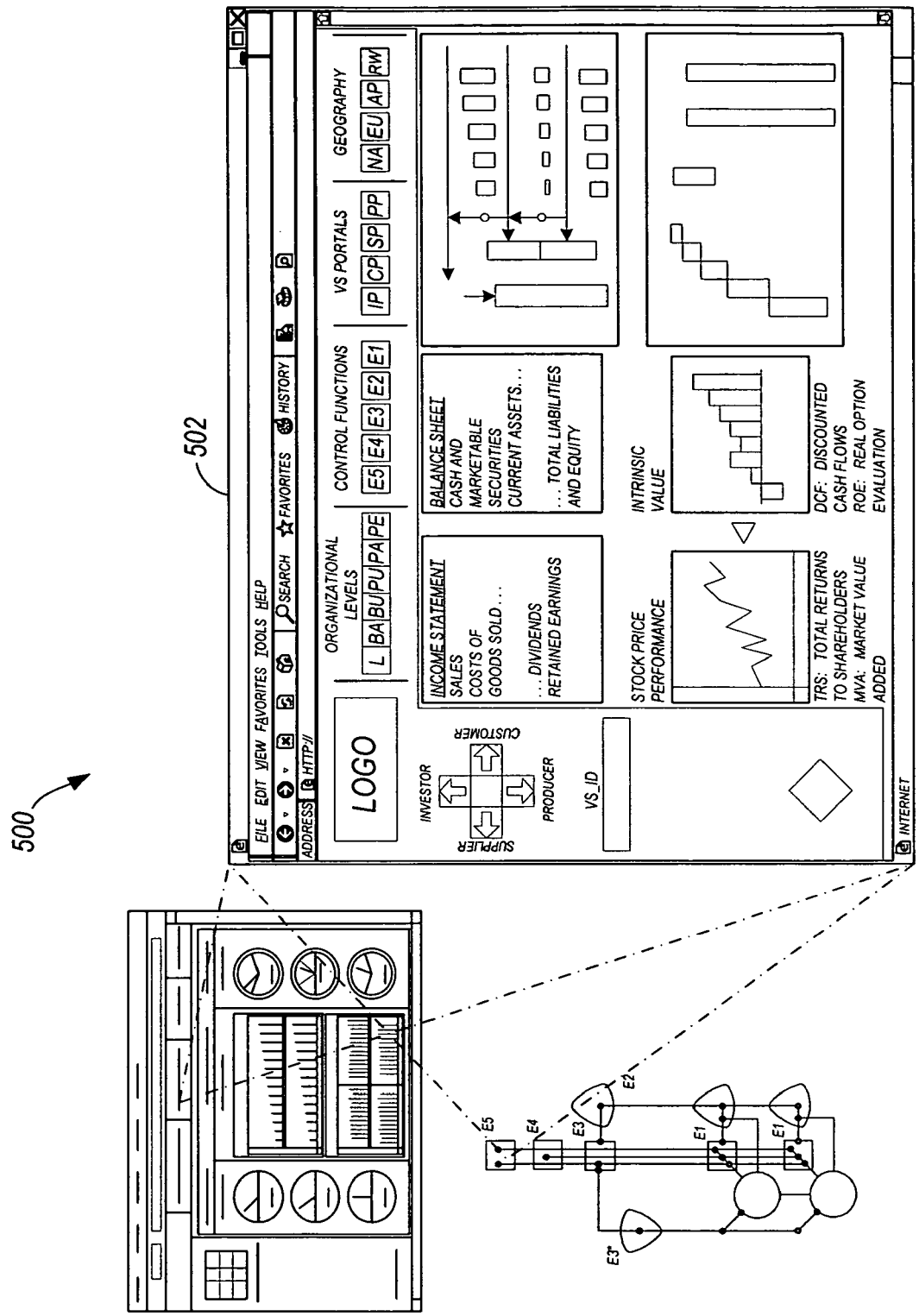
FIG. 26 is an illustration of an exemplary supervisory interface for the second model of a VPU.

To help further elucidate the EOS 260 and other features and aspects of embodiments of the invention, FIGS. 24-26 illustrate graphical summaries of certain components and elements already described. FIG. 24 illustrates major elements of the EOS 260 atop a grid or network 450. The grid or network 450 represents the many systems or inputs that supply information to embodiments of the invention (e.g., the ERP, MRP, DCS, CRM, EDS, CMS, and other systems mentioned above). At the base of the EOS 260 are the virtual machine services (EVM services) and the grid-level I/O subsystem (EAIs) of level 261 providing access to web attached (for example, via extensible mark up language ("XML"), Web Services Description Language ("WSDL"), Simple Object Access Protocol ("SOAP"), Universal Description, Discovery and Integration ("UDDI"), or other tools or interfaces) enterprise applications as summarized in FIG. 21. Within each ring are value production class objects or VPUs that define the core production processes of the extended or virtual enterprise or VO of level 300. The respective echelon controllers or EPCs of level 311, in turn, regulate these objects as they participate in their asset and value chain computations. The command and control environment is presented to end-users through the enterprise management interfaces or EMIs of level 330.

FIG. 25 summarizes key elements of the enterprise performance management user interface. The echelon 5-4-3 interfaces are concerned primarily with the acquisition and management assets, particularly their performance relative to the federation's need for producing value. FIG. 25 includes a controller page with selectors along the top, a VPU navigator on the left, and a three-panel performance display in the center.

A more specific example of a PMI (PMI 500) directed to an echelon 5 supervisory controller (e.g., corporate officer, theater commander, etc.) is presented in FIG. 26. The PMI 500 is financially oriented and depicts the real-time financial status of an enterprise operation. The PMI 500 includes a page 502 that is an idealized summary of the profit and loss statement, the balance sheet, and snap-shots of the roll-up of all of the enterprise's embedded systems.

As noted, FIGS. 24-26 provide graphical summaries of certain components and elements of embodiments of the invention. The EOS 260 is one such component and now will be described in further detail in relation to an enterprise command and control ("EC2") system.

Figure 27:
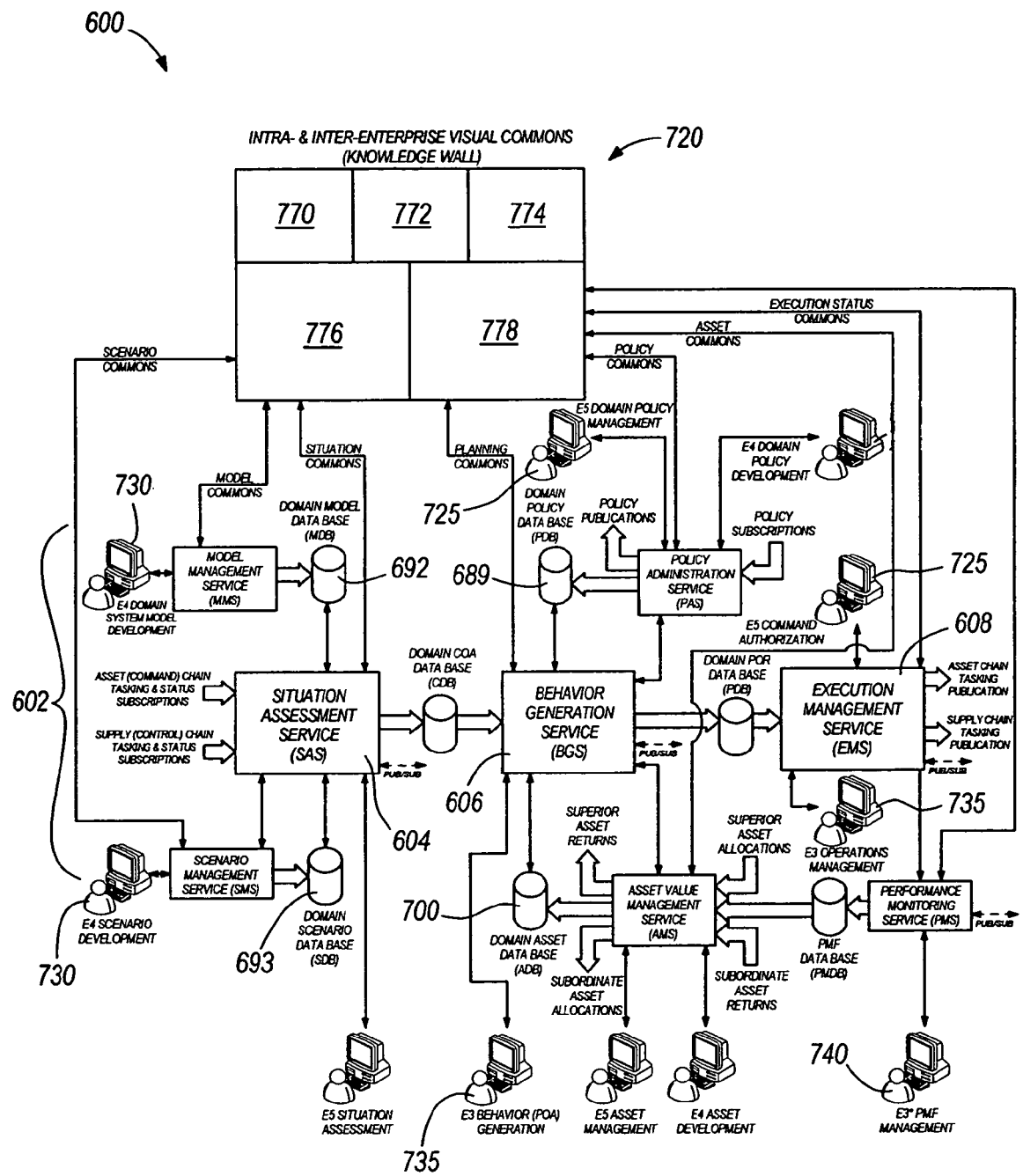
FIG. 27 is an illustration of an exemplary enterprise command and control system.

In many instances, medium- to large-scale enterprises are defined by complex, decentralized, and always-on activities that must be coordinated internally and among allies. For effective operation, such enterprises often require a well-defined interactive, scalable, and robust decision EC2 system. In one embodiment, the EC2 system is a distributed, real-time, interactive computing infrastructure that allows teams of federated enterprises to collaborate, through a specific set of EC2 services, on matters of tactical, operational, and strategic interest. Several basic services are used in an interactive, distributed, decision and control system that is capable of supporting both proactive and reactive behaviors. FIG. 27 shows an overview of one embodiment of an EC2 system 600. The major functions of this system reside in a control processing framework 602. These major functions include a situation assessment service ("SAS") 604, a behavior (response) generation service ("BGS") 606, and an execution management service ("EMS") 605.

Figure 28:
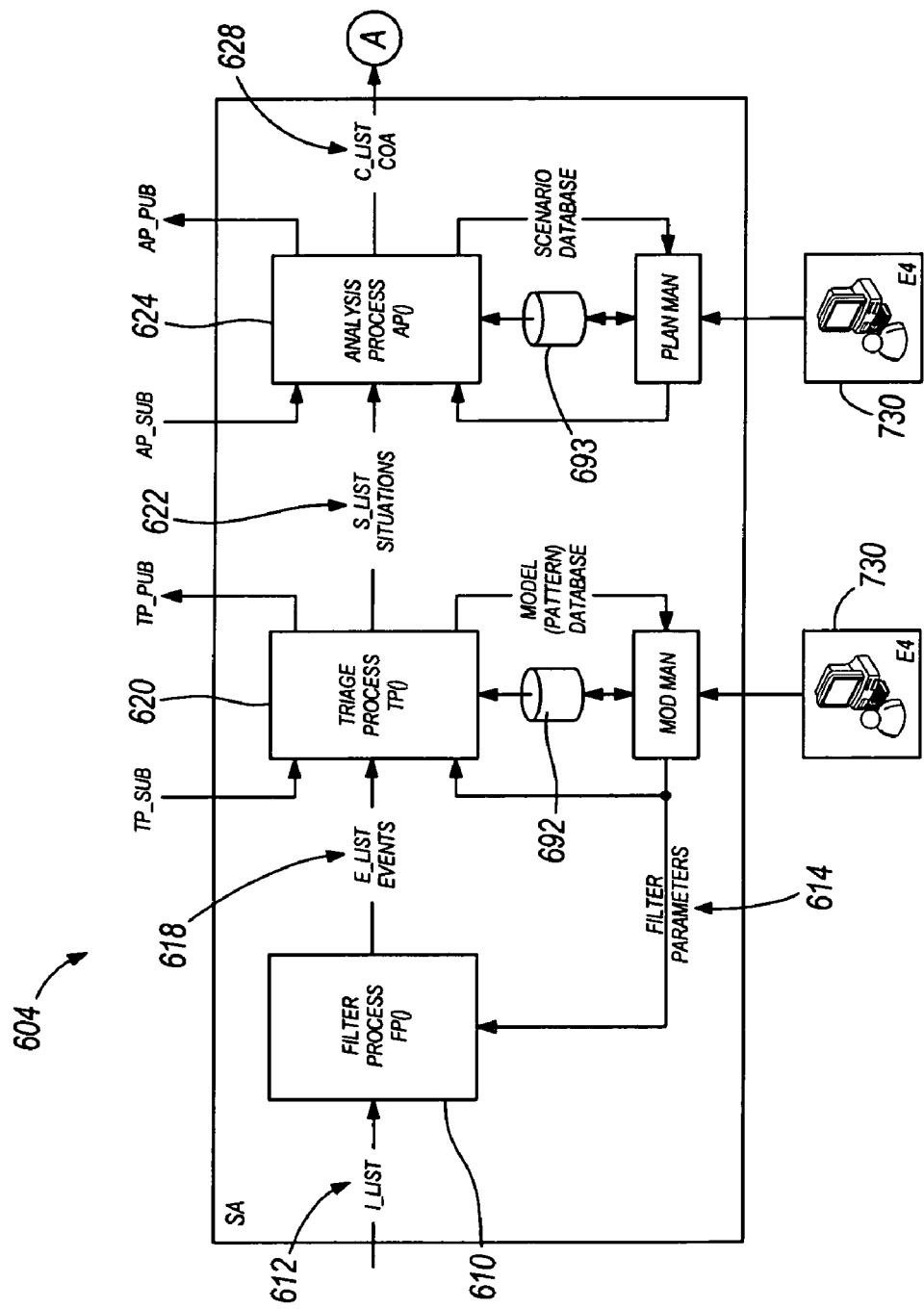
FIG. 28 is an illustration of an exemplary situation assessment service.

The SAS 604, shown in FIG. 28 allows allied members of one or more "communities of interest" ("COI") to view an environment, share perceptions, and develop a common set of conclusions about what they see. Collaboration among such allied members of a COI is supported by acquiring information, performing pattern matching, associating patterns with known situations (scenarios), creating new scenarios for unidentified patterns of interest, and developing potential courses of individual and mutual action ("COA") in response to information that is acquired. In the embodiment shown the SAS 604 follows three process steps.

A filter process 610 is linked (subscribes) to a plurality of information sources (e.g., news feeds, superior/subordinate VPUs, other enterprises, etc.). The filter process 610 receives a plurality of messages ("i_list") 612 from the information sources and decodes and sorts the messages into classes, ordered by a publication time and a publisher ID. The filter process 610 filters the messages based on a set of parameters 614 provided by a model manager ("ModMan") 616. The filter process 610 then produces an event list ("e_list") 618 for input to a triage process 620.

The triage process 620 receives the e_list 618 from the filter process 610 and, based on current situations and currently active plans of record ("POR") provided by the ModMan 616, determines which events in the e_list 618 apply to known situations and which are new. New situations are evaluated against criteria in ModMan 616 to determine if their relative importance is sufficient for the EC2 system 600 to address them. If the relative importance of a situation is determined to not be sufficient, the situation is ignored. If the new situation is determined to be of sufficient relative importance, it is added to a situation list ("s_list") 622 along with existing situations that have been modified based on information in the e_list 618.

An analysis process 624 receives the s_list 622 from the triage process 620 and determines if it contains situations for which a first planning manager ("PlanMan") 626 has a preplanned scenario. If the s_list 622 contains situations for which preplanned scenarios exist, current conditions are applied to the appropriate preplanned scenarios. For a new situation in the s_list 622 for which a preplanned scenario does not exist, the analysis process 624 creates a new scenario. A COA list ("c_list") 628 is created consisting of a list of possible COAs.

Figure 29:
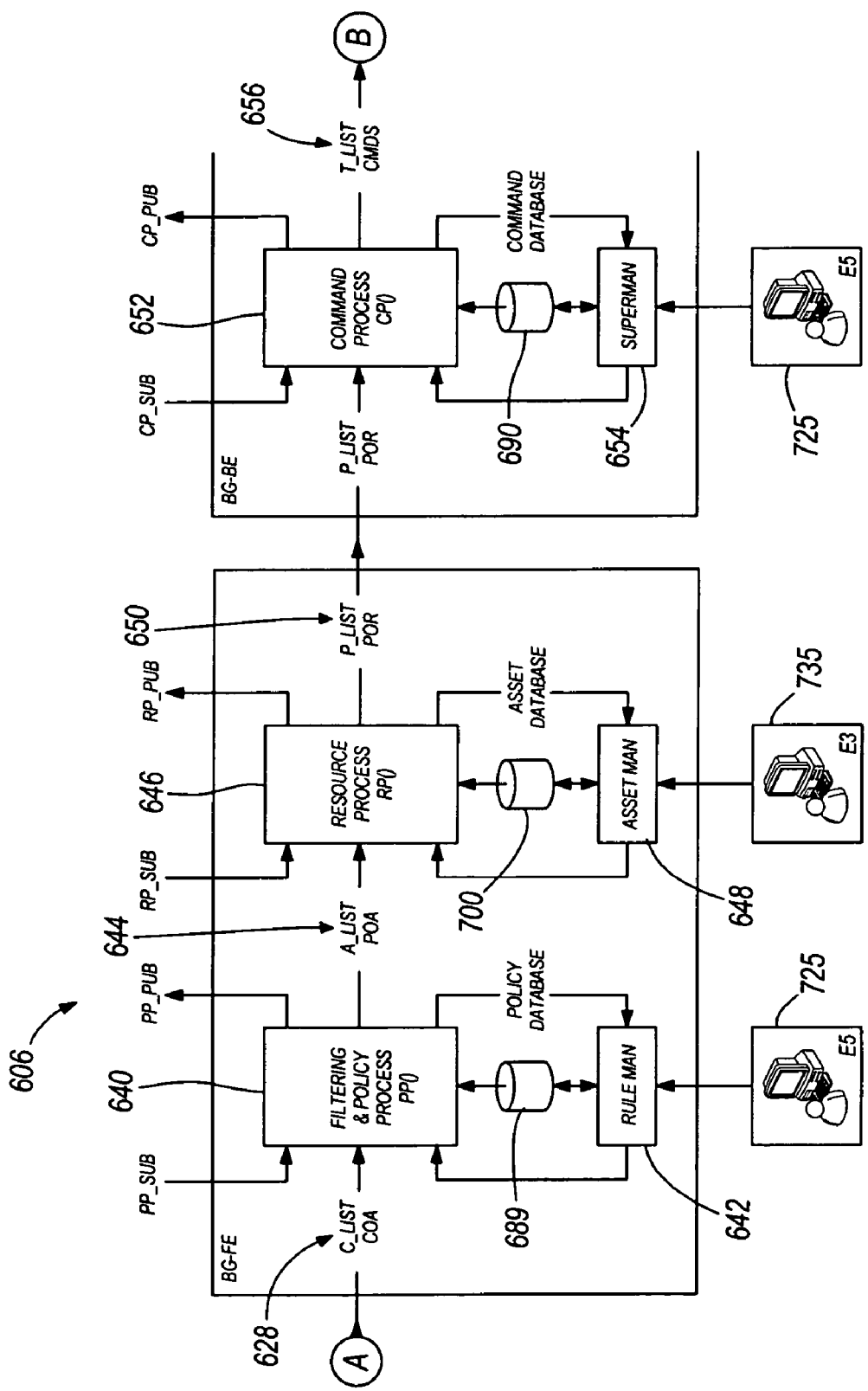
FIG. 29 is an illustration of an exemplary behavior generation service.

FIG. 29 shows the second component of the CPF 602, the BGS 606. The BGS 606 converts (generally in a collaborative manner) potential COAs into a set of executing PORs. Once one or more COAs are identified, collaborating enterprises formulate and agree upon a plan of action ("POA"). Each POA is checked to ensure it complies with the policies (operational constraints) of the EC2 system 600. POAs that do not comply with the policies are either modified to comply or the policies are modified to accommodate the POA. Once POAs comply with the policies of the EC2, real assets are allocated to the POAs from assets distributed among the COI. POAs that have been allocated assets are termed operational PORs. A designated individual (commander, supervisor, director, etc.) authorizes and dispatches the operational PORs which then begin executing. Like the SAS 604, in this embodiment, the BGS 606 also follows three process steps.

A policy process 640 receives the c_list 628 containing possible COAs from the SAS 604 analysis process 624. The policy process 640, with support of a commander using a rule manager application ("RuleMan") 642, evaluates the COA for compliance with extant policies. If the COA is compliant it is marked as viable. If the COA is not compliant with extant policies, it is evaluated for risk. If a risk exceeds a threshold as determined by a policy or commander, the COA is aborted. If the risk does not exceed the threshold, the COA is marked as viable. If possible, COAs not in compliance with extant policies are adjusted to achieve compliance with extant policies. All viable COAs are added to an actionable list ("a_list") 644 and forwarded to a resource process 646.

The resource process 646 receives the a_list 644 from the policy process 640 and attempts, with assistance of a planner/analyst using an asset manager application ("AssetMan") 648, to assign appropriate resources. If resource conflicts exist between one or more POAs in the a_list 644 or between one or more POAs in the a_list 644 and a currently executing POR, a resource assignment schedule is created that redistributes assets according to criteria set by a policy or a commander. A plan list ("p_list") 650 is created with the new PORs and resource schedules. The p_list 650 is forwarded to a command process 652.

The command process 652 receives the p_list 650 from the resource process 646 and evaluates, with assistance of a commander using a second planning manager application ("SuperMan") 654, the current situation, the p_list 650 plans, and the status of resources to determine an optimal schedule. Based on the optimal schedule, the command process 652 authorizes new tasking orders and issues them in the form of a task list ("t_list") 656.

Figure 30:
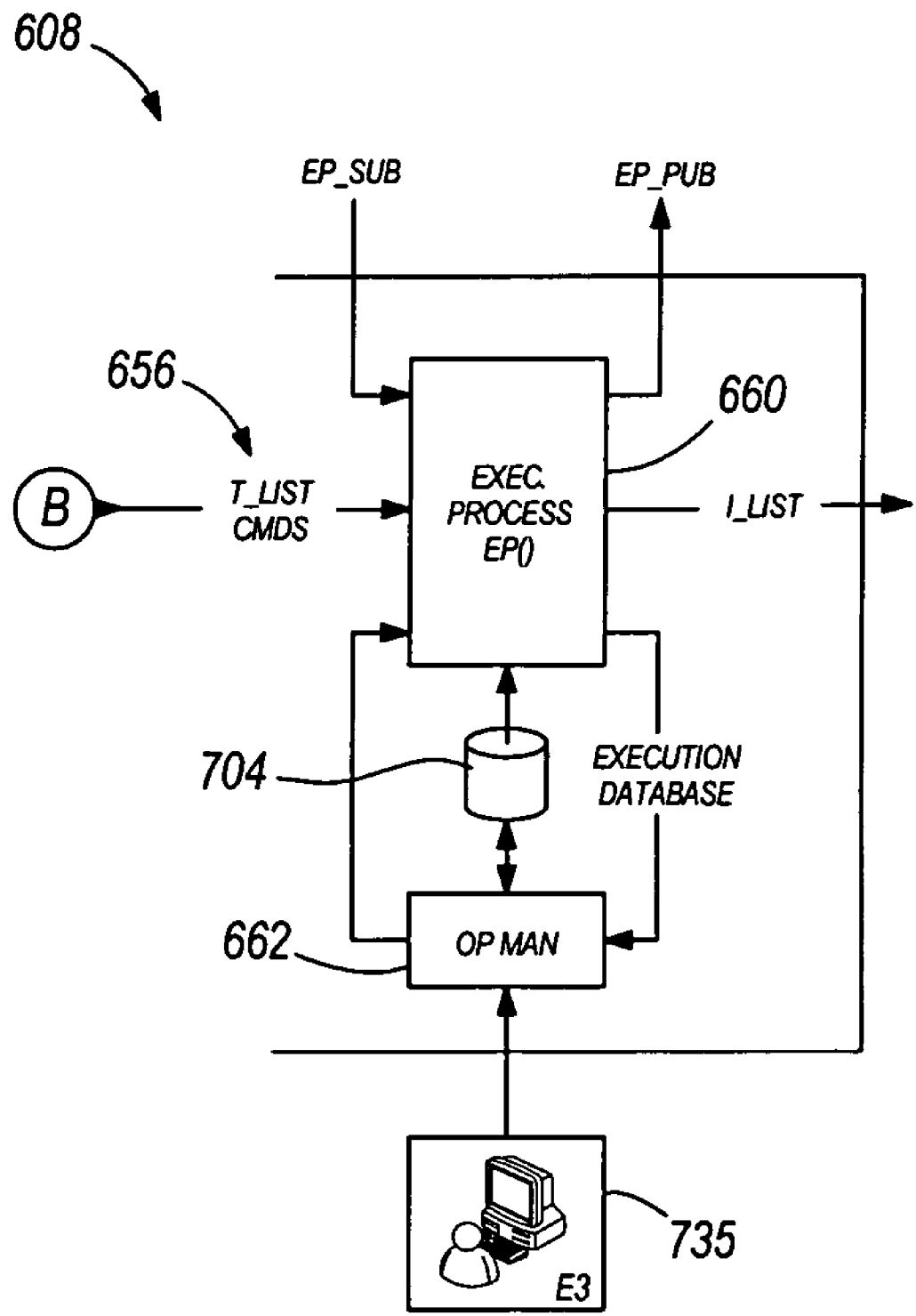
FIG. 30 is an illustration of an exemplary execution management service.

As shown in FIG. 30, the execution process 660 receives the t_list 656 from the BGS 606 and, with assistance of an operator using a command manager application ("OpMan") 662, allocates tasks to required parties. A commander places a POR into execution and the progress of the plan is monitored by the EMS 608 to continually (re)assess and, when required, modify (control) the execution of the POR. As situations unfold, the executing PORs are routinely evaluated and then aborted or modified as necessary.

Figure 31:
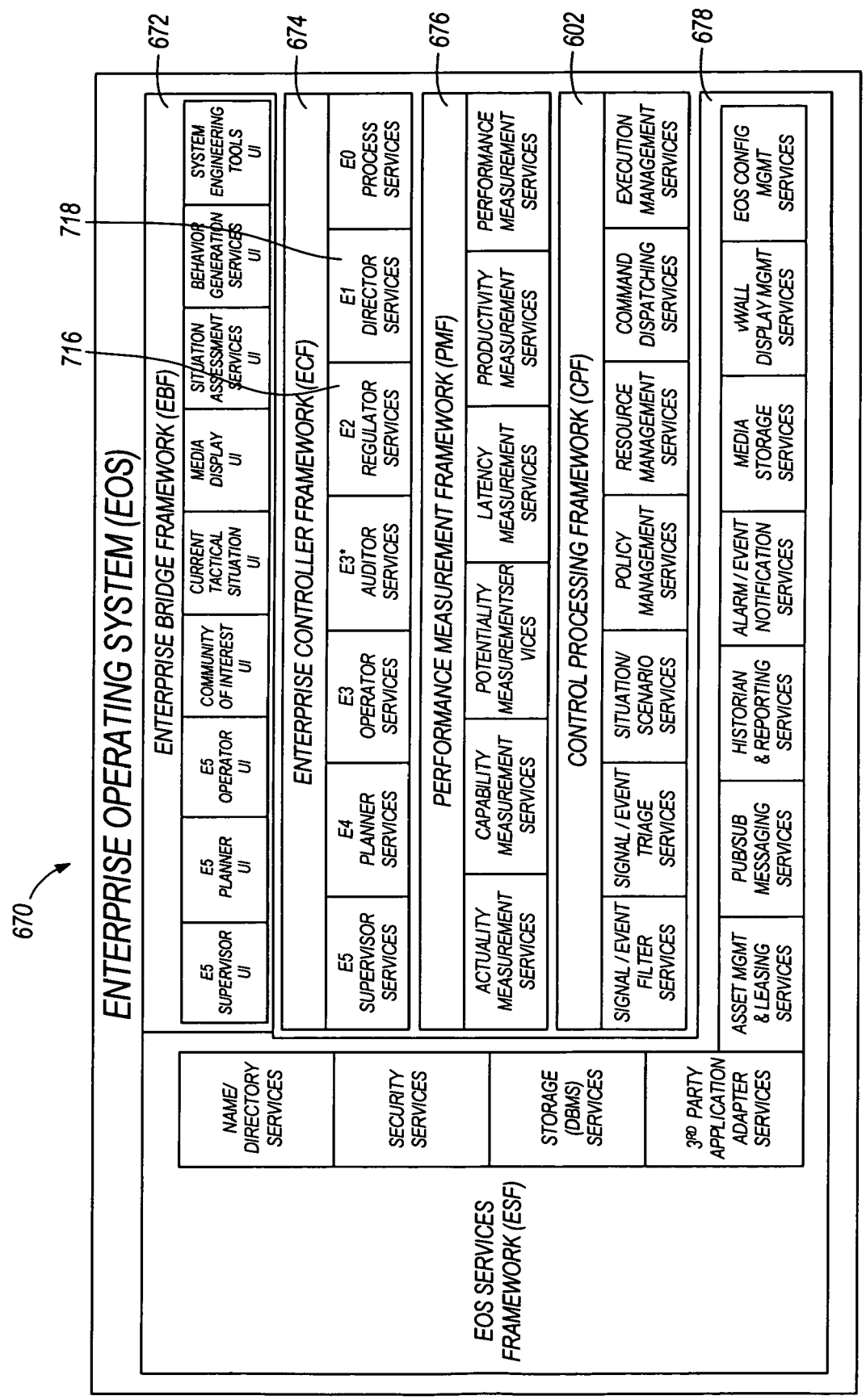
FIG. 31 is an illustration of an exemplary enterprise operating system.

An embodiment of an enterprise operating system ("EOS") 670 (FIG. 31) supports the functions of an EC2 system 600, including the functions of the CPF 602. In the embodiment shown, the EOS 670 includes five services, each based on an underlying model of how enterprises define and manage "value production." The five service categories of the EOS 670 are defined as "frameworks" and include: an enterprise bridge framework ("EBF") 672, an enterprise controller framework ("ECF") 674, the control processing framework ("CPF") 602, a performance measurement framework ("PMF") 676, and a services framework ("ESF") 678.

Enterprise Control Framework

The ECF 674 comprises those components of EOS 670 that enable and support coordination (interaction and interoperation) among actors within an enterprise and among collaborating (federated) actors in allied enterprises.

Figure 32:
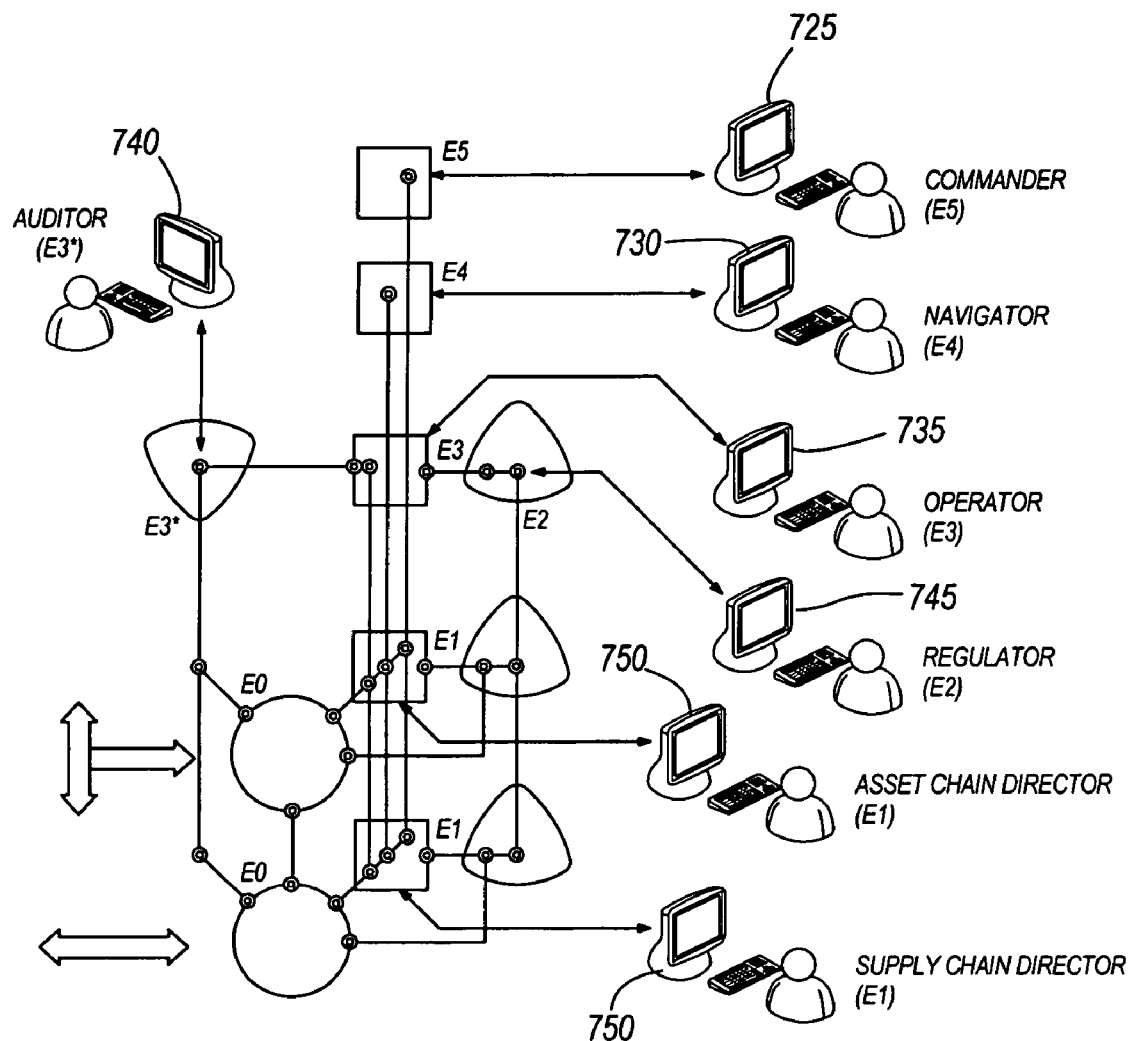
FIG. 32 is an illustration of an exemplary enterprise control model including management actors.

In the EC2 system 600, behavior of a VPU is governed through management actors within its own local autonomous enterprise command structure. A VPU's actors are responsible (accountable) for guiding its behavior. FIG. 32 expands the ECF 674 command model of FIG. 3 with the addition of individual client-side interfaces for each actor (user) shown as workstation icons. These actors correspond to the five echelons of control discussed previously. Table 3 summarizes the roles of each of the enterprise management actors.

TABLE 3

Principle Enterprise Actors

| Actor | Function | Roles & Responsibilities |
|---|---|---|
| E5 | Command | Goals, Objectives & Policy Domain Management |
| E4 | Planning | VPU Capability Management |
| E3 | Operations | Operational Capability Management |
| E3* | Audit | Plan (Process) Performance Assessment |
| E2 | Regulation | Process (Task) Synchronization |
| E1 | Director Process | Process (Task) Management |
| E0 | Process | Value Production Process (Task) Under Control |

Note:
*designates a non-controlling role at a given echelon

To scale the ECF 674 in its support of the interactive processes of real-time situation assessment, plan generation, and plan execution among COI members, a set of generalized, well-defined protocols between and among the ECF 674 actors within and between VPUs in a COI lattice are used. These application-level communication protocols are implied by the lines in FIG. 32 that terminate on specific objects associated with each actor and may be XML message types.

Figure 33:
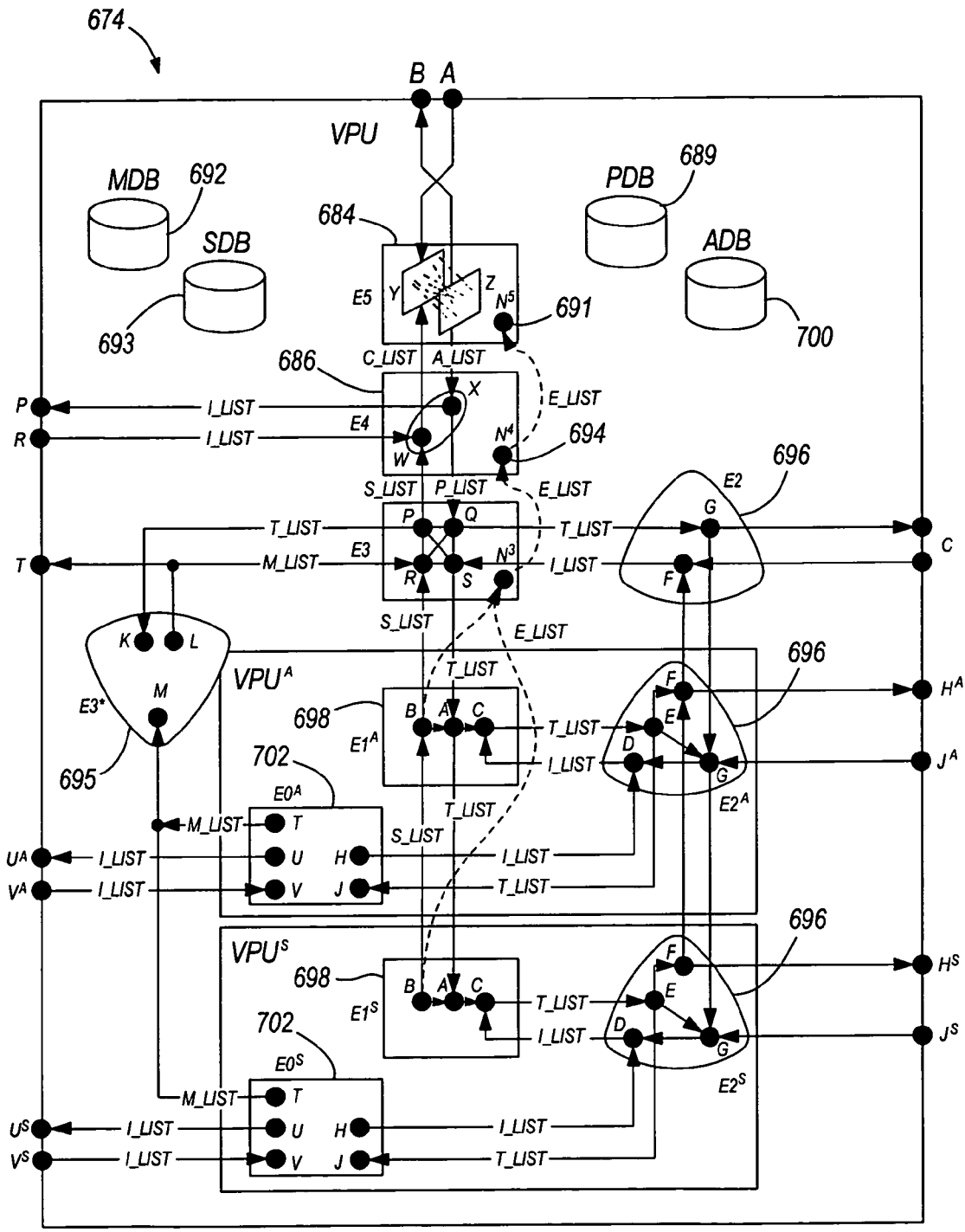
FIG. 33 is an exemplary illustration of the components of an enterprise controller framework.

FIG. 33 shows components in the ECF 674. These components are interconnected as diagrammed with the links annotated with the message types shown. The components are "wrappers" that provide the protocol machinery sufficient to define both the relationships among and synchronized flows between the ECF 674 actors.

E5 684 command services perform subordinate-superior communications. An application-level protocol governing communications along the command axis (paths Z-B and A-Y in FIG. 33) between E5 commanders 684 operating in superior-subordinate command chains. A tasking order ("TO") in the form of a t_list utilizes this path.

An application-level protocol governs E5 684 to E4 686 communications (paths Z-X and W-Y). In the embodiment shown, this is the principle route for E5 684 to receive, from E4 686, system models, scenarios, and outside world status information.

An application-level protocol governs E5 684 to E3 688 communications (paths Z-Q and P-Y). In the embodiment shown, this is the principle path for POA (following asset allocation), for performing policy checks, and receiving command approval as executable plans of record (POR).

E5 684 policy services ("RuleMan" 642 shown in FIG. 29) enables E5 684 to add and edit policies governing behavior of the enterprise, and to perform compliance checks on plans and policies. RuleMan 642 interacts with and is supported by a policy database ("PDB") 689 as will be discussed in greater detail below.

E5 684 interacts with command services ("SuperMan" 654) that enable E5 684 to review, authorize, and dispatch PORs. SuperMan 654 interacts with and is supported by the command database ("COB") 690 (FIG. 29). Using the command services, the commander provides authorization and proper sequencing of new plans with currently executing plans.

E5 684 interrupt services 691 provide E5 684 with alarm and event processing, including prioritization, masking, and dispatching, for signals that propagate upwards from lower management levels and terminate on its N5 "port."

An application-level protocol governs E4 686 to E3 688 communications (paths X-Q and P-W). This is a route for information from the E3 688 operator about performance of executing PORs, status of subordinate VPUs (e.g., their actualities and capabilities), and disposition and performance of assets. The information carried by this protocol includes situational (status) and may be in the form of s_lists 622.

An application-level protocol governs E4 686 planner environment data access communications between E4 686 and its source(s) of information related to the context (e.g., markets, competitors, etc.) within which the VPU must function. The information carried by this protocol may be in the form of i_lists 612.

E4 686 planner's modeling services (ModMan 616) enable E4 686 to develop, exercise and validate functional models of both internal operation of the enterprise (e.g., a simulation of the ECF 674 itself) and external context within which the enterprise operates, including COI relationships. ModelMan 616 is a client of a model database ("MDB") 692.

E4 686 planner's analysis services (PlanMan 626) enable E4 686 to create, edit, test, and validate scenarios and courses of action (COA). PlanMan 626 is a client of the scenario database ("SDB") 693. These services govern the E4 686 internal behaviors associated with nodes labeled "W" and "X."

E4 686 planner's interrupt services 694 provide E4 686 with alarm and event processing, including prioritization, masking, and dispatching, for signals that terminate on its N4 "port."

An application-level protocol governs E3 688 operator to E3* 695 auditor communications between the E3 688 and the E3* 695. This path carries real-time performance measurements related to the behaviors of subordinate VPUs.

An application-level protocol governs E3 638 operator to E2 696 regulator communications between E3 688 and subordinate E2 696 in matters of POR task synchronization.

An application-level protocol governs E3 683 operator to E1 693 director communications between E3 688 and subordinate E1 693 in matters of POR tasking, including planning, dispatch, asset status, performance, and completion. With respect to the recursive nature of the ECF 674 model, it is preferred that this protocol be identical to that referenced in E5 684 command services performing subordinate-superior communications.

E3 688 operator resource management services (AssetMan 648) enable E3 688 to manage deployable resources within the enterprise. The AssetMan 648 application is the primary client of an asset database ("ADB") 700.

E3 688 operator operations management services (OpMan 662) enable E3 688 to manage asset requirements and interdependencies for PORs in execution. These services govern E3 688 internal behaviors associated with the complex labeled "P," "Q," "R," and "S."

E3 688 operator interrupt services 701 provide E3 688 with alarm and event processing, including prioritization, masking, and dispatching, for signals that terminate on its N3 "port."

An application-level protocol governs request-response communications between the E3* 695 auditor and E0 702 VPU production processes regarding acquisition of POR-specific performance data.

An E3 688 audit service includes measurement and reporting functions sufficient to provide the E3 688 actor with timely accounting of the performance of subordinate E0 702 production processes as they execute one or more PORs.

An application-level protocol governs communications between the E3 688 operator and E2 686 regulator actors in the issuance and reporting of synchronization requirements of multiple, coordinated tasking orders.

An application-level protocol governs communications between and among E2 696 regulator actors in synchronizing execution of coordinated tasking orders (behaviors) within and between enterprise VPUs.

An application-level protocol governs communications between the E2 696 regulator and E1 698 director actors in exercising regulatory control over the E0 702 production processes.

An application-level protocol governs communications between the E2 696 regulator and E0 702 production processes in performing regulatory control.

Generally, coordination of internal and external production processes in a collaborative (federated) system requires that internal and external processes be synchronized. For activities operating under a single POR, an E2 696 external synchronization service couples internal activities and activities being executed by external VPUs. These services govern behaviors associated with nodes labeled "G" and "F."

An E2 696 regulation service 716 provides the tools required to monitor, report, and synchronize E0 702 behaviors under issued PORs. These services govern the E2 686 internal behaviors associated with nodes labeled "D," "E," "F," and "G."

An E1 698 director service 718 provides services for the direct management of a subordinate E0 702 production process. Consistent with the recursive nature of the ECF 674 model, the E1 698 director services at a given level are equivalent to the (E5 684, E4 686, and E3 688) services defined at the superior level.

An E0 702 value production process service includes those activities that are required to execute the enterprise's "value propositions." Value propositions define the behavior of the enterprise as viewed on its asset and supply chain ports, reference ports "U" and "V" in FIG. 33. The particular set of value propositions is enterprise (application) specific and, therefore, not discussed here.

Enterprise Bridge Framework

The EBF 672 includes components of the EC2 600 EOS 670 that provide interactive user interfaces ("UIs") to members of internal and collaborating management teams. In the embodiment shown, there are three types of EBF 672 UIs, workstations or mobile devices supporting principle actors (E5 684, E4 686, E3 688); a shared visual "commons" ("vWall") 720 (FIG. 27), where multiple actors are presented shared information; and an EOS 670 engineering workstation ("SEW," not shown) for supporting the development, operation and maintenance of an EC2 600 system installation. In addition, UIs exist for the E0 702, E1 698, E2 696, and E3* 695 actors.

Workstations can engage in chat sessions among local management teams and allied COI management teams. Workstation and vWall windows contain status, performance indices, time, alert levels, and so on.

An E5 684 commander workstation 725 (FIGS. 27, 29, and 32), in either stationary or mobile configurations, provides secure browser-based tools supporting interaction with ECF 674, CPF 602, PMF 676, and ESF 678 services. Specifically, the E5 684 commander workstation 725 provides access to the RuleMan 642 for policy management and SuperMan 654 for command authorization.

An E4 686 navigator workstation 730 (FIGS. 27, 28, and 32), in either stationary or mobile configurations, provides access to ModMan 616 and PlanMan 626 analysis and planning services. E4 636 monitors current conditions, both internally and in the external environment, and plans for controlled incremental adaptation.

An E3 688 operator workstation 735 (FIGS. 27, 29, 30, and 32), in either stationary or mobile configurations, provides access to AssetMan 648 and OpMan 662 services. E3 688 allocates functional resources to one or more POAs. Once allocated POAs are authorized, an E5 684 commander places these plans into execution and manages their progress.

An E3* 695 auditor workstation 740 (FIGS. 27 and 32) provides access to data acquisition and analysis tools to support E3's 688 need to independently audit E0 702 behaviors.

An E2 696 regulator workstation 745 (FIG. 32) provides access to application services supporting coordination between and among E0 702 processes executing on common PORs, or sharing assets used in independent PORs.

An E1 698 director workstation 750 (FIG. 32), in either stationary or mobile configurations, provides a synopsis of E5 684 workstations of lower level (subordinate) enterprises.

An E0 702 process workstation (not shown) provides a synopsis of the E3 688 workstations of lower level (subordinate) enterprises.

In the embodiment shown, the EBF 672 visual commons 720 includes five areas: a COI visual commons ("P1"), a current tactical picture ("CTP") visual commons ("P2"), a media visual commons ("P3"), a SAS visual commons ("P4"), and a BGS visual commons ("P5").

The COI visual commons 770 (FIG. 27) is a vWall display containing a rendering of the currently active video teleconferences as well as pending sessions with one or more COIs related by the current situations and the current complement of executing PORs.

The CTP Visual Commons 772 (FIG. 27) provides a rendering of the status of current situation(s) and related results from executing PORs.

The Media visual commons 774 (FIG. 27) is a multimedia projection, typically from streaming news and other video sources, of selected "eyes on the processes" that are currently represented in the CTP.

The SAS visual commons 776 (FIG. 27) provides a synopsis of the current status of situation assessment and plan generation activities. This projection supports the collaborative work of the E5 631, E4 686, and E3 688 actors and COI allies as they discuss courses of action that provide proactive and reactive responses to new or evolving situations.

The BGS 606 visual commons 778 (FIG. 27) provides a synopsis of the current status of policy management, plan resourcing, plan authorization, and plan execution. In concert with COI and SAS 604, this vWall presentation supports the E5 684, E4 686 and E3 actors 688 and their COI allies as they manage active POR commitments.

The SEW tools (not shown) provide system engineers with access to an integrated suite of applications and associated resources for the specification, configuration, deployment, testing, documenting, commissioning, training, verification, operation and maintenance of EC2 600 and EOS 670 systems.

The Control Processing Framework

The CPF 602 includes those components of the EC2 600 and EOS 670 that perform situation assessment, behavior generation and execution monitoring functions as discussed previously.

Relations between the seven application components of the CPF 602 are diagrammed in FIGS. 28-30. The CPF 602 converts observations of unfolding events into responses in the form of executable PORs. Each CPF 602 stage provides a mapping, as defined below, and engages one of the CPF 602 databases. As shown in FIGS. 28-30, there are six principle repositories (databases) within the CPF 602, each supporting an actor-specific application.

The enterprise model database ("MDB") 692 is a repository for the models used to characterize the enterprise's internal dynamic structure and its evolving external environment. The MDB 692 provides a basis for E4's 686 modeling, analysis, and planning activities.

A scenario database ("SDB") 693 (FIG. 28) is a repository for scenarios (potential courses of action) that characterize expected behaviors associated with known situations and planned responses to events that have either occurred in the past or are anticipated to occur in the future. A scenario is a recipe for action to be used in creating plans of action. The SDB 693 contains an evolving record of known scenarios.

The policy database ("PDB") 689 (FIG. 29) is a repository for policies (constraints) that govern the behavior of the enterprise. All plans of action, prior to their authorization by an E5 684 commander, must pass a "policy check." New policies created by E5 are validated for consistency against the PDB 689 prior to inclusion in the PDB 689.

The asset database ("ADB") 700 (FIG. 29) is a repository for assets (resources) that are available to a VPU for allocation to its plans of action. An asset record includes the type, quantity, and status of a resource. Assets are under the control of the E3 688 actor and either "owned" by the enterprise (i.e., on its "balance sheet") or "leased" to the enterprise by an allied member of one of its COI. Assets are subsequently leased to plans of action that are created in order to respond to unfolding situations.

The command database ("CDB") 690 (FIG. 29) is a repository containing command authorizations and sequences of past, present and (simulated) future COAs, POAs and PORS.

The execution database ("EDB") 704 (FIG. 30) is a repository for the time-stamped history of the enterprise's performance resulting from execution of plans of record (POR). The EDB 704 is monitored by the E3 688 actor in the process of managing the execution of plans of record, and by E4 686 for "continuous process improvement" of capabilities within the enterprise. These repositories support the seven applications that define the CPF 602 processing stages.

As noted, the signal/event filter service ("FP") 610 is the CPF 602 front end for the SAS 604. The FP 610 performs signal processing on a plurality of input channels. There are two classes of CPF input: prescriptive (predefined or purposeful) and broadcast (open, incidental, or accidental) communications. Open broadcasts may be scheduled or unscheduled, and information content may be structured or unstructured. For prescriptive information, the EC2 600 EOS 670 models its inputs as subscriptions from distributed publishers (e.g., superiors and suppliers) of specific or general topics of interest. Publishers register and publish topical information (e.g., tasking orders). Subscribers discover topics and subscribe to those of interest. Publishers grant subscriptions through validation of subscriber credentials. Subscription delivery may occur synchronously (according to a schedule) or asynchronous (unscheduled). The FP 610 provides a means of filtering (masking) subscriptions and broadcasts based on the current state of the enterprise, the priority of subscriptions, the content of messages, the information needs of pending COAs or POAs, or the timeliness properties of information and their scheduled arrivals. Filter parameters that govern the signal processing front end are controlled indirectly by the E4 686 actor through current settings (patterns) held in the MDB 692.

The signal/event triage service ("TP") 620 receives the subscription-based and broadcast information that makes it through the FP 610. This information is sorted and correlated with the set of signals that it arrived with, and the needs of the CPF 602 activities currently in process. The TP 620 sorts the new information into two categories—information that (potentially) declares new situations of interest to the enterprise and information that supports situations that are known (have been previously recognized) and that are under some degree of control. Situations that are known have scenarios defined in the SDB 693, are in some stage of planning (as a COA or POA), or are currently under control through the execution of one or more PORS.

The analysis service ("AP") 624 generates responses to the occurrence of events of interest, as determined in TP 620. Responses, through the services of the PlanMan 626 application, begin in AP 624 with the recognition or the identification of one or more new or existing situations. In this embodiment, recognition happens in one of two ways. Either the pattern of input maps (associatively) to one or more records in the SDB 693, or not. If the input pattern is recognized as a precursor to one or more known scenarios, then the AP 624 activates those scenarios, making them potential responses, or candidate courses of action (COA). If the pattern is not recognized as a precursor to any known scenarios, then a new (prototype) scenario is created for which the new pattern is a precursor. The E4 686 actor is then responsible for developing the prototype to a point, perhaps requiring it to await additional input, where it is mature enough to be used as a candidate COA. The prototype is the basis for discussion and joint planning among E5 684, E4 686, and E3 688 actors of the VPU or members of a COI.

The policy management service ("PP") 640 runs candidate COAs against the PDB 689 through the RuleMan 642. RuleMan 642 checks whether the COA, subject to the current state of the enterprise, is valid with respect to its default scenario execution requirements. If it is valid, it is released to a resource management service ("RP") 646 (discussed below) as a candidate plan of action (POA). If not, one of four actions can be taken: 1) it is rejected as a COA for violating one or more policies; 2) it is modified in a manner that allows it to execute within the policy constraints; 3) the COA is marked as pending and a Policy Change Request ("PCR") is issued (as a POA) to add or edit the PDB 689 according to the needs of the COA, or 4) the COA is allowed by a commander to violate one or more polices based on a risk assessment.

The RP 646 POAs are not executable until the POAs have been assigned operational resources (assets). Assignment of assets, as part of total asset management, is the responsibility of the E3 688 and the RP 646. POAs queue up in this stage of CPF 602 processing awaiting the availability of a finite number of resources. Resources may be serially reusable, expendable (requiring replenishment strategies), unavailable due to being in a state of repair, etc. The RP 646 service, through the services of the AssetMan 648 application, has the task of making resource assignments while avoiding stalling critical POAs, deadlocking two or more POAs when they are mutually blocked on the allocated resources, etc. The supervision of the RP 646 service is the responsibility of the E3 688 actor.

Once a POA is allocated the resources it requires, it is released by the RP 646 service as a POR.

Once the POR is released from the RP 646 service, a command authorization service ("CP") 652 allows the E5 684 actor, who has this responsibility to give final authorization (or a command) to release the POR to E3 688 for execution. The E5 684 actor performs a final check of the current situation, establishes proper synchronization among executing and pending PORs, and authorizes, through the services of the SuperMan 654 the POR as a tasking order ("TO"). If E5 684 fails to authorize the POR, it is returned to RP 646 to release its assets.

Execution of TOs (authorized and scheduled PORs) is the responsibility of the E3 688 operations actor. The execution management service ("EP") 660 provides services to E3 688, via its OpMan 662 application, to manage the dispatching to, coordination among, and monitoring of POR tasks in its execution units (subordinate VPUs, both within the enterprise and from allied members' enterprises). Execution management includes communications with the E1 698, E2 696, and E3* 695 components of the ECF 674.

The CPF 602 configuration management services ("CMS") provides tools for configuring, testing, verifying and validating the integrity of the CPF 602 within a given software release (version) and across software releases.

Performance Measurement Framework

To help make accurate assessments of situations and determine the proper COA, situation assessment and behavior generation based on a common set of performance metrics is performed with the EC2 600 system. The PMF 676, working in concert with ECF 674 and CPF 602 components, provides a distributed real-time measurement of enterprise performance with respect to VPU capabilities and executing PORs. The PMF 676 metrics and measurement processes establish a distributed and unbiased means of assessing individual and group behavior. As previously discussed, the PMF 676 provides six measures of performance of a VPU—actuality, capability, potentiality, latency, productivity, and performance.

Actuality is a measure of the current level of activity within a VPU. The continuous measurement is made at the interface, labeled "H" to "D" in FIG. 33, between a given E0 702 process and its associated E2 696 regulator.

Potentiality is a measure of a VPU's design capability. Higher levels of potential require a redesign of the VPU, or the creation of a new VPU with additional capabilities. The E4 686 actor is responsible for maintaining (in its MDB 692) a measure of the potential of its VPU assets.

Capability is a measure of a VPU's current capacity for work, and is a direct function of the size and status of its current asset base. A continuous assessment of a VPU's capability is the responsibility of the E3 688 actor based on information provided by its E3* 695, E1 698 and E2 696 subordinates. When a VPU's capability (capacity) is reached, it is the role of the E3 688 actor to request, and the E4 686 actor to plan for, allocation of additional assets. It is the role of the E5 684 actor to authorize such allocations. A VPU's capability can be raised only to the level of its potential.

Latency is a measure of the instantaneous "surge capacity" of a VPU. Latency is calculated and reported by the E4 686 actor by computing the ratio Latency(t):=Capability(t)/Potential(t). The addition of assets to a VPU increases its capability provided capability has not reached potential.

Productivity is a measure of the instantaneous level of work a VPU is producing relative to its current capability. The E3

688 actor computes the ratio Productivity(t):=Actuality(t)/Capability(t) and reports it to its superior and allied COI members.

Performance is a measure of the functioning of a VPU relative to its potential. The E5 684 actor computes the ratio Performance(t):=Actuality(t)/Potential(t) and reports it to its superior and allied COI members.

In the embodiment shown, the PMF 676 is a distributed system, with components executing throughout the ECF's 674 nested (asset chain) environment. To help reach optimal performance embedded components of a VPU assess their actuality, capability, and potentiality using normalized measurements. In one embodiment, normalization is based on the potentiality of the most senior, and therefore, capable, VPU. The responsibilities of the PMF 676 Configuration Management Service includes providing a calibration standard to VPUs, providing methods for calibration, providing time triggers when synchronization takes place, collecting measurements, and maintaining a performance database.

The Services Framework

The ESF 678 provides the EOS 670 a standards-based computing and communications infrastructure. The ESF 678 platform for the EOS 670 isolates the EOS 670 services from implementation dependent aspects of the EC2 600 system.

In one embodiment, the ESF 678 is a collection of EOS services that support the main applications defined within the EBF 672, ECF 674, CPF 602, and PMF 676. The ESF 678 binds (through interface adapters) the EOS 670 to other enterprise applications, including network communications management ("NCM"), enterprise resource planning ("ERP"), manufacturing resource planning ("MRP"), logistics, customer relationship management ("CRM"), distributed process control ("DCS"), human resource management ("HRM"), document management ("DM"), regulatory compliance management ("RCM"), and others.

In one embodiment, the EOS 670 is a distributed system interconnected by voice, video, and data communications services. As such, it is an information system that exists in an enterprise's integrated information infrastructure. The name/directory service ("NDS") of the EOS 670 defines and maintains a coherent name-space for defining access controls (permissions) as well as information to link EOS 670 components and actors.

The EOS 670 provides security through a security service ("SS") addressing network, computing, application, and end-user security concerns. The SS supports the security policies and mechanisms of the enterprise information infrastructure in which the EC2 600 system is embedded.

The EOS 670 maintains it own storage systems (databases). A storage management services ("SMS"), along with the SS, supports data sharing between EC2 600 databases and applications and external COI databases and applications.

The EOS 670 exists within an enterprise information infrastructure that contains many types of applications. Interfaces to non-EOS applications are provided by a set of application adapter services ("AAS"). Each AAS provides protocol and data conversion support to non-EOS applications. The AAS collects licensed program products, certifies their compliance with the security, naming, and performance requirements of the EOS 670, and stores them in a library.

The EOS 670 includes a publish/subscribe messaging service ("MS") that supports asynchronous messaging. The MS supports the "task, publish, process, and use" (TPPU) communications mechanisms as defined by the Department of Defense's ("DOD") Network Centric Warfare (NCW) requirements.

To help an enterprise to learn, analyze casual relationships, simulate possible future situations, train, and maintain legal records, its behavior, over a period of time, should be recorded. A historian service ("HS") keeps a repository of the time-stamped histories of EOS 670 measurements and subsequent command and control actions. The recorded data, subject to SS control, is maintained in a database accessible by ModMan 616, PlanMan 626, RuleMan 642, OpMan 662, SuperMan 654, and AssetMan 648. Other applications, with suitable authorization, may have access to the HS.

The EOS 670 reacts to changes in external situations, providing ECF 674 actors support to respond in an effective and timely fashion to these changes. An alarm/event notification service ("ENS") provides the ability to sense and react to internal and external events. The ENS provides the means to detect, select, and promote messages containing events. Assessment and response may require interrupting current executing processes in order to reallocate resources sufficient for effective response to the new events. Events that are determined to be critical are deemed alarms.

The EOS 670 is designed to support human actors in the E5 684, E4 686, and E3 688 roles. Generally, a high degree of cognitive processing of command and control situations is required of these actors. The cognitive processing ability of these actors is improved when situations are presented visually. A media information service ("MIS"), provides the visual media displayed on the EBF 672 visual commons and user interfaces (U's). The EOS 670 MIS service provides tools for acquiring, sorting, displaying, and archiving the content of workstations and the visual commons.

A collaboration conferencing services ("CCS") provides voice, video and data conferencing capabilities that directly support the CPF 602 requirements of an interactive EC2 system 600.

A display commons management service ("DMS") manages the visual "real-estate" of the visual commons. The DMS ensures that the visual commons content is valuable to the E3 688, E4 686 and E5 684 actors as they deliberate and is consistent with the progress of (i.e., input to and output from) the CPF 602 applications. The DMS further ensures that the visual commons information space is shared among members of currently bound COIs, and that the current tactical situation of PORs, and the key performance indicators of the enterprise are displayed. The DMS also ensures consistent presentation (look and feel) across enterprises operating within one or more COIs, and provides EOS 670 bridge environments with models and tools for managing the visual commons 720.

A configuration management service ("CMS") manages the configuration, backup, versioning, deployment, documentation, testing, certification, and maintenance of the EOS 670 platform. The CMS is a suite of tools, utilized within the SEW environment.

As should be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Thus, the claims should not be limited to any specific hardware or software implementation or combination of software or hardware.

Various features and advantages of the invention are set forth in the following claims.

What is claimed is:

1. An enterprise command and control system for regulating a behavior of a plurality of enterprise value production units (VPU), the system comprising:
a model management subsystem, executed by a processor, coupled to a model database and configured to provide real-time operating situation and event information, policy constraints, asset constraints, and current situation models to the model database;
a scenario management subsystem, executed by a processor, coupled to a scenario database and configured to provide policy base updates, asset base status updates, validated scenarios, and current aggregate situation models to the scenario database and;
a policy management subsystem, executed by a processor, coupled to a policy database and configured to provide a policy status, an asset status, a course of action status, a plan of record status, a subordinate's policy status, and a superior's policy status to the policy database, and to receive policy requests from subordinates and policy postings from superiors, and to provide policy requests to superiors and post policies to subordinates;
an asset management subsystem, executed by a processor, configured to receive asset requests from subordinates and asset allocations from superiors, and to return assets to superiors and allocate assets for subordinates;
a performance management subsystem, executed by a processor, coupled to a performance database and configured to measure performance of the enterprise command and control system and to provide a measure of the performance to the performance database;
a situation assessment subsystem, executed by a processor, configured to receive asset chain tasks and status requests, supply chain tasks and status requests, and a plurality of messages related to environmental conditions, and to generate prioritized lists of potential courses of action based on the received asset chain tasks and status requests, supply chain tasks and status requests, and a plurality of messages and data in the model database and the scenario database;
a behavior generation subsystem, executed by a processor, configured to receive the prioritized courses of action from the situation assessment subsystem, and to generate a set of resourced and prioritized plans of record using data from the policy management subsystem and the asset management subsystem;
an execution management subsystem, executed by a processor, configured to receive the resourced and prioritized plans of record from the behavior generation system, and to generate asset chain tasking commands and supply chain tasking commands using the measure of performance; and
a display configured to receive and display shared data from the situation assessment subsystem, the behavior generation subsystem, and the execution management subsystem.

2. The enterprise command and control system of claim 1 wherein the measure of performance provided by the performance management subsystem includes at least one of capability, potentiality, capacity, latency, productivity, and performance.

3. The enterprise command and control system of claim 1 wherein the situation assessment subsystem provides prioritized lists of potential courses of action with associated resource requirements and policy issues.

4. The enterprise command and control system of claim 1 wherein the situation assessment subsystem further comprises:
a filter configured to receive messages from a plurality of subscriptions, to decode and sort the messages based on real-time operating situation and event information, policy constraints, asset constraints, and current situation models provided by the model management subsystem, and to provide a list of events;
a triage subsystem configured to receive the list of events from the filter, to receive the real-time operating situation and event information, policy constraints, asset constraints, and current situation models from the model management system, to ignore non-critical new situations, and to provide a situation list; and
an analysis subsystem configured to receive the situation list from the triage subsystem, to receive policy base updates, asset base status updates, validated scenarios, and current aggregate situation models from the scenario management system, to create new or modify current aggregate situation models, and provide prioritized lists of potential courses of action with associated resource requirements and policy issues.

5. The enterprise command and control system of claim 1 wherein the behavior generation subsystem further comprises:
a command management subsystem configured to provide plan coordination and authorization;
a policy subsystem configured to develop and maintain operating policies governing the behavior of VPU plans of record and associated risk;
a resource subsystem configured to develop and maintain a status of deployable assets of a VPU; and
a command subsystem configured to receive the plans of record from the resource subsystem, current situation information and resource status from a planning management subsystem, and to authorize one or more resourced and prioritized plans of record to execute.

6. The enterprise command and control system of claim 1 wherein the execution management subsystem further comprises:
an execution subsystem configured to receive a set of resourced and prioritized plans of record, measures of actuality, capability, potentiality, latency, productivity, and performance from the performance measurement subsystem, to deliver asset chain tasking commands, to deliver supply chain tasking commands, and to provide synchronization between VPUs.

7. The enterprise command and control system of claim 1 wherein the display is further configured to receive and display models, scenarios, situations, plans, policies, assets, execution status, and performance data.

8. The enterprise command and control system of claim 1 wherein the model management subsystem maintains a plurality of VPU operating models in the model database.

9. The enterprise command and control system of claim 1 wherein the scenario management subsystem maintains a scenario unfolding in a VPU.

10. The enterprise command and control system of claim 1 wherein the policy management subsystem maintains a policy pertaining to the behavior and governance of a VPU.

11. The enterprise command and control system of claim 1 wherein the asset management subsystem maintains an asset database containing a status of a plurality of resources required to operate and maintain the VPU.

12. The enterprise command and control system of claim 1 wherein the asset management subsystem maintains a historian database containing a plurality of historical records of scenarios encountered by the VPU.

13. The enterprise command and control system of claim 1 further comprising a plurality of user interfaces.

14. A situation assessment system, the system comprising:
a model management system, executed by a processor, configured to provide real-time operating situations and events, policy constraints, asset constraints, and current situation models to a model database;
a scenario management system, executed by a processor, configured to provide policy base updates, asset base status updates, validated scenarios, and current aggregate situation models to a scenario database;
a filter, executed by a processor, configured to receive messages from a plurality of subscriptions, to decode and sort the messages based on real-time operating situation and event information, policy constraints, asset constraints, and current situation models provided by the model management system, and to provide a list of events;
a triage system, executed by a processor, configured to receive the list of events from the filter, to receive the real-time operating situations and events, policy constraints, asset constraints, and current situation models from the model management system, to ignore non-critical new situations, and to provide a situation list; and
an analysis system, executed by a processor, configured to receive the situation list from the triage system, to receive policy base updates, asset base status updates, validated scenarios, and current aggregate situation models from the scenario management system, to create new or modify current aggregate situation models, and to provide prioritized lists of potential courses of action with associated resource requirements and policy issues.

15. A behavior generation system, the system comprising:
a policy manager, executed by a processor, configured to provide a policy status, an asset status, a course of action status, a plan of record status;
an asset manager, executed by a processor, configured to provide a status of assets;
a planning management system, executed by a processor, configured to provide current situation information, and resource status;
a policy system, executed by a processor, configured to receive a policy status, an asset status, a course of action status, a plan of record status from the policy manager, to receive prioritized lists of potential courses of action with associated resource requirements and policy issues, to determine the viability of potential courses of action, and to provide a list of actionable plans;
a resource system, executed by a processor, configured to receive the list of actionable plans from the policy system, to receive the status of assets from the asset manager, to assign assets to actionable plans, to create asset assignment schedules for assets that are not available for actionable plans, and to provide plans of record; and
a command system, executed by a processor, configured to receive the plans of record from the resource system, current situation information, and resource status from the planning management system, and to provide a set of resourced and prioritized plans of record.

16. The behavior generation system of claim 15 further comprising a policy database.

17. The behavior generation system of claim 15 further comprising an asset database.

18. The behavior generation system of claim 15 further comprising a command database.

19. A distributed computing and control system, comprising:
a first server including a processor executing a situation assessment subsystem configured to receive a plurality of messages, a plurality of tasks, and a plurality of requests, the situation assessment subsystem further configured to assess the plurality of messages, tasks, and requests and to generate a list of potential courses of action;
a second server including a processor executing a behavior generation subsystem configured to receive the list of potential courses of action from the situation assessment subsystem, the behavior generation subsystem further configured to validate the potential courses of action, to assign assets to the potential courses of action, and to generate validated and resourced courses of action as prioritized plans of action; and
a third server including a processor executing an execution management subsystem configured to receive the prioritized plans of action from the behavior generation subsystem and to generate a plurality of asset commands and a plurality of supply chain tasking commands, the execution management subsystem further configured to monitor the performance of a plurality of executing commands.

20. A non-transitory computer readable medium accessible by a plurality of servers including a situation assessment server, a behavior management server, and an execution management server the plurality of servers including at least one processor, the plurality of servers performing enterprise command and control, the computer readable medium comprising:
instructions for a first module, executed by the situation assessment server, for monitoring situation information;
instructions for a second module executed by the situation assessment server for assessing situation information;
instructions for a third module, executed by the behavior management server, for determining a potential course of action based on the assessed situation information;
instructions for a fourth module, executed by the behavior management server, for validating the potential course of action;
instructions for a fifth module, executed by the behavior management server, for providing assets to the validated course of action;
instructions for a sixth module, executed by the execution management server, for executing the validated and resourced course of action; and
instructions for a seventh module, executed by the execution management server, for monitoring the performance of the executing course of action.

21. The computer readable medium of claim 20 further comprising a module for displaying data on a visual commons.

22. The computer readable medium of claim 21 further comprising a module for displaying a situation assessment display.

23. The computer readable medium of claim 21 further comprising a module for displaying a behavior generation display.

24. The computer readable medium of claim 21 further comprising a module for displaying a media display.

25. The computer readable medium of claim 21 further comprising a module for displaying a current tactical situation display.

26. The method of claim 21 further comprising a module for displaying a community of interest display.

27. The computer readable medium of claim 20 further comprising a module for maintaining a model database for assessing situations.

28. The computer readable medium of claim 20 further comprising a module for maintaining a scenario database for matching a course of action to a situation.

29. The computer readable medium of claim 20 further comprising a module for maintaining a policy database for validating courses of action.

30. The computer readable medium of claim 20 further comprising a module for maintaining an asset database for monitoring available and used assets.

* * * * *